US 6,674,187 B2

(12) United States Patent
Isozaki et al.

(10) Patent No.: US 6,674,187 B2
(45) Date of Patent: Jan. 6, 2004

(54) HYBRID STEPPING MOTOR

(75) Inventors: Kouki Isozaki, Kiryu (JP); Yoji Unoki, Maebashi (JP); Noriyoshi Kikuchi, Ashikaga (JP)

(73) Assignee: Japan Servo Co., Ltd., Tokyo-to (JP)

( * ) Notice: Subject to any disclaimer, the term of this patent is extended or adjusted under 35 U.S.C. 154(b) by 35 days.

(21) Appl. No.: 10/032,069

(22) Filed: Dec. 31, 2001

(65) Prior Publication Data
US 2002/0089243 A1 Jul. 11, 2002

(30) Foreign Application Priority Data

Jan. 4, 2001 (JP) .................................. 2001-000133
Dec. 4, 2001 (JP) .................................. 2001-369968

(51) Int. Cl.$^7$ ............................................. H02K 37/00
(52) U.S. Cl. ..................................... 310/49 R; 310/261
(58) Field of Search ........................... 310/49 R, 254, 310/261, 112, 114

(56) References Cited

U.S. PATENT DOCUMENTS

| 3,206,623 | A | | 9/1965 | Snowdon ................. 310/49 R |
| 4,306,164 | A | * | 12/1981 | Itoh et al. ................. 310/49 R |
| 4,739,201 | A | * | 4/1988 | Brigham et al. .......... 310/49 R |
| 4,983,867 | A | | 1/1991 | Sakamoto ................. 310/49 R |
| 5,128,570 | A | * | 7/1992 | Isozaki ..................... 310/49 R |
| 5,410,200 | A | | 4/1995 | Sakamoto et al. ........ 310/49 R |

* cited by examiner

Primary Examiner—Tran Nguyen
(74) Attorney, Agent, or Firm—Oblon, Spivak, McClelland, Maier & Neustadt, P.C.

(57) ABSTRACT

Disclosed is an inner rotor or outer rotor hybrid stepping motor of 6-phase/6 m-pole type or 10-phase/10 m-pole type. The motor includes a stator that has 6 m or 10 m pieces of magnetic poles and a rotor that is rotatably supported by the stator. Excitation windings are wound around the stator magnetic poles. The stator magnetic pole is divided into two halves in the axial direction, one half has pole teeth being line-symmetric and the other half has pole teeth being asymmetric and deviated from the symmetric pole teeth by ¼ pitch. The positions of the symmetric half and the asymmetric half are inverted between the adjacent magnetic poles. The rotor has a first and second rotor units each of which includes a permanent magnet and first and second rotor magnetic poles around which pole teeth are formed with deviation of ½ pitch. The first and second units are connected in the axial direction through a non-magnetic material member such that they are deviated from each other by ¼ of rotor teeth pitch. In the case of 6 m-phase, number of the rotor pole teeth equals m(6n+1) or m(6n+2) where m and n are integers equal to or larger than 1.

6 Claims, 42 Drawing Sheets

| n | Z=6n+1 | | Z=6n+2 | |
|---|---|---|---|---|
| | Z | STEP ANGLE(°) | Z | STEP ANGLE(°) |
| 1 | 7 | 4.285 | 8 | 3.75 |
| 2 | 13 | 2.307 | 14 | 2.142 |
| 3 | 19 | 1.579 | 20 | 1.5 |
| 4 | 25 | 1.2 | 26 | 1.153 |
| 5 | 31 | 0.967 | 32 | 0.937 |
| 6 | 37 | 0.81 | 38 | 0.789 |
| 7 | 43 | 0.697 | 44 | 0.681 |
| 8 | 49 | 0.576 | 50 | 0.6 |
| : | : | : | : | : |

| n | Z=10n+2 | | Z=10n+3 | |
|---|---|---|---|---|
| | Z | STEP ANGLE(°) | Z | STEP ANGLE(°) |
| 1 | 12 | 1.5 | 13 | 1.384 |
| 2 | 22 | 0.818 | 23 | 0.782 |
| 3 | 32 | 0.562 | 33 | 0.545 |
| 4 | 42 | 0.428 | 43 | 0.418 |
| 5 | 52 | 0.346 | 53 | 0.34 |
| 6 | 62 | 0.29 | 63 | 0.286 |
| 7 | 72 | 0.25 | 73 | 0.247 |
| 8 | 82 | 0.22 | 83 | 0.217 |
| : | : | : | : | : |

FIG. 9

| n | Z=6n+1 | | Z=6n+2 | |
|---|---|---|---|---|
| | Z | STEP ANGLE(°) | Z | STEP ANGLE(°) |
| 1 | 7 | 4.285 | 8 | 3.75 |
| 2 | 13 | 2.307 | 14 | 2.142 |
| 3 | 19 | 1.579 | 20 | 1.5 |
| 4 | 25 | 1.2 | 26 | 1.153 |
| 5 | 31 | 0.967 | 32 | 0.937 |
| 6 | 37 | 0.81 | 38 | 0.789 |
| 7 | 43 | 0.697 | 44 | 0.681 |
| 8 | 49 | 0.576 | 50 | 0.6 |
| ⋮ | ⋮ | ⋮ | ⋮ | ⋮ |

FIG. 18

| n | Z=12n+2 | | Z=12n+4 | |
|---|---|---|---|---|
| | Z | STEP ANGLE(°) | Z | STEP ANGLE(°) |
| 1 | 14 | 2.142 | 16 | 1.875 |
| 2 | 26 | 1.153 | 28 | 1.071 |
| 3 | 38 | 0.789 | 40 | 0.75 |
| 4 | 50 | 0.6 | 52 | 0.576 |
| 5 | 62 | 0.483 | 64 | 0.468 |
| 6 | 72 | 0.405 | 76 | 0.394 |
| 7 | 86 | 0.348 | 88 | 0.341 |
| 8 | 98 | 0.306 | 100 | 0.3 |
| ⋮ | ⋮ | ⋮ | ⋮ | ⋮ |

FIG. 25

| n | Z=10n+2 | | Z=10n+3 | |
|---|---|---|---|---|
| | Z | STEP ANGLE(°) | Z | STEP ANGLE(°) |
| 1 | 12 | 1.5 | 13 | 1.384 |
| 2 | 22 | 0.818 | 23 | 0.782 |
| 3 | 32 | 0.562 | 33 | 0.545 |
| 4 | 42 | 0.428 | 43 | 0.418 |
| 5 | 52 | 0.346 | 53 | 0.34 |
| 6 | 62 | 0.29 | 63 | 0.286 |
| 7 | 72 | 0.25 | 73 | 0.247 |
| 8 | 82 | 0.22 | 83 | 0.217 |
| ⋮ | ⋮ | ⋮ | ⋮ | ⋮ |

FIG. 33

| n | Z=20n+4 | | Z=20n+6 | |
|---|---|---|---|---|
| | Z | STEP ANGLE(°) | Z | STEP ANGLE(°) |
| 1 | 24 | 0.75 | 26 | 0.692 |
| 2 | 44 | 0.409 | 46 | 0.391 |
| 3 | 64 | 0.281 | 66 | 0.272 |
| 4 | 84 | 0.214 | 86 | 0.209 |
| 5 | 104 | 0.173 | 106 | 0.169 |
| 6 | 124 | 0.145 | 126 | 0.143 |
| 7 | 144 | 0.125 | 146 | 0.123 |
| 8 | 164 | 0.109 | 166 | 0.108 |
| ⋮ | ⋮ | ⋮ | ⋮ | ⋮ |

HYBRID STEPPING MOTOR

BACKGROUND OF THE INVENTION

1. The Field of the Invention

The present invention relates to a construction of a rotating electric machine. Particularly, the present invention relates to an improvement of a high-resolution and high-accuracy hybrid stepping motor of an outer rotor type or an inner rotor type that is suitable for OA equipment, which requires accurate positioning during high speed operation, such as a printer, a high speed facsimile or a PPC copying machine.

2. Prior Art

The hybrid stepping motor that is a combination of a permanent magnet stepping motor and a variable reluctance stepping motor provides high accuracy, large torque and little step angle. For example, a conventional hybrid stepping motor of an inner rotor type (a motor for short in the following description) has the construction as shown in FIGS. 35 and 36.

FIG. 35 is a longitudinal sectional front view of one example of this kind of conventional motor, and FIG. 36 is a sectional view of FIG. 35 along XXXVI—XXXVI line.

In FIGS. 35 and 36, a symbol 21 represents a cylindrical casing and the casing 21 is integrally fixed to a stator iron-core 22 formed of magnetic material. A predetermined number of magnetic poles 23 corresponding to construction characteristic of this motor are centripetally formed around the inner circumference of the stator iron core 22 at equal pitches. A winding 24 to magnetize the magnetic pole 23 is wound around each of the magnetic poles 23.

Further, pole teeth 23a whose number corresponds to the construction characteristic of this motor are formed on a tip of each magnetic pole 23 at equal pitches.

In general, the stator iron-core 22 and the magnetic pole 23 are manufactured by punching a magnetic material plate with a punch press. A predetermined number of the punched plates are stacked and the winding 24 is wound to shape a stator.

End plates 25 and 26 are integrally connected to both ends of the casing 21.

A pair of bearings 27a and 27b are mounted on the center of the end plates 25 and 26, which rotatably support a rotor axis 28.

A permanent magnet 29 that is magnetized in the axial direction is engaged and fixed to the rotor axis 28. The permanent magnet 29 is sandwiched between two rotor magnetic poles 30A and 30B having disc shapes. Around an outer circumference of each of the rotator magnetic poles 30A and 30B, pole teeth 30a are formed such that the shapes and the intervals thereof correspond to that of the pole teeth 23a formed on the magnetic pole 23 of the stator. The first and second rotor magnetic poles 30A and 30B are engaged such that the pole teeth 30a of the first rotor magnetic pole 30A and the pole teeth 30a of the second rotor magnetic pole 30B are deviated by ½ pitch.

In general, the magnetic pole of the rotor is manufactured by punching a magnetic material plate with a punch press. A predetermined number of the punched plates are stacked to shape a rotor.

In the motor having the above described configuration, when the windings 24 of the stator are sequentially energized in the predetermined order, each of the pole teeth 23a of the stator are magnetized in sequence. Accordingly, the rotor rotates and stops as the magnetic field caused by the magnetized pole teeth 23a of the stator varies according to the interaction between the respective pole teeth 23a of the stator and the respective pole teeth 30a of the rotor that are magnetized by the permanent magnet 29.

Number of the magnetic poles 23 of the stator, number of the pole tooth 23a and number of the pole teeth 30a of the rotor vary depending on conditions such as number of phase of the motor.

FIG. 37 shows a connection example of a conventional 6-phase motor with monofier (unifier) windings and twelve lead lines drawn therefrom.

The numbers applied to the upper portion of the drawing represent the magnetic pole windings, assuming that the predetermined magnetic pole winding is referred to as 1E and the next one is referred to as the next number in order until the number reaches 24E.

The connection for each magnetic pole winding is shown in FIG. 37. The magnetic pole windings 1E, 7E, 13E and 19E are connected in series between the lead lines A and A' such that the magnetic pole windings 1E, 13E are in opposite phase to the magnetic pole windings 7E, 19E. The magnetic pole windings 2E, 8E, 14E and 20E are connected in series between the lead lines B and B' such that the magnetic pole windings 2E, 14E are in opposite phase to the magnetic pole windings 8E, 20E. The magnetic pole windings 3E, 9E, 15E and 21E are connected in series between the lead lines C and C' such that the magnetic pole windings 3E, 15E are in opposite phase to the magnetic pole windings 9E, 21E. The magnetic pole windings 4E, 10E, 16E and 22E are connected in series between the lead lines D and D' such that the magnetic pole windings 4E, 16E are in opposite phase to the magnetic pole windings 10E, 22E. The magnetic pole windings 5E, 11E, 17E and 23E are connected in series between the lead lines E and E' such that the magnetic pole windings 5E, 17E are in opposite phase to the magnetic pole windings 11E, 23E. The magnetic pole windings 6E, 12E, 18E and 24E are connected in series between the lead lines F and F' such that the magnetic pole windings 6E, 18E are in opposite phase to the magnetic pole windings 12E, 24E.

An excitation electric current is sequentially applied to the respective lead lines.

FIG. 38 shows an example of an excitation sequence of one-phase excitation for the connection shown in FIG. 37.

In FIG. 38, the symbols of the lead lines shown in FIG. 37 to which an exciting current is applied are shown in the vertical direction and the excitation steps are shown at the upper portion in the horizontal direction. The rectangles above the respective lines in the horizontal direction represent that an electric current passes through the lead lines in the predetermined direction, and the rectangles below the respective lines represent that an electric current passes through the lead lines in the opposite direction.

In the drawing, an electric current passes from the lead line A shown in FIG. 37 to the lead line A' at step 1, and, at the next step 2, an electric current passes from the lead line B to the lead line B'. After that, an electric current flows step by step until step 6, and an electric current passes in a direction from the lead line A' to the lead line A at step 7. Then, an electric current is applied to each lead line in the same manner to excite each magnetic pole of the stator in turn.

Accordingly, since magnetic polarity of each magnetic pole of the stator varies, the magnetic pole of the stator attracts the corresponding magnetic pole (pole teeth) of the rotor, which rotates the rotor axis 28 of the motor.

Further, FIG. 39 shows an example of a connection of windings in a conventional 10-phase motor with a monofier (unifier) winding, and FIG. 40 shows an example of an excitation sequence of one-phase excitation for the 10-phase motor with monofier winding shown in FIG. 39. How to read is the same as FIGS. 37 and 38 that are described above.

A step angle $\theta_s$, which is a basic characteristic of the above described stepping motor, is determined by the following equation (1).

$$\theta_s = 180°/(M \times Z) \quad (1)$$

Where M is phase number of the stator and Z is number of pole teeth of the rotor.

The above described inner rotor motor is constructed such that the rotor is located at the center of the motor and the stator is arranged around thereof. On the other hand, an outer rotor motor is constructed such that the stator is located at the center of the motor and the rotor is arranged around thereof. As a result, the structure of the rotating mechanism of the outer rotor motor is different from that of the inner rotor motor, while the basic construction to generate a torque of the outer rotor motor is similar to that of the inner rotor motor.

FIG. 41 is a vertical sectional view of the outer rotor motor and FIG. 42 is a sectional view along XXXXII—XXXXII line of FIG. 41. FIGS. 41 and 42 correspond to FIGS. 35 and 36 that show the inner rotor motor, respectively. In FIGS. 41 and 42, a symbol 101 represents a cylindrical stator support that is supported by a fixing member (not shown). A symbol 102 represents a stator iron-core that is fixed to the stator support 101, and a plurality of stator magnetic poles 102a are arranged around the stator iron-core 102. Pole teeth 102b are formed on a circumference of this stator magnetic pole 102a. A symbol 103 represents a winding that is wound around each magnetic pole 102a.

In FIG. 42, the windings 103 are illustrated in schematic forms and a symbol "x" located in the winding means that an electric current passes from the front side of the sheet to the back side and a symbol "·" means that an electric current passes from the back side to the front side.

A symbol 104 represents a rotor casing that consists of an annular portion 104a and a side plane portion 104b. A symbol 105 represents a rotor axis whose one end is fixed to the center of inner side of the side plane portion 104b of the rotor casing 104, and it is rotatably supported by the inner circumference of the stator support 101 through a bearing 106. A symbol 107 represents a permanent magnet, and rotor magnetic pole 108a, 108b are connected to the both side surfaces thereof. On the internal circumferences of the rotor magnetic poles 108a and 108b, pole teeth 108c and 108d, which are deviated in ½ pitch of phase, are formed at the positions facing pole teeth 102b of the stator magnetic pole 102a.

In the following description, the respective embodiments are explained as inner rotor motors and outer rotor motors will not be described because they can be accomplished according to the description of the inner rotor motors.

The U.S. Pat. No. 3,206,623 discloses an electric synchronous inductor motor.

The electric synchronous inductor motor disclosed in the patent includes a pair of stators having identical construction and a pair of rotors having identical construction. Each stator is the circular electrode structure that is provided with magnetic poles that are centripetally formed in an inward direction. Each magnetic pole has pole teeth formed at equal pitches on the tip end thereof. The magnetic poles are wound by windings. Each rotor consists of a permanent magnet that is magnetized in the axial direction and a pair of end caps (magnetic pole plates) arranged at both sides of the permanent magnet. The end cap is provided with pole teeth around the outer circumference. The permanent magnet and the end caps are connected to a rotor axis. Magnetic coupling between the rotors is shielded. The pole teeth of one end cap are deviated from the pole teeth of the other end cap by ½ pitch of the pole teeth.

The above described step angle $\theta_s$ is a rotation angle when the windings of one phase are excited by applying power in sequence, and it is determined by the motor construction.

Accordingly, it is necessary to minimize the step angle to obtain a motor having high resolution and a good control performance.

Incidentally, since the step angle $\theta_s$ of the conventional motor (hybrid stepping motor) is represented by the above equation (1), the phase number M or the number of pole teeth Z of the rotor must be larger to minimize the step angle $\theta_s$. For example, when the number of pole teeth equals 50, the step angle of the 2-phase motor (hybrid stepping motor) becomes $$\theta_s = 180°/2 \times 50 = 1.8°,$$

the step angle of the 3-phase motor becomes $$\theta_s = 180°/3 \times 50 = 1.2°, \text{ and}$$

the step angle of the 5-phase motor becomes $$\theta_s = 180°/5 \times 50 = 0.72°.$$

Incidentally, since a rotor is formed by a punch press in general as described above, the number of pole teeth of the rotor is determined by a manufacturing technology such as an accuracy of the punch press. Accordingly, since the number of pole teeth is limited by the manufacturing technology, the upper limit is about 100.

Further, when the phase number increases, a 6-phase motor requires 24 stator magnetic poles and a 10-phase motor requires 40 stator magnetic poles. Since the slot area becomes smaller as the number of magnetic pole becomes larger, there is a problem that a cross-section area of a winding, i.e., quantity of cooper becomes small to obtain a small motor. Further, there is a problem that a manufacturing cost becomes higher because a complicated work is required in a winding process and the number of man-hours increases.

Accordingly, a 5-phase motor was a upper limit on practical use of a small hybrid stepping motor. The step angle $\theta_s$ (resolution) of a 5-phase motor becomes $$\theta_s = 180°/5 \times 100 = 0.36°,$$

according to the equation (1) when the number of pole teeth equals 100.

A micro-step driving is needed to get a resolution smaller than 0.36 degrees. However, since the stop position of the rotor is determined by the relative values of electric current applied to the respective phases under the micro-step driving, it was difficult to improve the accuracy of the resolution due to variation of the values of electric current applied to the respective phases, variation of characteristics of switching elements, or the like. Further, since a complicated drive circuit was need for the micro-step driving, there was a problem that the cost rises.

Further, the electric synchronous inductor motor disclosed in the U.S. Pat. No. 3,206,623 consists of two motor constructions connected in the axial direction each of which includes a stator and a rotor whose constructions are similar to the conventional stepping motor as shown in FIGS. 35 and 36 in order to obtain double the torque of the conventional electric synchronous inductor motor. The motor employing this technique can be driven by pulse power as well as a stepping motor, while it cannot rotate accurately because of the low resolution.

In the above description, while the problems of the inner rotor stepping motor are described, there are the same problems for an outer rotor stepping motor.

Furthermore, there was not the appropriate operational expression that decides the number of pole teeth of a rotor for the conventional hybrid stepping motor of inner rotor type or outer rotor type. As a result, since not all motors have desired performance, the manufacturing yield was inadequate.

SUMMARY OF THE INVENTION

An object of the present invention is to solve the above described problems of the conventional motor. That is, the object of the present invention is to increase a phase number without increasing a number of magnetic poles and thereby to provide a high-resolution and high-accuracy motor (a stepping motor) without increasing the size of the motor and without forming a complicated driving circuit on condition that a number of pole teeth of a rotor is determined by a specific relationship with numbers of the phase and the magnetic poles of a stator.

An inner rotor hybrid stepping motor of 6-phase/6 m-pole type according to the present invention described in claim 1 comprises: a stator comprising an annular magnetic substance, 6 m pieces of stator magnetic poles that are centripetally formed around the inner circumferential surface of said annular magnetic substance toward the center at equal pitches and each stator magnetic pole having a plurality of pole teeth formed on the inner tip end thereof at equal pitches, and excitation windings being wound around said stator magnetic poles; a rotor, which is rotatably supported by said stator through a predetermined air gap with respect to the inner circumferential surface of said stator pole teeth, having a cylindrical permanent magnet magnetized in an axial direction that is sandwiched between a pair of rotor magnetic poles each having rotor pole teeth corresponding to said stator pole teeth;

wherein said stator magnetic poles include first magnetic poles whose pole teeth formed on the inner tip ends are line-symmetric with respect to the shape of said magnetic poles and second magnetic poles whose pole teeth are formed on the inner tip ends at the same pitches and the same number as said pole teeth of said first magnetic poles and said pole teeth of the second magnetic poles are deviated from the pole teeth of said first magnetic poles by ¼ pitch in the same circumferential direction, said first and second magnetic poles are alternatively arranged in the circumferential direction, and said stator containing said first and second magnetic poles is divided into a first stator portion and a second stator portion that are arranged in the axial direction, and said first and second magnetic poles of said first stator portion are connected to said second and first magnetic poles of said second stator portion, respectively, in the axial direction, while said first and second stator portions are inverted in the front and back in the circumferential direction;

wherein said rotor includes first and second rotor units that face the inner circumferential surfaces of pole teeth of said first and second stator portions with said air gap, each of said first and second rotor units is provided with a permanent magnet magnetized in the axial direction that is sandwiched between coaxial first and second rotor magnetic poles, said first and second rotor magnetic poles have rotor pole teeth around the outer circumferential surface thereof, the number of said rotor pole teeth corresponds to that of said stator pole teeth, said first rotor magnetic pole is deviated from said second rotor magnetic pole by ½ of the rotor teeth pitch, and said first and second rotor units are connected in the axial direction through a non-magnetic material member such that they are deviated from each other by ¼ of the rotor teeth pitch;

and wherein the number of said rotor pole teeth Z satisfies the following condition (2);

$$Z=m(6n+1) \text{ or } Z=m(6n+2) \quad (2)$$

where m and n are integers equal to or larger than 1.

Further, in the invention described in claim 2, 6-phase/6 m-pole type of claim 1 is replaced with 10-phase/10 m-pole type and the following condition (3) is satisfied;

$$Z=m(10n+2) \text{ or } Z=m(10n+3) \quad (3)$$

where m and n are integers equal to or larger than 1.

Further, the outer rotor hybrid stepping motors of claims 3 and 4 are constructed that the rotors of the inner rotor hybrid stepping motors of claims 1 and 2 are arranged outside the cylindrical stators, respectively.

Further, the inner rotor or outer rotor hybrid stepping motor of claim 5 is characterized in that each stator comprises a predetermined number of stacked magnetic material plates each of which has h/2 pieces of magnetic poles whose pole teeth formed on the tip ends are line-symmetric with respect to the shape of said magnetic poles of a predetermined size and h/2 pieces of magnetic poles whose pole teeth are deviated by ¼ of the pole teeth pitch in the same circumferential direction that are alternatively arranged; a predetermined number of stacked magnetic material plates having the same constructions as said magnetic material plates that are rotated by 180/h degrees, said stacked elements are fixed to each other; and windings that are wound around said magnetic poles. Where h equals 6 m or 10 m and m is an integer equals to or larger than 1.

Further, the inner rotor or outer rotor hybrid stepping motor of claim 6 is characterized in that said stator pole teeth pitch τS and said rotor pole teeth pitch τR satisfy the following condition (4):

$$0.75 \ \tau R \leq \tau S \leq 1.25 \ \tau R \quad (4)$$

BRIEF DESCRIPTION OF THE DRAWINGS

FIG. 4A is a perspective view of a predetermined magnetic pole portion, FIG. 4B is a perspective view of a magnetic pole portion next to the magnetic pole portion of FIG. 4A;

FIG. 9 is a table showing a relationship between the number of the rotor pole teeth and the step angle according to the first embodiment;

FIG. 16A is a perspective view of a predetermined magnetic pole portion, FIG. 16B is a perspective view of a magnetic pole portion next to the magnetic pole portion of FIG. 16A;

FIG. 18 is a table showing a relationship between the number of the rotor pole teeth and the step angle according to the second embodiment;

FIG. 23A is a perspective view of a predetermined magnetic pole portion, FIG. 23B is a perspective view of a magnetic pole portion next to the magnetic pole portion of FIG. 23A;

FIG. 25 is a table showing a relationship between the number of rotor pole teeth and the step angle according to the third embodiment;

FIG. 31A is a perspective view of a predetermined magnetic pole portion, FIG. 31B is a perspective view of a magnetic pole portion next to the magnetic pole portion of FIG. 31A;

FIG. 33 is a table showing a relationship between the number of rotor pole teeth and the step angle according to the fourth embodiment;

DESCRIPTION OF THE PREFERRED EMBODIMENTS

Embodiments of the present invention will be described in detail with reference to the drawings.

Figure 35:
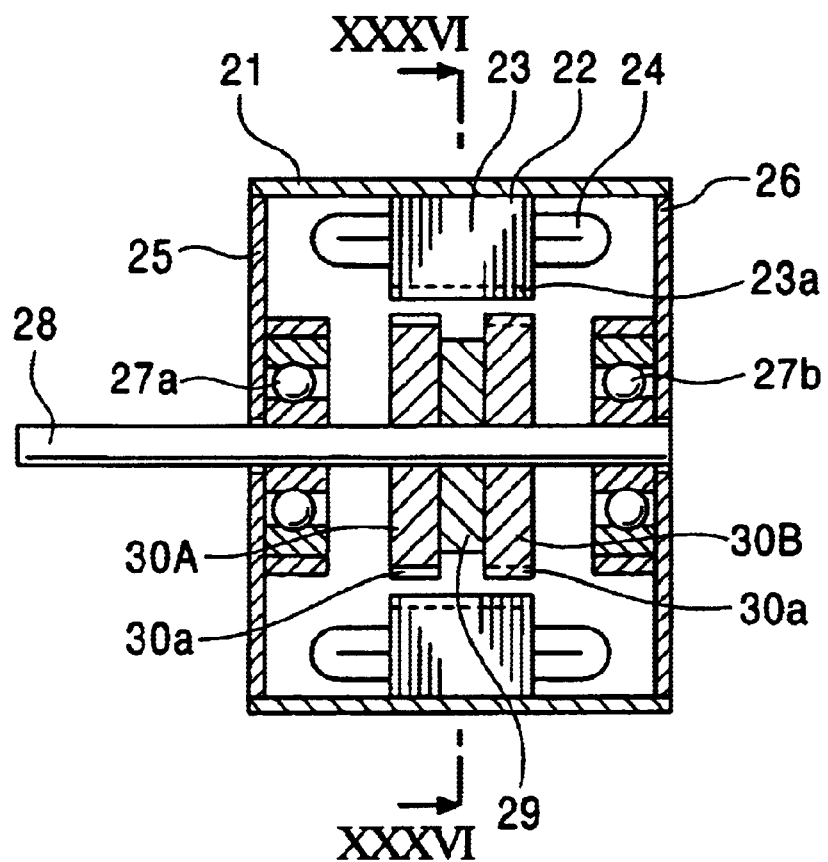
FIG. 35 is a longitudinal sectional front view of a conventional inner rotor hybrid stepping motor.
Figure 36:
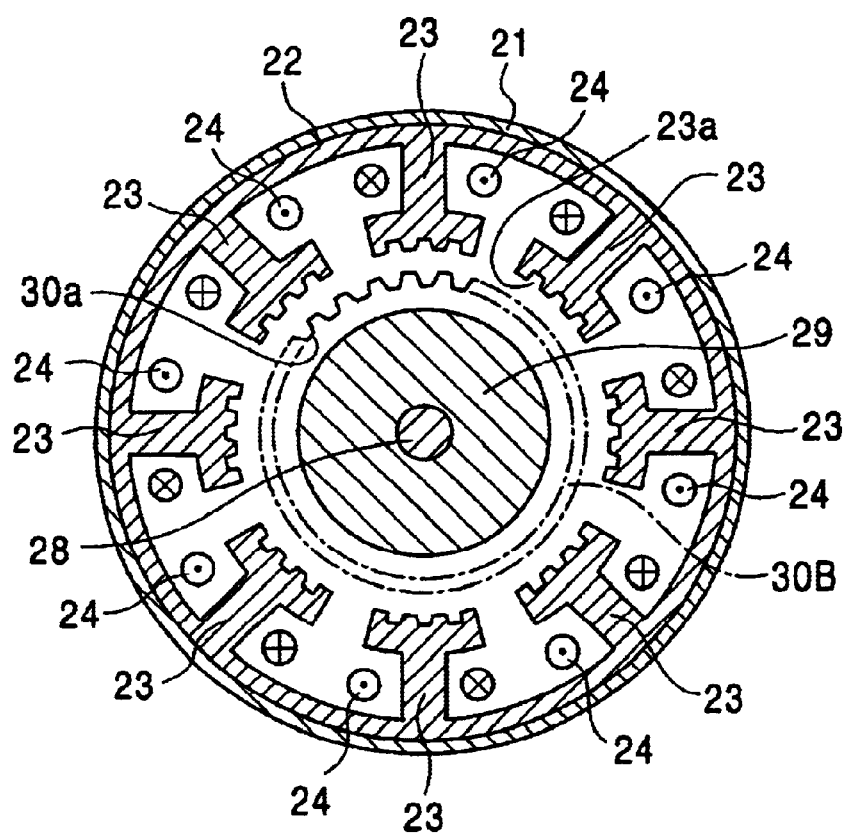
FIG. 36 is a sectional view of FIG. 35 along XXXVI—XXXVI line.
Figure 37:
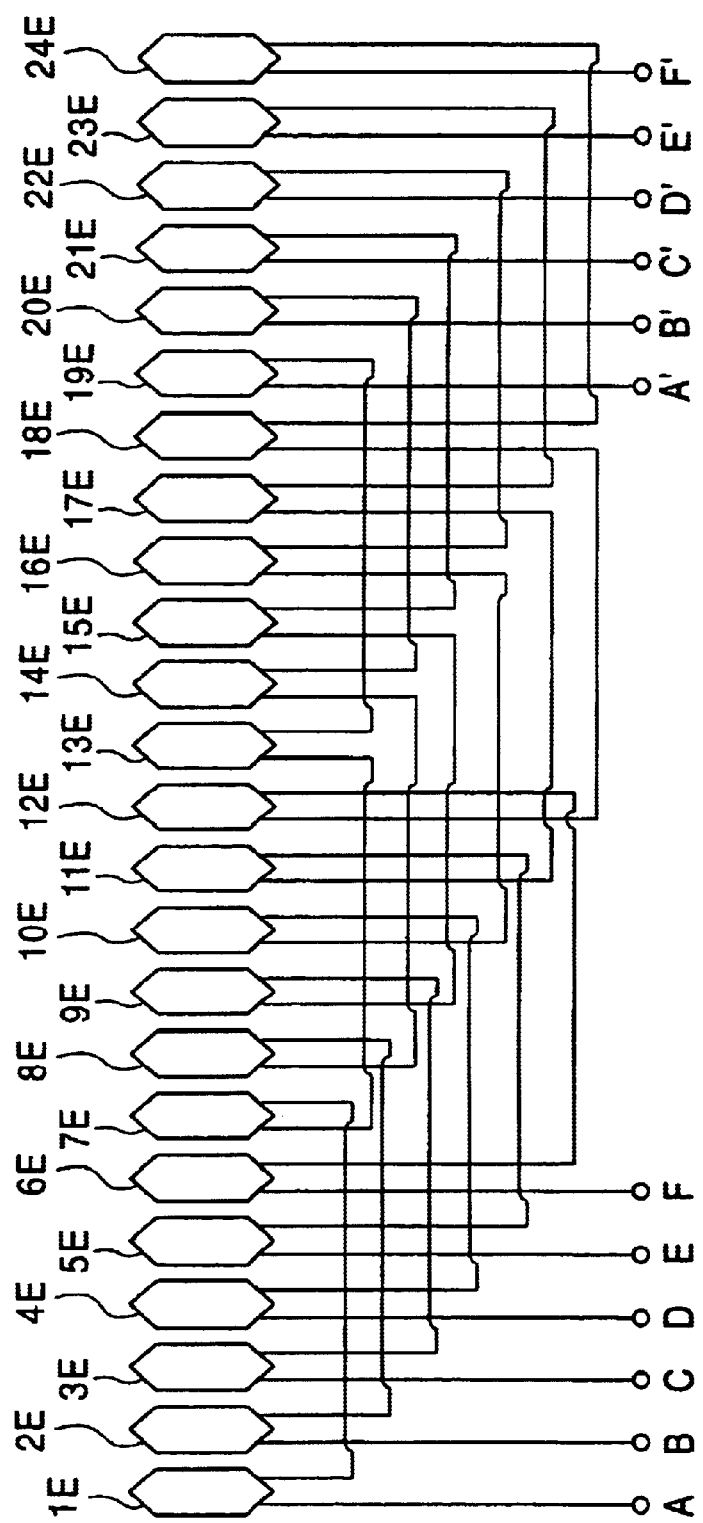
FIG. 37 is a connection diagram of a conventional 6-phase inner rotor stepping motor with monofier windings.
Figure 38:
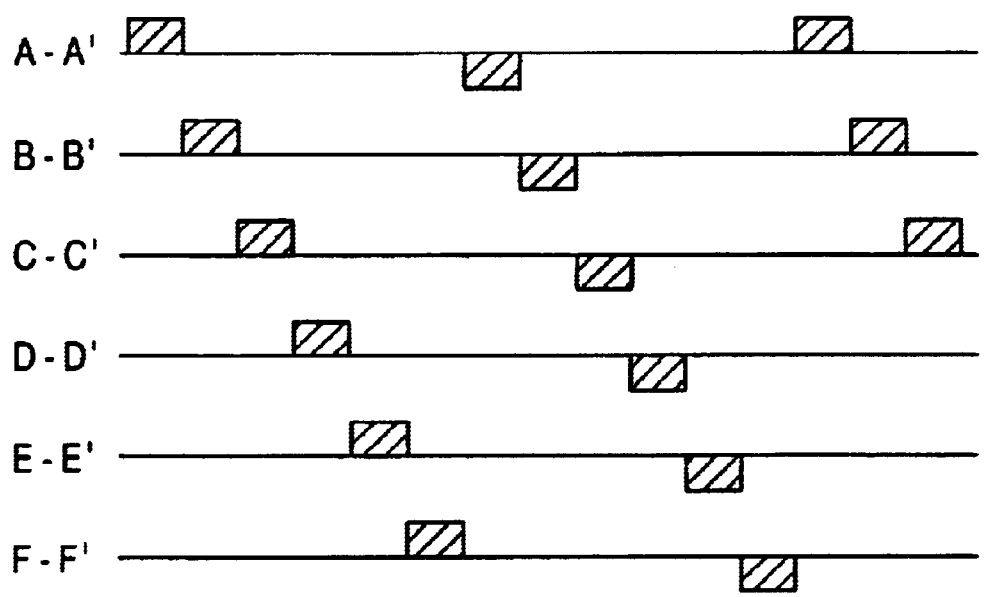
FIG. 38 is an excitation sequence diagram of one-phase excitation for the conventional 6-phase inner rotor stepping motor with monofier windings.
Figure 39:
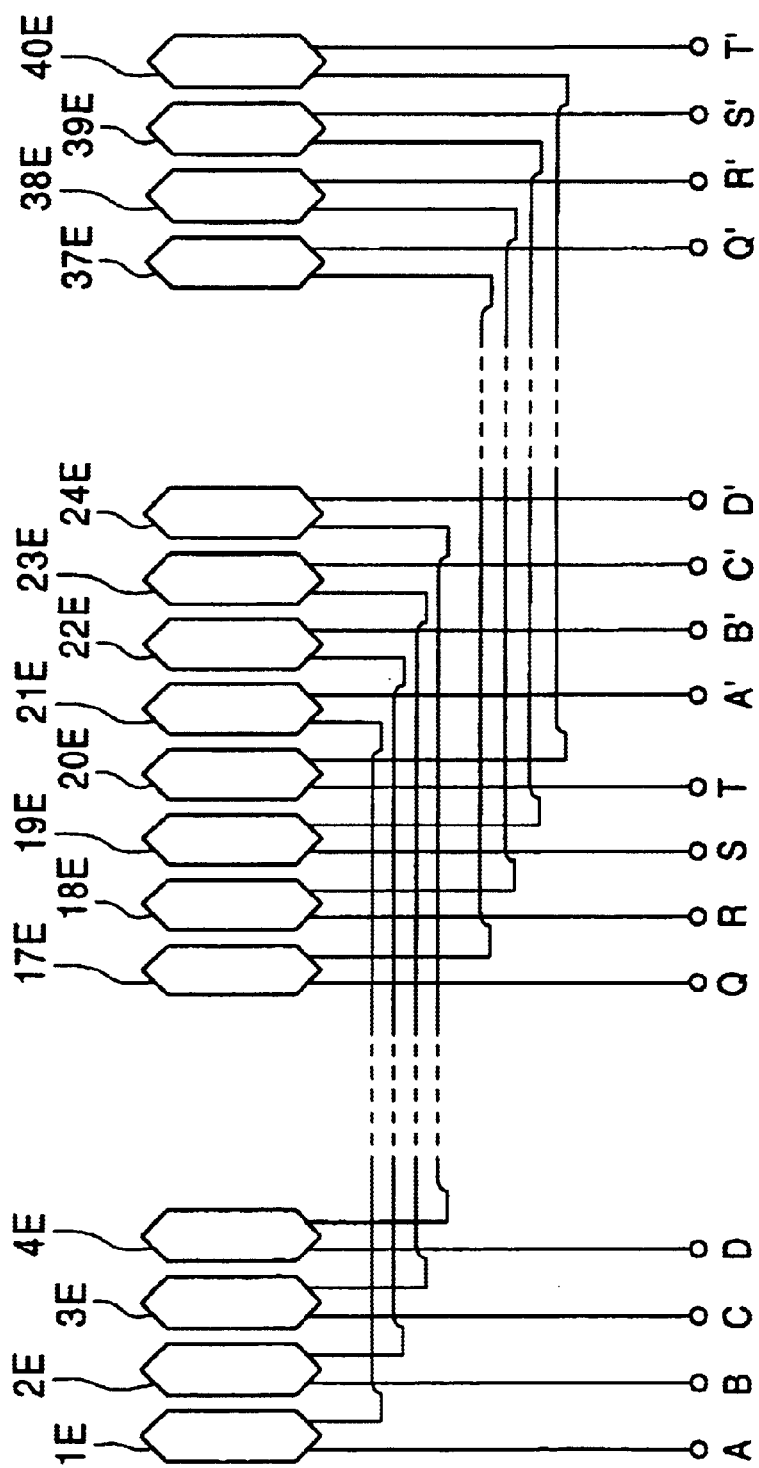
FIG. 39 is a connection diagram of a conventional 10-phase inner rotor stepping motor with monofier windings.
Figure 40:
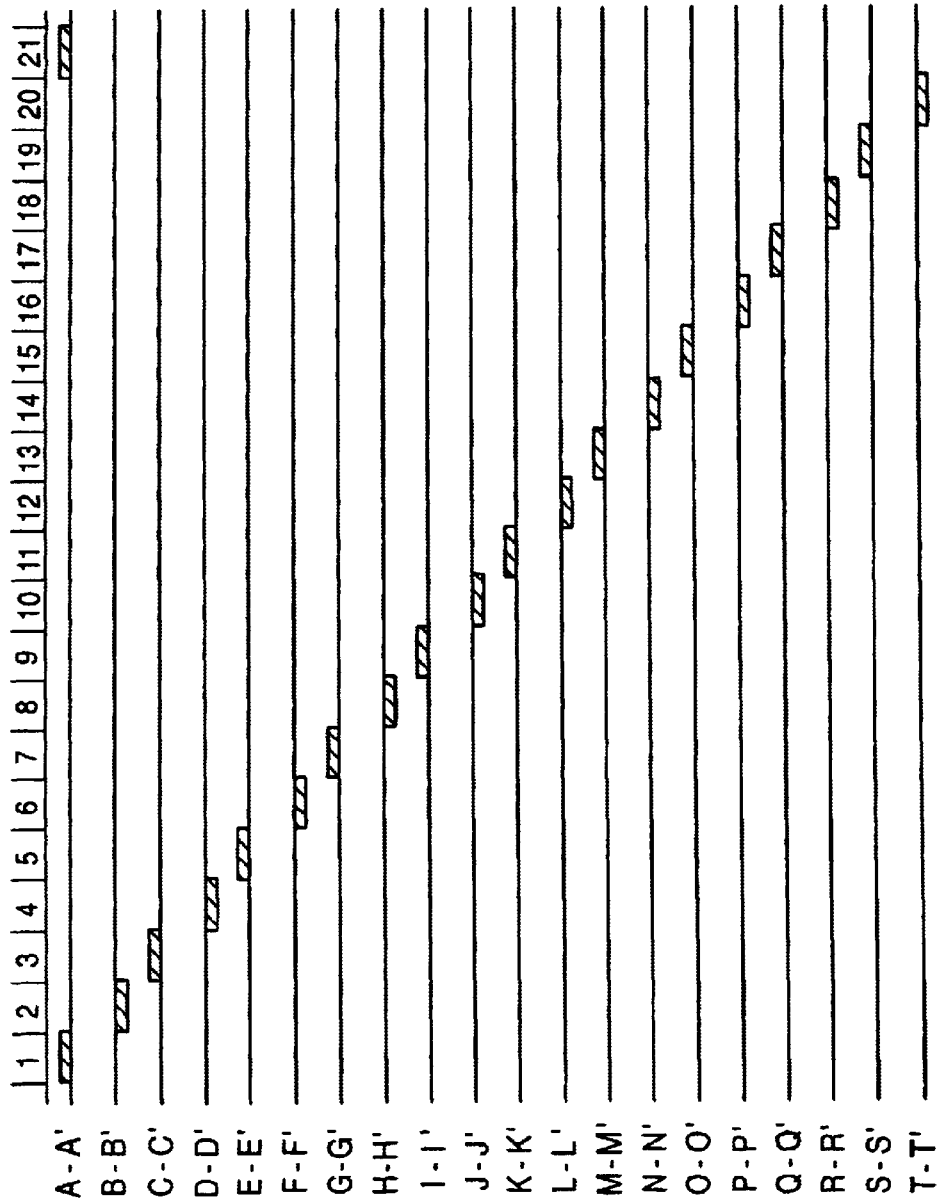
FIG. 40 is an excitation sequence diagram of one-phase excitation for the conventional 10-phase inner rotor stepping motor with monofier windings.
Figure 41:
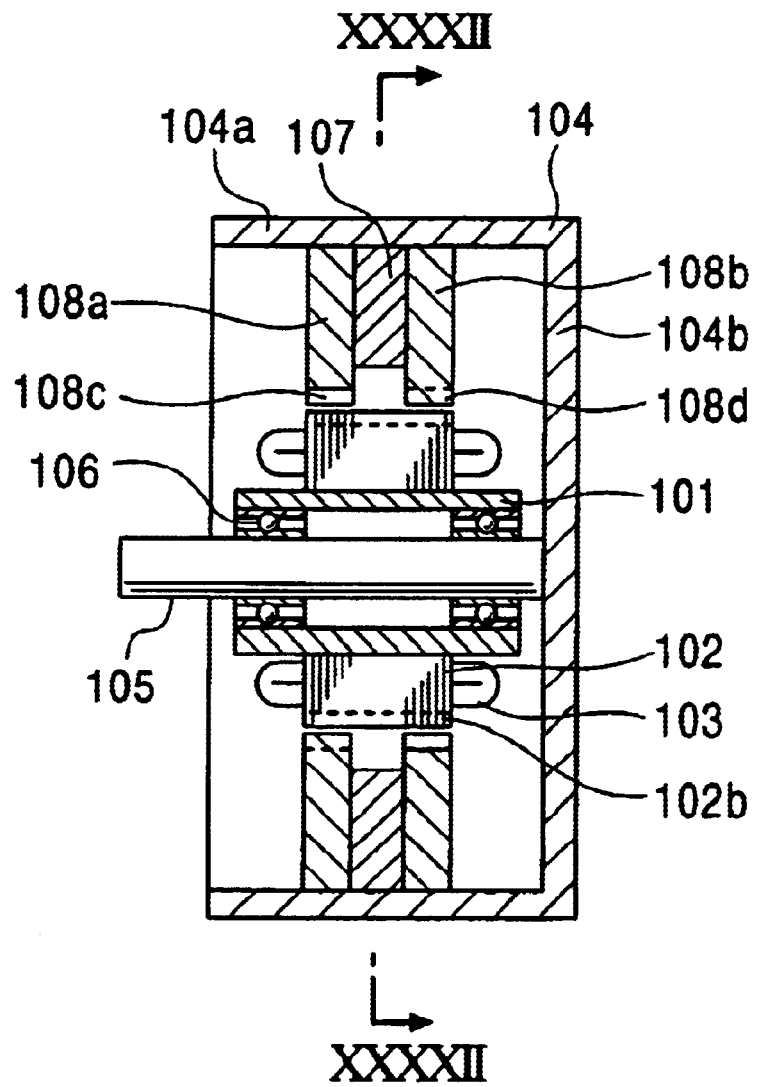
FIG. 41 is a longitudinal sectional front view of a conventional outer rotor hybrid stepping motor.
Figure 42:
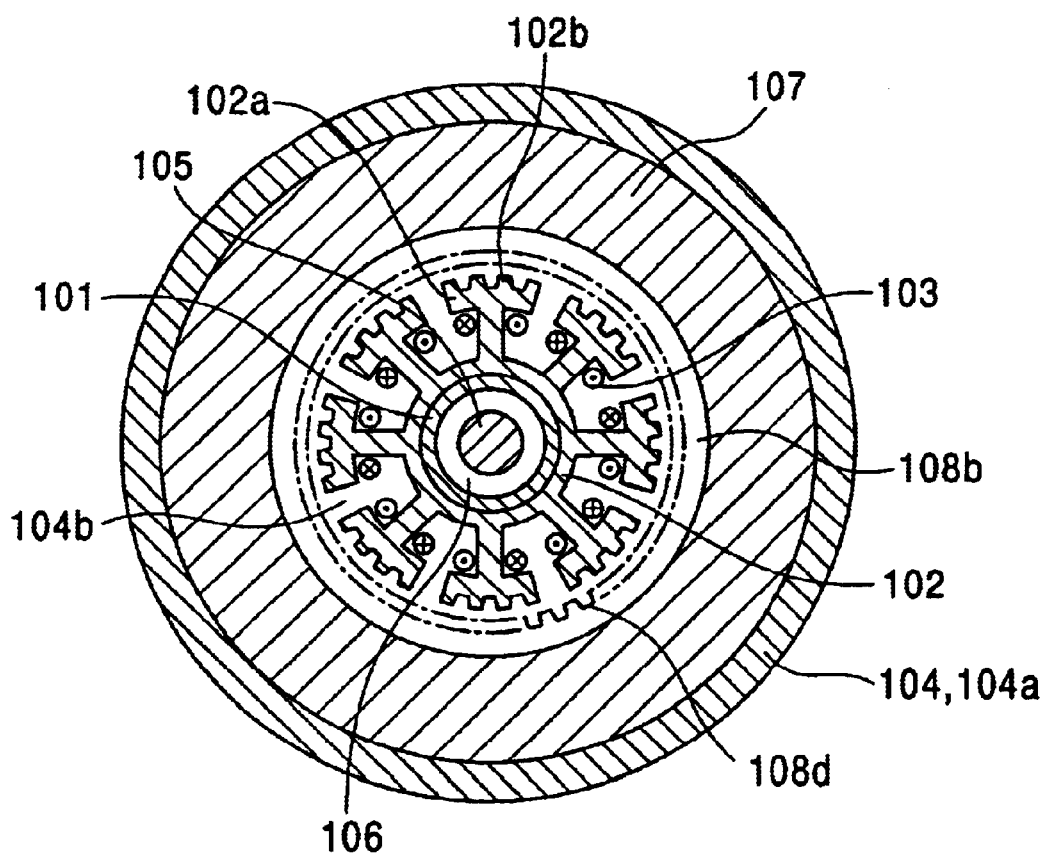
FIG. 42 is a sectional view of FIG. 41 along XXXXII—XXXXII line.

In the construction drawings of the respective embodiment, the construction elements corresponding to the elements of the prior art shown in FIGS. 35 and 36 have the same reference numbers and will not be described in detail.

First Embodiment

Figure 1:
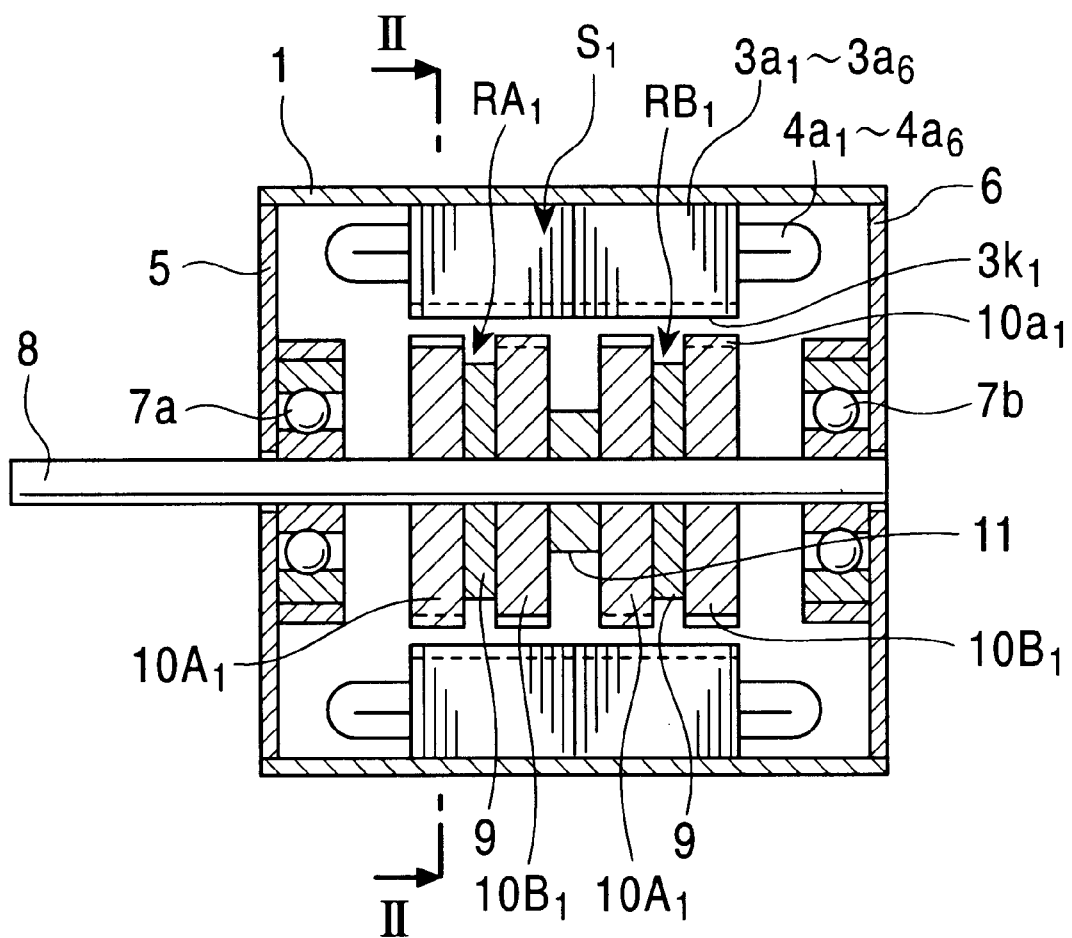
FIG. 1 is a longitudinal sectional front view of a first embodiment (a 6-phase/6-pole inner rotor hybrid stepping motor) of the present invention.
Figure 2:
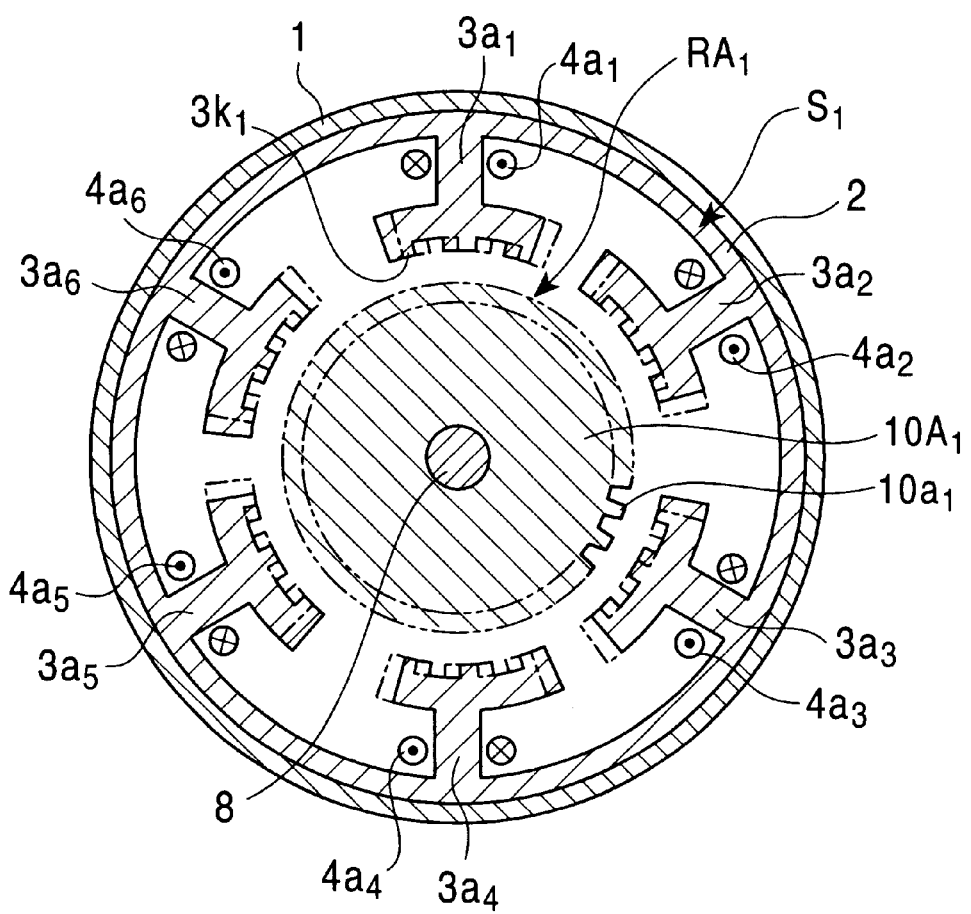
FIG. 2 is a sectional view of FIG. 1 along II—II line.

FIG. 1 is a longitudinal sectional front view of a 6-phase/6-pole motor (an inner rotor hybrid stepping motor) formed according to the present invention and FIG. 2 is a sectional view of FIG. 1 along II—II line.

In FIGS. 1 and 2, a reference number 1 is a cylindrical casing, a stator iron-core 2 of a stator $S_1$ is integrally connected in the inner circumferential surface of the casing. Six magnetic poles $3a_1$ to $3a_6$ corresponding to construction characteristic of this motor are centripetally formed around the inner circumference of the stator iron core 2 of the stator $S_1$ at equal pitches. Windings $4a_1$ to $4a_6$, which magnetize the magnetic poles $3a_1$ to $3a_6$ in a predetermined direction in sequence by the passage of an electric current as described below in detail, are wound around the magnetic poles $3a_1$ to $3a_6$, respectively.

In FIG. 2, the windings $4a_1$ to $4a_6$ are illustrated in schematic forms and a symbol "x" located in the winding means that an electric current passes from the front side of the sheet to the back side and a symbol "·" means that an electric current passes from the back side to the front side.

Further, on the tip ends of the respective magnetic poles $3a_1$ to $3a_6$, pole teeth $3k_1$ that are line-symmetric with respect to a center line of the magnetic pole and pole teeth $3k_1$ that are deviated by ¼ pitch in the same direction are formed to be divided into two halves in the axial direction. The alternative three magnetic poles $3a_1$, $3a_3$ and $3a_5$ among six magnetic poles have the same shape and the other alternative three magnetic poles $3a_2$, $3a_4$ and $3a_6$ have the same shape, while the adjacent magnetic poles are formed such that the arrangement sides of two kinds of magnetic poles are inverted to each other. The angular intervals of the above described magnetic poles and pole teeth are proportional to the distances on the circumference at an appointed radius. The distance between the adjacent magnetic poles or that between the adjacent pole teeth of a circular motor varies according to the radius of the motor, while angular pitches keep constant in spite of the variation of the radius. Therefore, the interval between the magnetic poles or the like will be shown as an angle and the angular interval is referred to as a pitch in the following description.

End plates 5 and 6 are integrally connected to both sides of the casing 1.

Bearings 7a and 7b are fixed into the central parts of the end plates 5 and 6, respectively, and the bearings 7a and 7b rotatably support a rotor axis 8.

A first rotor unit $RA_1$ is connected to the rotor axis 8 at the position to face a half of the stator with a predetermined air gap with respect to the inner circumferential surface of the stator $S_1$, and a second rotor unit $RB_1$ is connected at the position to face the other half of the stator with a predetermined air gap with respect to the inner circumferential surface of the stator $S_1$. A non-magnetic substance 11 having annular shape of a predetermined width is arranged between the above described first rotor unit $RA_1$ and the second rotor unit $RB_1$.

The first rotor unit $RA_1$ and the second rotor unit $RB_1$ have the same structure, two rotor magnetic poles $10A_1$ and $10B_1$ are fixed to the rotor axis 8 to sandwich a permanent magnet 9 magnetized in the axial direction therebetween.

Pole teeth $10a_1$, which correspond to the pole teeth $3k_1$ formed on the respective magnetic poles of the stator in shape and pitch, are formed around the respective outer circumferential surfaces of the two rotor magnetic poles $10A_1$ and $10B_1$.

As described below, the first and second rotor magnetic poles $10A_1$ and $10B_1$ are connected such that the pole teeth $10a_1$ of the first rotor magnetic pole $10A_1$ is deviated from the pole teeth $10a_1$ of the second rotor magnetic pole $10B_1$ by ½ of the pitch of the rotor teeth $10a_1$, and the first and second rotor units $RA_1$ and $RB_1$ are connected with a deviation of ¼ of the pitch of the rotor teeth $10a_1$.

Figure 3:
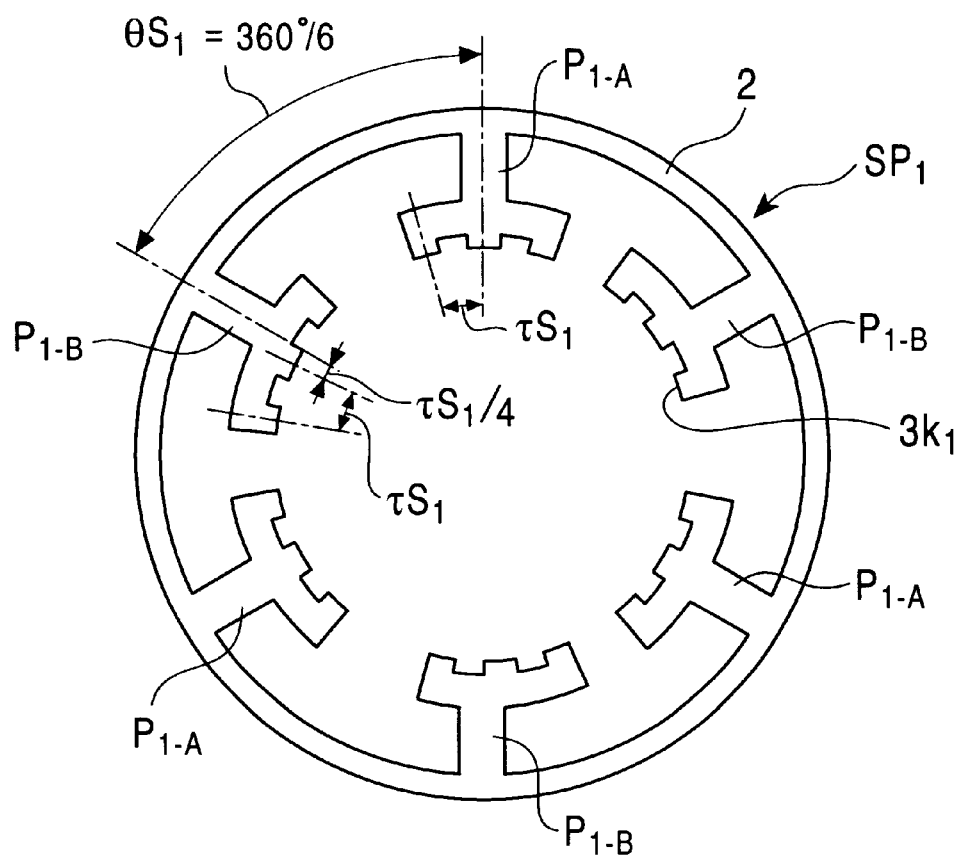
FIG. 3 is a plan view showing a shape of a magnetic material plate (a stator iron plate) to form a stator according to the first embodiment.

Next, an example of a making method of the stator will be described with reference to FIG. 3.

The stator is constructed by connecting first and second halves each of which consists of a predetermined number of annular magnetic material plates (referred to as stator iron plates in the following description) $SP_1$ shown in FIG. 3 stacked one on another. The stator iron plate $SP_1$ is provided with six magnetic poles in total centripetally formed around the inner circumference. There are two kinds of magnetic poles $P_{1-A}$ and $P_{1-B}$ that are alternatively arranged at equal pitches. The angular interval $\theta S_1$ between the adjacent magnetic poles $P_{1-A}$ and $P_{1-B}$ is equal to 360°/6, that is 60°. On the inner tip end of the magnetic pole $P_{1-A}$, a predetermined number of pole teeth $3k_1$ are formed to be line-symmetric with respect to a center line of the magnetic pole at equal pitches $\tau S_1$. On the inner tip end of the magnetic pole $P_{1-B}$, pole teeth $3k_1$ are formed at the same pitches and the same number as the pole teeth of the magnetic pole $P_{1-A}$. The pole teeth of the magnetic poles $P_{1-B}$ are deviated by ¼ of the pole teeth pitch, that is $\tau S_1/4$, in the same circumferential direction. A predetermined number of the stator iron plates are stacked so as to overlap the pole teeth to construct the first and second halves of the stator $S_1$.

The first and second halves are connected to each other such that the second half is rotationally deviated from the first half by the magnetic pole pitch, that is 60°, thereby the stator $S_1$ is constructed.

Since the stator $S_1$ is formed to face the two rotor units $RA_1$ and $RB_1$ that sandwich the non-magnetic substance 11 therebetween, the respective halves of the stator $S_1$ may be constructed by different number of the stator iron plates so long as the two halves of the stator $S_1$ reliably face the rotor units $RA_1$ and $RB_1$, respectively.

Each stator iron plate $SP_1$ may be formed by a punch press. The rotor magnetic poles $10A_1$ and $10B_1$ that constitute each rotor may be also formed by stacking a predetermined number of magnetic material plates having a predetermined shape punched by a punch press.

Structure of the magnetic pole portion of the stator formed by the above described method will be described with reference to FIGS. 4A and 4B.

Figure 4A:
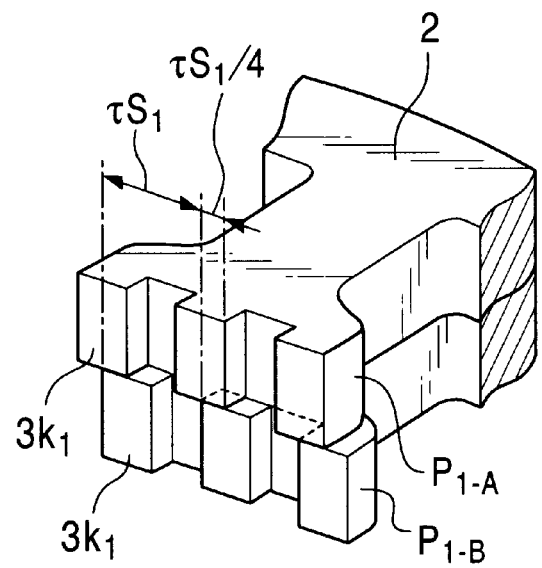
FIGS. 4A and 4B show shapes of the tip ends of magnetic poles of the stator according to the first embodiment.
Figure 4B:
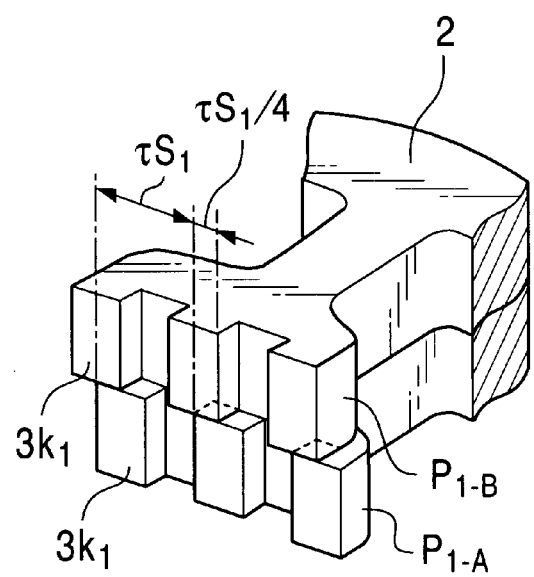

FIG. 4A shows one of the magnetic poles $3a_1$, $3a_3$, $3A_5$, and FIG. 4B shows one of the magnetic poles $3a_2$, $3a_4$, $3a_6$ that are adjacent to the magnetic poles $3a_1$, $3a_3$, $3a_5$, respectively.

Since the stator $S_1$ is formed as described above, each of the magnetic poles $3a_1$ to $3a_6$ of the stator $S_1$ shown in FIGS. 4A and 4B is formed of a half $P_{1-A}$ that has the pole teeth $3k_1$ being line-symmetric with respect to the magnetic pole and the other half $P_{1-B}$ that has the same number of the pole teeth $3k_1$ deviated by ¼ of the pole teeth pitch in the same circumferential direction.

Namely, the pole teeth of the half $P_{1-A}$ are symmetric with respect to the magnetic pole and the pole teeth of the other half $P_{1-B}$ are asymmetric about the magnetic pole.

The magnetic pole shown in FIG. 4A is provided with the half $P_{1-A}$ at the upper side in the drawings and the other half $P_{1-B}$ at the lower side, while the magnetic pole shown in FIG. 4B is provided with the half $P_{1-A}$ at the lower side and the other half $P_{1-B}$ at the upper side.

Figure 5:
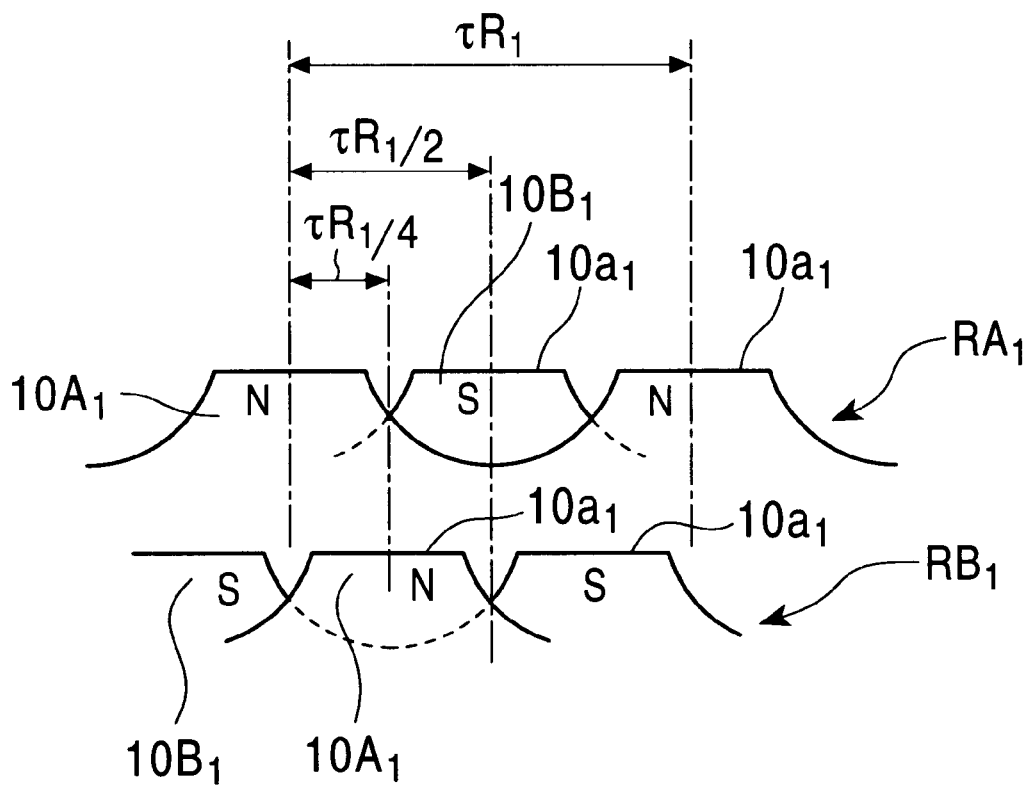
FIG. 5 is an enlarged side view showing a relationship among the pole teeth of four magnetic poles of a rotor unit that constitutes the rotor according to the first embodiment.

FIG. 5 is an enlarged side view showing a relationship among the pole teeth $10a_1$ of the rotor. In the condition shown in FIG. 5, the pole teeth $10a_1$ of the first rotor magnetic poles $10A_1$ of the first and second rotor units $RA_1$ and $RB_1$ are magnetized in N-pole, and the pole teeth $10a_1$ of the second rotor magnetic poles $10B_1$ of the first and second rotor units $RA_1$ and $RB_1$ are magnetized in S-pole due to the magnetized direction of the permanent magnet 9.

The pitches of the pole teeth $10a_1$ formed on the respective magnetic pole are constant. Assuming that the pitch is represented by $\tau R_1$, the angular interval between the pole teeth $10a_1$ of the first rotor magnetic pole $10A_1$ and the pole teeth $10a_1$ of the second rotor magnetic pole $10B_1$ is equal to $\tau R_1/2$ for both the first and second rotor units $RA_1$ and $RB_1$. The angular interval between the pole teeth $10a_1$ of the first rotor magnetic pole $10A_1$ of the first rotor unit $RA_1$ and the pole teeth $10a_1$ of the first rotor magnetic pole $10A_1$ of the second rotor unit $RB_1$, and the angular interval between the pole teeth $10a_1$ of the second rotor magnetic pole $10B_1$ of the first rotor unit $RA_1$ and the pole teeth $10a_1$ of the second rotor magnetic pole $10B_1$ of the second rotor unit $RB_1$ are equal to $\tau R_1/4$.

Figure 6:
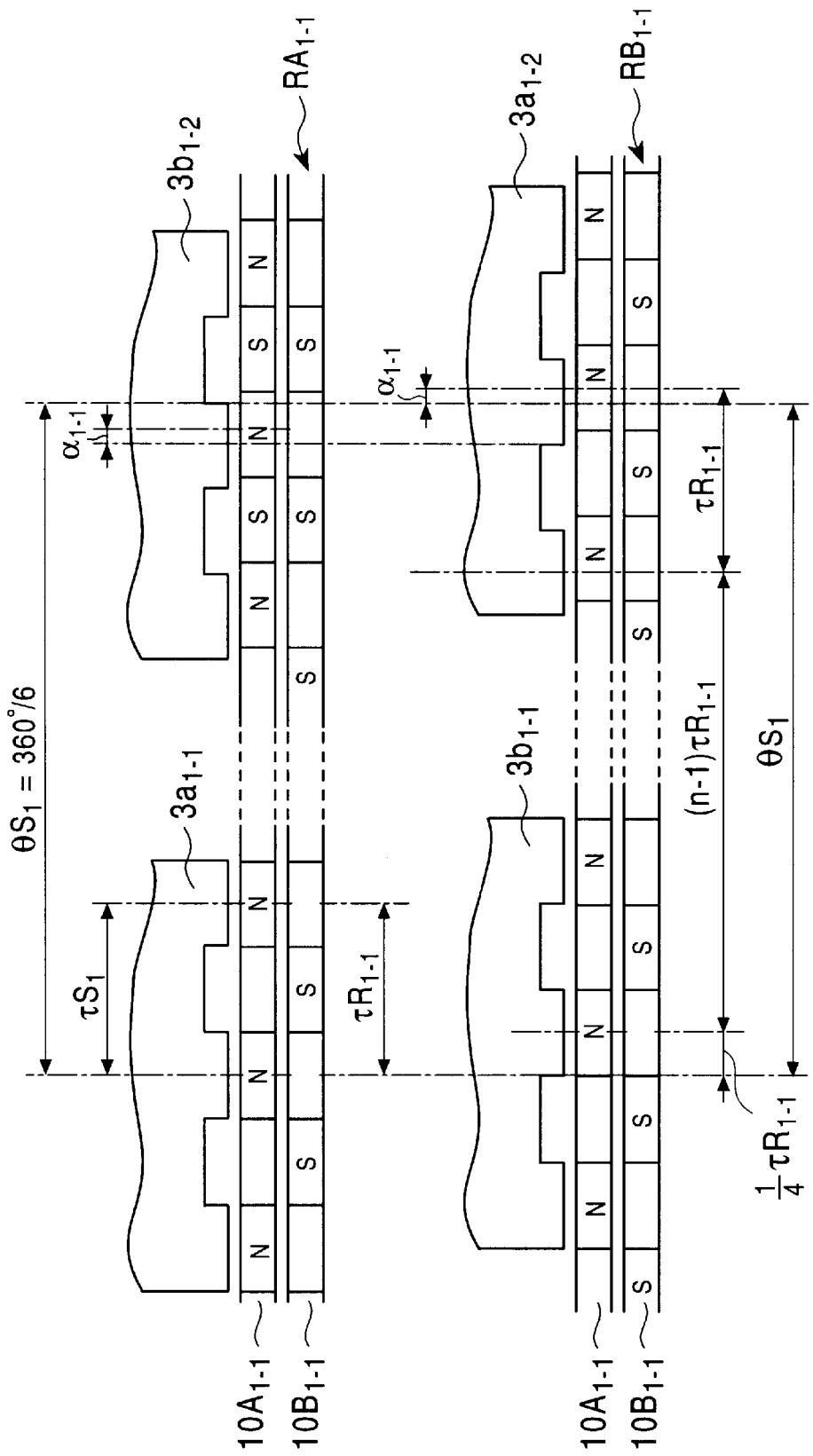
FIG. 6 is a developed view of the stator pole teeth and the rotor pole teeth to explain a positional relationship between the stator pole teeth and the rotor pole teeth when the pitch (angular interval) of the stator pole teeth is equal to the pitch (angular interval) of the rotor pole teeth according to the first embodiment.
Figure 7:
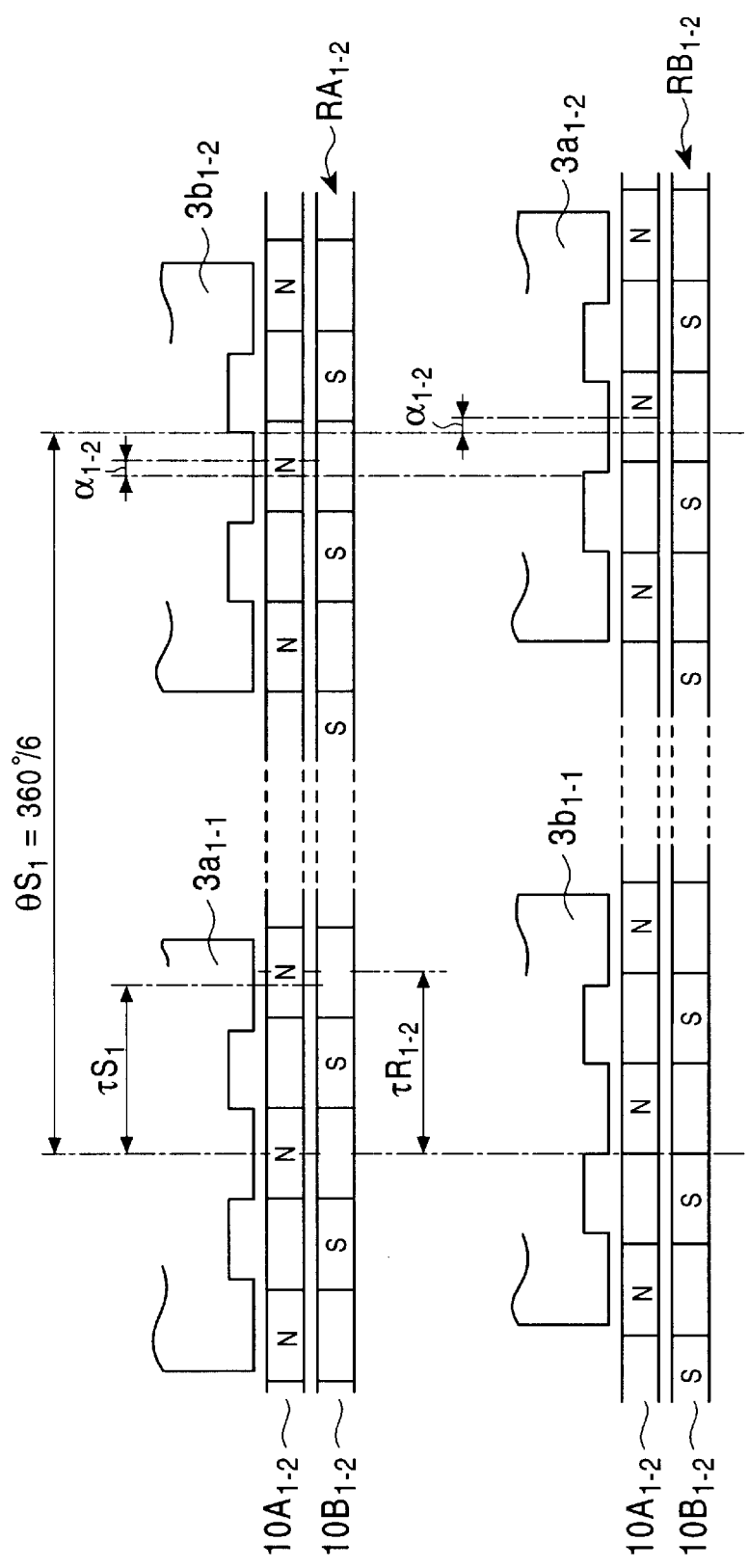
FIG. 7 is a developed view of the stator pole teeth and the rotor pole teeth to explain a positional relationship between the stator pole teeth and the rotor pole teeth when the pitch (angular interval) of the stator pole teeth is smaller than the pitch (angular interval) of the rotor pole teeth and is equal to or larger than 0.75 times of the pitch of the rotor pole teeth according to the first embodiment.
Figure 8:
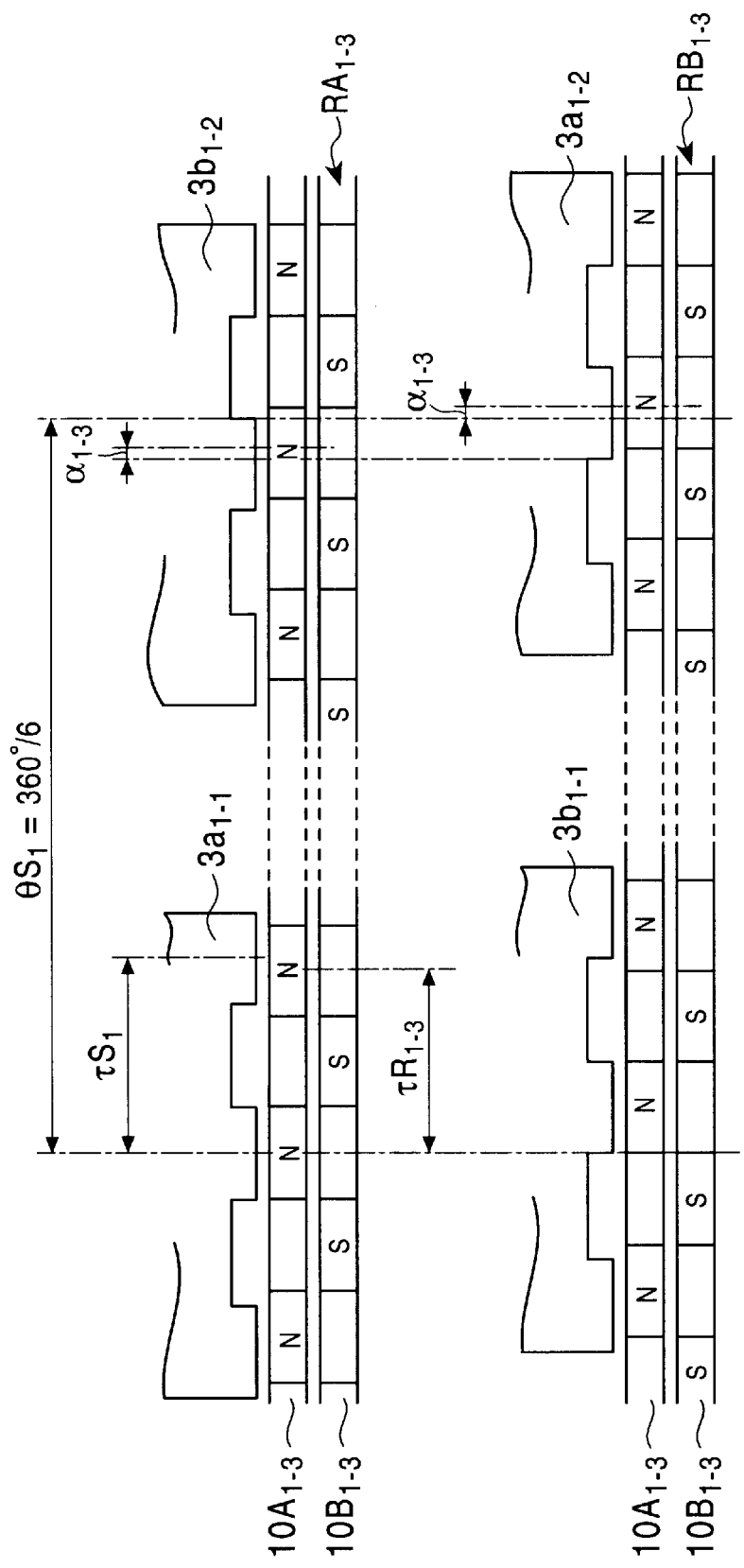
FIG. 8 is a developed view of the stator pole teeth and the rotor pole teeth to explain a positional relationship between the stator pole teeth and the rotor pole teeth when the pitch (angular interval) of the stator pole teeth is larger than the pitch (angular interval) of the rotor pole teeth and is smaller than 1.25 times of the pitch of the rotor pole teeth according to the first embodiment.

An interrelationship between the pole teeth of the stator and the rotor that is shown by the above equation (4) is dismantled and is shown in FIG. 6, FIG. 7 and FIG. 8, respectively.

Namely, FIG. 6 shows a case when the pitch $\tau S_1$ of the pole teeth $3k_1$ of the stator and the pitch $\tau R_1$ of the pole teeth $10a_1$ of the rotor satisfy the following equation (4-1).

$$\tau R_1 = \tau S_1 \tag{4-1}$$

In this case, the correlation between the pole teeth $3k_1$ of the stator and the pole teeth $10a_1$ of the rotor is represented as follows.

$$\theta s_1 = n\pi R_{1-1} + \tau R_{1-1}/4 \pm \alpha_{1-1} \tag{5-1}$$

Where $\theta s_1$ denotes the stator pitch angle, $\tau R_{1-1}$ denotes the rotor pole teeth pitch, $\alpha_{1-1}$ denotes a deviation angle between the pole teeth $3k_1$ of the stator and the pole teeth $10a_1$ of the rotor and n is an integer equal to or larger than 1.

Incidentally, since the rotor magnetic poles of the 6-phase/6-pole motor rotates by 1 pitch by 12 steps, a deviation with respect to the adjacent stator magnetic pole ($3a_{1-2}$ in the drawing) must be $\alpha_{1-1} = (1/12)\tau R_{1-1}$. Further, $\theta s_1 = 2\pi/6$ because the number of the stator poles equals 6. Accordingly, the equation (5-1) is represented as follows.

$$2\pi/6 = n\pi R_{1-1} + \tau R_{1-1}/4 \pm \tau R_{1-1}/12 \tag{5-2}$$

Here, $\tau R_{1-1}$ is the pitch of the rotor pole teeth, $\tau R_{1-1} = 2\pi/Z$ is given.

A symbol Z shows the number of pole teeth of the rotor. Accordingly, $$2\pi/6 = n(2\pi/Z) + (\tfrac{1}{4})(2\pi/Z) \pm (\tfrac{1}{12})(2\pi/Z) \tag{5-3}$$

is given.

The equation (5-3) can be arranged as the following equation (5-4).

$$Z = 6n+1 \text{ or } 6n+2 \tag{5-4}$$

The equation (5-4) is a solution of the equation (2) in the case of m=1.

In the same manner, in the case of the 6-phase/12-pole type, the positional relationship of the pole teeth is identical to that shown in FIG. 6, while the position of the stator magnetic pole is represented by $\theta s_1 = 2\pi/12$. Accordingly, in case of the 6-phase/12-pole type, $$2\pi/12 = n\pi R_{1-1} + \tau R_{1-1}/4 \pm \tau R_{1-1}/12 \tag{6-1}$$

is given.
Since $\tau R_{1-1} = 2\pi/Z$, $$Z = 12n+2 \text{ or } Z = 12n+4 \tag{6-2}$$

is given.

The equation (6-2) is a solution of the equation (2) in the case of m=2.

In the same manner, in the case of 10-phase/10-pole type, it is given by replacing the position $\theta s_1$ of the magnetic pole shown in FIG. 6 with $\theta s_1 = 2\pi/10$. Further, in the case of the 10-phase type, since the rotor magnetic pole moves 1 pitch by 20 steps, $\alpha_{1-1} = \tau R_{1-1}/20$ is given. Accordingly, $$2\pi/10 = n\pi R_{1-1} + \tau R_{1-1}/4 \pm \tau R_{1-1}/20 \tag{7-1}$$

is given.
Since $\tau R_{1-1} = 2\pi/Z$, $$Z = 10n+2 \text{ or } Z = 10n+3 \tag{7-2}$$

is given.

The equation (7-2) is a solution of the equation (3) in the case of m=1.

In the same manner, in a case of the 10-phase/20-pole type, it is given by replacing the position $\theta s_1$ of the magnetic pole shown in FIG. 6 with $\theta s_1 = 2\pi/20$. Further, since the rotor magnetic pole moves 1 pitch by 20 steps, $\alpha_{1-1} = \tau R_{1-1}/20$ is given. Accordingly, $$2\pi/20 = n\pi R_{1-1} + \tau R_{1-1}/4 \pm \tau R_{1-1}/20 \tag{8-1}$$

Since $\tau R_{1-1} = 2\pi/Z$, $$Z = 20n+4 \text{ or } Z = 20n+6 \tag{8-2}$$

is given.

Further, the equation (8-2) is a solution of the equation (3) in the case of m=2.

FIG. 7 shows a case of condition when the pitch $\tau S_1$ of the stator pole teeth and the pitch $\tau R_1$ of the rotor teeth satisfy the following condition (4-2), and FIG. 8 shows a case of condition when the pitch $\tau S_1$ of the stator pole teeth and the pitch $\tau R_1$ of the rotor teeth satisfy the following condition (4-3).

$$\tau R_1 = \tau S_1 \tag{4-1}$$

$$0.75\tau R_1 \leq \tau S_1 < \tau R_1 \tag{4-2}$$

$$\tau R_1 < \tau S_1 \leq 1.25\tau R_1 \tag{4-3}$$

In each of FIGS. 6, 7 and 8, $3a_{1-1}$ is one of the magnetic pole portions $3a_1$, $3a_3$ and $3a_5$ where the pole teeth are formed to be line-symmetric, $3b_{1-1}$ is another one of the magnetic pole portions where the pole teeth are formed to be asymmetric, $3a_{1-2}$ is one of the magnetic pole portions $3a_2$, $3a_4$ and $3a_6$ adjacent to the above magnetic poles where the pole teeth are formed to be line-symmetric, and $3b_{1-2}$ is another one of the magnetic pole portions $3a_2$, $3a_4$ and $3a_6$ where the pole teeth are formed to be asymmetric.

As described above, since the asymmetric pole teeth are deviated from the symmetric pole teeth by ¼ of the pole teeth pitch and the pole teeth of the first rotor unit are deviated from the pole teeth of the second rotor unit by ¼ of the pole teeth pitch, the positional relationships between the stator pole teeth and the rotor pole teeth are identical in both halves.

For example, in FIG. 6, at the timing when the pole teeth of the magnetic pole portion $3a_{1-1}$ face the pole teeth of the first rotor magnetic pole $10A_{1-1}$ of the first rotor unit $RA_{1-1}$, the pole teeth of the magnetic pole portion $3b_{1-1}$ of the same magnetic pole face the pole teeth of the first rotor magnetic pole $10A_{1-1}$ of the second rotor unit $RB_{1-1}$.

In FIG. 6 to show a state in a condition of the above described equation (4-1), a symbol $10A_{1-1}$ represents the respective first rotor magnetic poles of the first rotor unit $RA_{1-1}$ and the second rotor unit $RB_{1-1}$, a symbol $10B_{1-1}$ represents the respective second rotor magnetic poles of the first rotor unit $RA_{1-1}$ and the second rotor unit $RB_{1-1}$, N means that the pole tooth is magnetized in N-pole by the permanent magnet 9, and S means that the pole tooth is magnetized in S-pole by the permanent magnet 9.

A symbol $\theta S_1$ represents the pitch of the magnetic poles of the stator, $\tau S_1$ represents the pitch of the stator pole teeth, and $\tau R_{1-1}$ represents the pitch of the rotor pole teeth. In this case, $\tau S_1 = \tau R_{1-1}$.

Further, $\alpha_{1-1}$ denotes an angular interval between the pole tooth of the predetermined stator magnetic pole and the rotor pole tooth when the pole tooth of the adjacent stator magnetic pole is coincident with the position of the rotor pole tooth. Therefore, the pitch $\theta S_1$ of the stator magnetic poles of the 6-phase/6-pole motor according to this embodiment is equal to 360°/6, and $\alpha_{1-1} = \tau R_{1-1}/12$ in a case of the following equation (9) as shown in the equation (5-4).

$$Z_{1-1} = 6n+1 \text{ or } Z_{1-1} = 6n+2 \tag{9}$$

Where $Z_{1-1}$ is a number of the pole teeth of the respective rotor magnetic poles and n is an integer equal to or larger than 1.

FIG. 7 shows a state of the 6-phase/6-pole type under the condition (4-2), in this drawing, $10A_{1-2}$ shows the respective first rotor magnetic poles of the first rotor unit $RA_{1-2}$ and the second rotor unit $RB_{1-2}$, $10B_{1-2}$ shows the respective second rotor magnetic poles of the first rotor unit $RA_{1-2}$ and the second rotor unit $RB_{1-2}$, N means that the pole tooth is magnetized in N-pole by the permanent magnet 9, and S means that the pole tooth is magnetized in S-pole by the permanent magnet 9.

Since the stator satisfies the same condition as FIG. 6, $\theta S_1$ represents the pitch of the stator magnetic poles and $\tau S_1$ represents the pitch of the stator pole teeth. A symbol $\tau R_{1-2}$ represents the pitch of the rotor pole teeth.

In this case, $\tau S_1 < \tau R_{1-2}$.

Further, $\alpha_{1-2}$ denotes an angular interval between the pole tooth of the predetermined stator magnetic pole and the rotor pole tooth when the corresponding pole tooth of the adjacent stator magnetic pole is coincident with the position of the rotor pole tooth. Therefore, the pitch $\theta S_1$ of the stator magnetic poles of the 6-phase/6-pole motor according to this embodiment is equal to 360°/6, and $\alpha_{1-2} = \tau R_{1-2}/12$ in a case of the following equation (10) as shown in the equation (5-4).

$$Z_{1-2} = 6n+1 \text{ or } Z_{1-2} = 6n+2 \tag{10}$$

Where $Z_{1-2}$ is a number of the pole teeth of the respective rotor magnetic poles and n is an integer equal to or larger than 1.

FIG. 8 shows a state of the 6-phase/6-pole type under the condition (4-3), in this drawing, $10A_{1-3}$ shows the respective first rotor magnetic poles of the first rotor unit $RA_{1-3}$ and the second rotor unit $RB_{1-3}$, $10B_{1-3}$ shows the respective second rotor magnetic poles of the first rotor unit $RA_{1-3}$ and the second rotor unit $RB_{1-3}$, N means that the pole tooth is magnetized in N-pole by the permanent magnet 9, and S means that the pole tooth is magnetized in S-pole by the permanent magnet 9.

Since the stator satisfies the same condition as FIG. 6, $\theta S_1$ represents the pitch of the stator magnetic poles and $\tau S_1$ represents the pitch of the stator pole teeth. A symbol $\tau R_{1-3}$ represents the pitch of the rotor pole teeth. In this case, $\tau S_1 > \tau R_{1-3}$.

Further, $\alpha_{1-3}$ denotes an angular interval between the pole tooth of the predetermined stator magnetic pole and the rotor pole tooth when the corresponding pole tooth of the adjacent stator magnetic pole is coincident with the position of the rotor pole tooth. Therefore, the pitch $\theta S_1$ of the stator magnetic poles of the 6-phase/6-pole motor according to this embodiment is equal to 360°/6, and $\alpha_{1-3} = \tau R_{1-3}/12$ in a case of the following equation (11) as shown in the equation (5-4).

$$Z_{1-3} = 6n+1 \text{ or } Z_{1-3} = 6n+2 \tag{11}$$

Where $Z_{1-3}$ is a number of the pole teeth of the respective rotor magnetic poles and n is an integer equal to or larger than 1.

A table in FIG. 9 shows a relationship between the number of rotor pole teeth (referred to as Z) and the step angles for various numbers of n according to this embodiment.

In this drawing, the step angles for various numbers of n when the number of teeth Z is equal to 6n+1 and 6n+2 are shown in the vertical direction.

Figure 10:
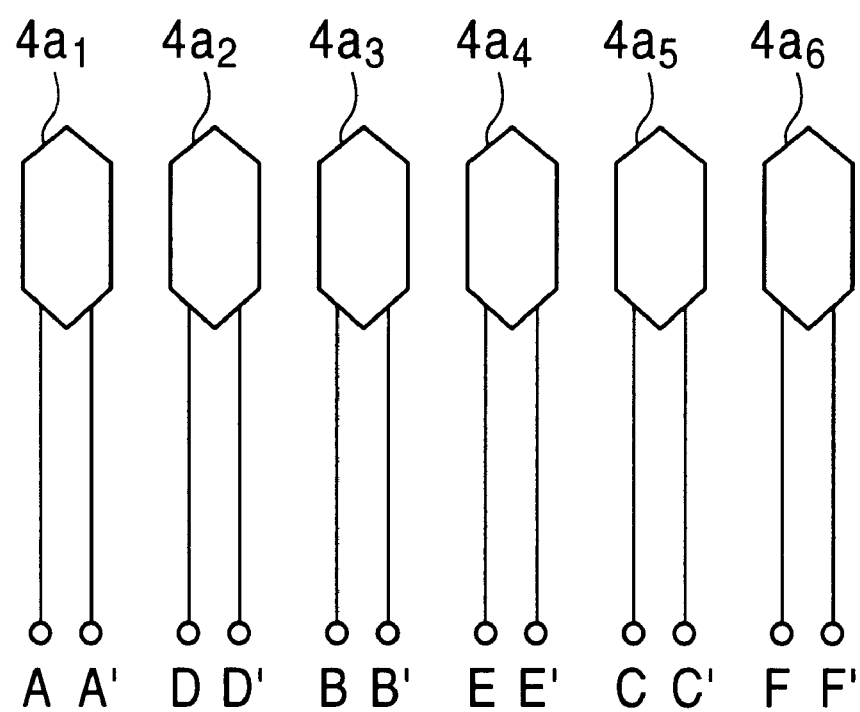
FIG. 10 is a connection diagram showing a connection condition of monofier windings according to the first embodiment.

FIG. 10 shows a connection condition of monofier windings according to this embodiment. In this drawing, A and A' are lead lines of the winding $4a_1$, D and D' are lead lines of the winding $4a_2$, B and B' are lead lines of the winding $4a_3$, E and E' are lead lines of the winding $4a_4$, C and C' are lead line of the winding $4a_5$, F and F' are lead lines of the winding $4a_6$, and an exciting current output circuit for driving is connected to the respective terminals of these lead lines.

Figure 11:
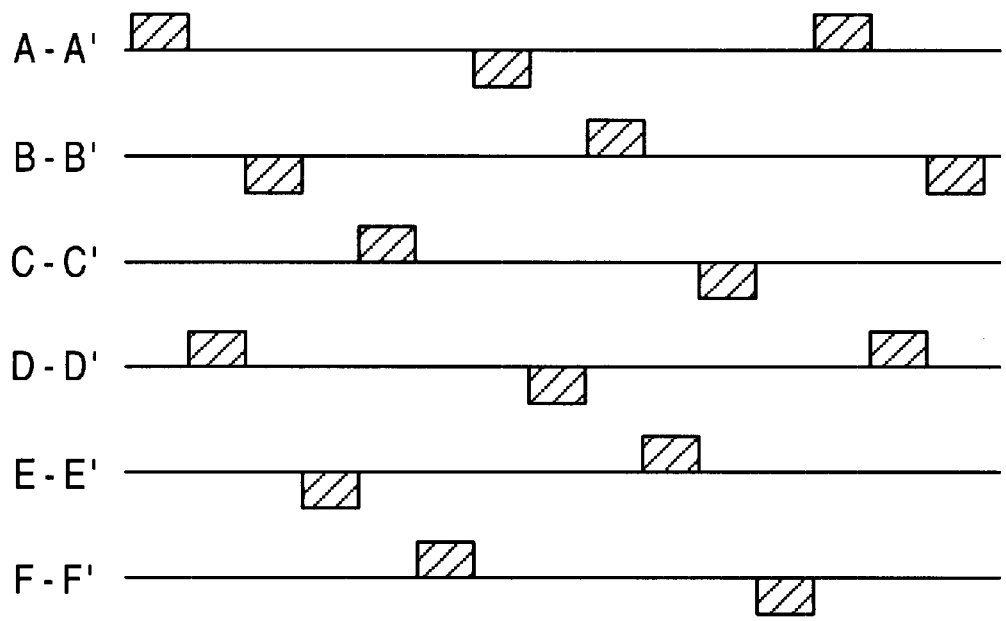
FIG. 11 is an excitation sequence diagram of one-phase excitation in the bipolar drive for the first and second embodiments.

Operation of the above described motor will be described with reference to FIGS. 11 and 12. In FIG. 11, a horizontal axis represents a flow of the action steps (a sequence) from step 1 to step 15, and the illustration of step 16 and the later steps are omitted.

The above described lead lines A, A' through F, F' are shown in the vertical direction. On the respective horizontal axes, timings to apply a pulse electric current corresponding to the respective steps are shown as quadrilaterals.

A quadrilateral above a horizontal line showing each of the lead lines (A, A' through F, F') shows that an electric current passes from the lead line A to the lead line A' and a quadrilateral below a horizontal line shows that an electric current passes from the lead line A' to the lead line A, for example.

That is, as shown in FIG. 11, this motor rotates one step angle by one step angle (¹⁄₁₂ pitch) as a pulse electric current is applied to each of the lead lines in sequence.

Figure 12:
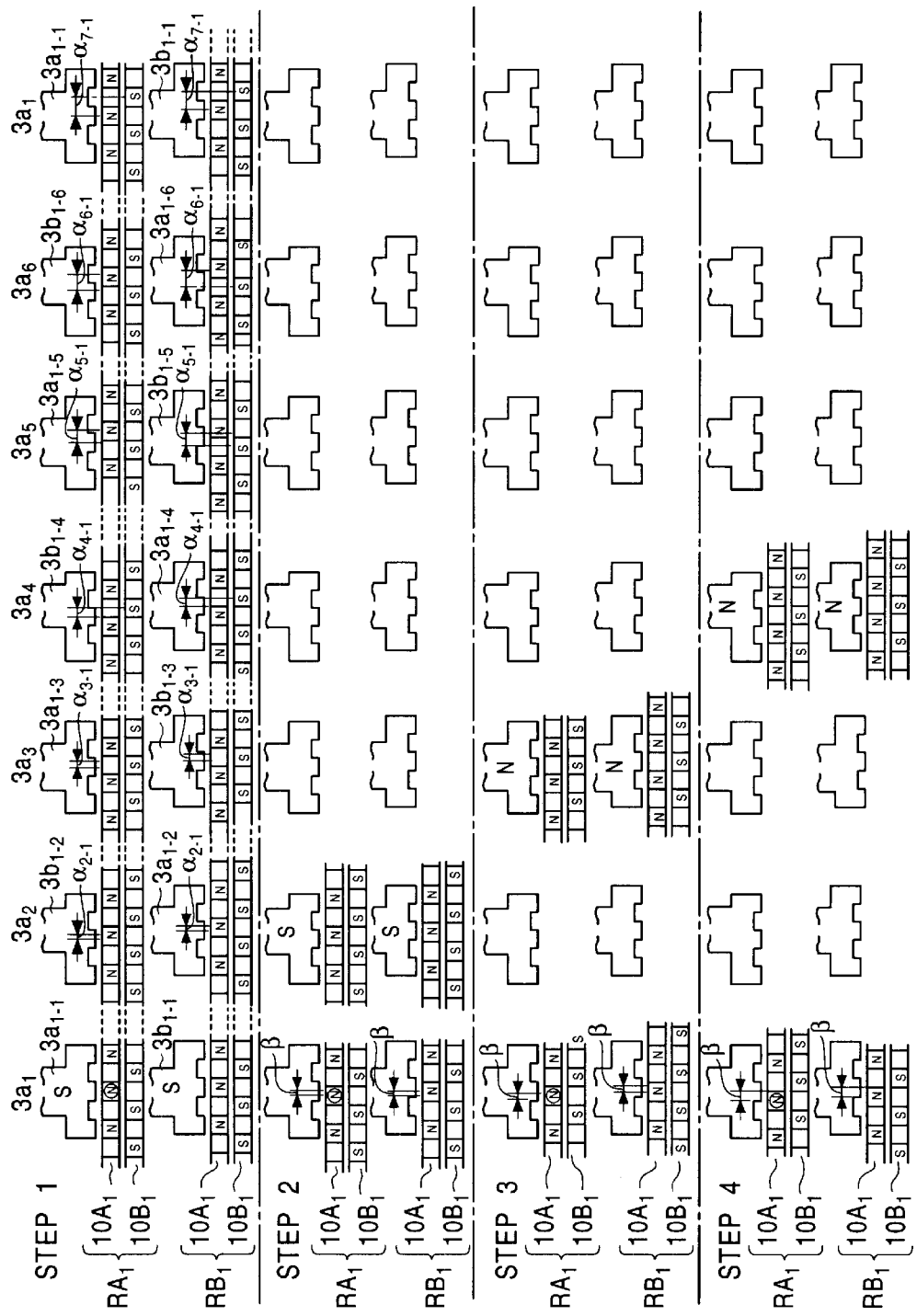
FIG. 12 is a developed view of the stator pole teeth and the rotor pole teeth to explain a positional relationship between the stator pole teeth and the rotor pole teeth during the operation of the excitation sequence shown in FIG. 11 when the pitch (angular interval) of the stator pole teeth is equal to the pitch (angular interval) of the rotor pole teeth according to the first embodiment.

FIG. 12 is a developed view to explain a positional relationship between the stator pole teeth and the rotor pole teeth according to the above described embodiment under the condition (4-1), i.e., when the pitch $\tau S_1$ of the stator pole teeth is equal to the pitch $\tau R_1$ of the rotor pole teeth. The magnetic pole portions $3a_1, 3a_2, 3a_3, 3a_4, 3a_5, 3a_6$ and $3a_1$ again are illustrated from the left side to the right side in the horizontal direction of FIG. 12.

FIG. 12 shows step 1 to step 4 corresponding to the steps shown in FIG. 11 and the illustration of step 5 and the later steps are omitted.

The all magnetic poles of the stator shown in FIG. 6 are developed and illustrated at the respective steps. At each step, the first halves of the magnetic poles $3a_{1-1}$, $3b_{1-2}$, $3a_{1-3}$, $3b_{1-4}$, $3a_{1-5}$, $3b_{1-6}$ and $3a_{1-1}$ again are shown in the uppermost stage, the first rotor magnetic pole $10A_1$ of the first rotor unit $RA_1$ is shown in the second stage, the second rotor magnetic pole $10B_1$ of the first rotor unit $RA_1$ is shown in the third stage, the second halves of the magnetic poles $3b_{1-1}$, $3a_{1-2}$, $3b_{1-3}$, $3a_{1-4}$, $3b_{1-5}$, $3a_{1-6}$ and $3b_{1-1}$ again are shown in the fourth stage, the first rotor magnetic pole $10A_1$ of the second rotor unit $RB_1$ is shown in the fifth stage and the second rotor magnetic pole $10B_1$ of the second rotor unit $RB_1$ is shown in the lowermost stage.

The pole teeth arranged on the magnetic poles $3a_{1-1}$ through $3a_{1-6}$ are line-symmetric with respect to the magnetic poles, and the pole teeth arranged on the magnetic poles $3b_{1-1}$ through $3b_{1-6}$ are asymmetric with respect to the magnetic poles. Further, N means that the pole tooth is magnetized in N-pole and S means that the pole tooth is magnetized in S-pole. The polarity N of the predetermined rotor pole tooth magnetized in N-pole is circled in the drawings in order to indicate the rotation of the motor.

As shown in FIG. 11, when an electric current passes from the lead line A to the lead line A', the magnetic pole $3a_1$ of the stator is magnetized in S-pole. Accordingly, the pole teeth in the N-pole of the close magnetic poles of both the first rotor magnetic poles $10A_1$ of the first rotor unit $RA_1$ and the second rotor unit $RB_1$ are attracted. In step 1, the positional relationships between the stator pole teeth and the rotor pole teeth become as follows.

The angular interval $\alpha_{2-1}$ between the pole teeth of the magnetic pole $3a_2$ that is adjacent to the stator magnetic pole $3a_1$ and the close pole teeth in N-pole of the rotor is equal to $\tau R_1/12$. The angular interval $\alpha_{3-1}$ between the pole teeth of the magnetic pole $3a_3$ that is adjacent to the stator magnetic pole $3a_2$ and the close pole teeth in S-pole of the rotor is equal to $2\tau R_1/12$. The angular interval $\alpha_{4-1}$ between the pole teeth of the magnetic pole $3a_4$ that is adjacent to the stator magnetic pole $3a_3$ and the close pole teeth in S-pole of the rotor is equal to $3\tau R_1/12$. The angular interval $\alpha_{5-1}$ between the pole teeth of the magnetic pole $3a_5$ that is adjacent to the stator magnetic pole $3a_4$ and the close pole teeth in N-pole of the rotor is equal to $4\tau R_1/12$. The angular interval $\alpha_{6-1}$ between the pole teeth of the magnetic pole $3a_6$ that is adjacent to the stator magnetic pole $3a_5$ and the close pole teeth in N-pole of the rotor is equal to $5\tau R_1/12$. The angular interval $\alpha_{7-1}$ between the pole teeth of the magnetic pole $3a_1$ that is adjacent to the stator magnetic pole $3a_6$ and the close pole teeth in S-pole of the rotor is equal to $6\tau R_1/12$.

In steps after step 2, the magnetic pole magnetized in step 1 and the magnetic pole magnetized in each step are only illustrated and the illustration of the other magnetic poles are omitted in FIG. 12.

In step 2, when an electric current passes from the lead line D to the lead line D', the magnetic pole $3a_2$ of the stator is magnetized in S-pole. Accordingly, the pole teeth in the N-pole of the close magnetic poles of both the first rotor magnetic poles $10A_1$ of the first rotor unit $RA_1$ and the second rotor unit $RB_1$ are attracted. The angular interval β between the predetermined pole tooth of the first rotor magnetic pole $10A_1$ of the first rotor unit $RA_1$, which are attracted by the stator magnetic pole $3a_1$ in step 1, and the corresponding pole teeth of the stator magnetic pole $3a_1$ becomes $\tau R_1/12$. This value $\tau R_1/12$ is equal to the step angle.

In step 3, when an electric current passes from the lead line B' to the lead line B, the magnetic pole $3a_3$ of the stator is magnetized in N-pole. Accordingly, the pole teeth in the S-pole of the magnetic poles of both the second rotor magnetic poles $10B_1$ of the first rotor unit $RA_1$ and the second rotor unit $RB_1$ are attracted. Since the motor rotate by further 1 step angle, the angular interval β between the first rotor magnetic pole $10A_1$ of the first rotor unit $RA_1$, which is attracted by the stator magnetic pole $3a_1$ in step 1, and the stator magnetic pole $3a_1$ becomes $2\tau R_1/12$.

In step 4, when an electric current passes from the lead line E' to the lead line E, the magnetic pole $3a_4$ of the stator is magnetized in N-pole. Accordingly, the pole teeth in the S-pole of the magnetic poles of both the second rotor magnetic poles $10B_1$ of the first rotor unit $RA_1$ and the second rotor unit $RB_1$ are attracted. Since the motor rotate by further 1 step angle, the angular interval β between the predetermined pole tooth of the first rotor magnetic pole $10A_1$ of the first rotor unit $RA_1$, which is attracted by the stator magnetic pole $3a_1$ in step 1, and the corresponding pole tooth of the stator magnetic pole $3a_1$ becomes $3\tau R_1/12$. Namely, the motor rotates by step angle $\tau R_1/12$ at every step.

After that, the motor continues to rotate by the step angle $\tau R_1/12$ by repeating the steps shown in FIG. 11.

Second Embodiment

A second embodiment where the present invention is applied to a 6-phase/12-pole motor (an inner rotor hybrid stepping motor) will be described using FIGS. 13 through 19 with reference to the first embodiment.

In each drawing, the elements corresponding to that in the first embodiment are represented by the same symbols or the same symbols with different suffixes, and the detailed descriptions will be omitted.

Figure 13:
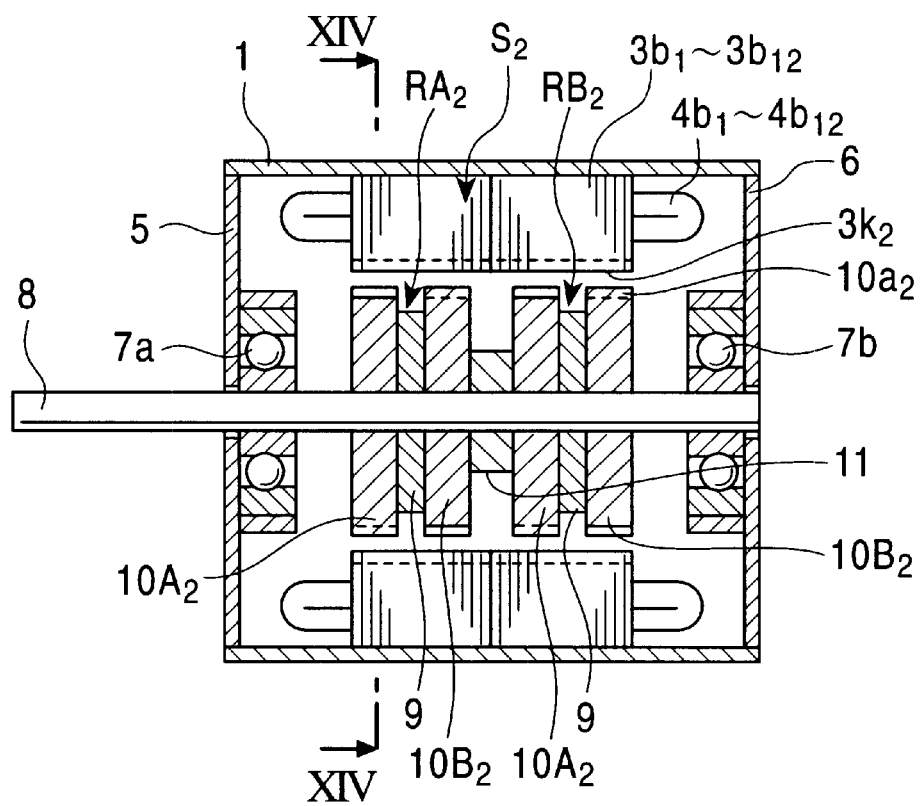
FIG. 13 is a longitudinal sectional front view of a second embodiment (a 6-phase/12-pole inner rotor hybrid stepping motor) of the present invention.
Figure 14:
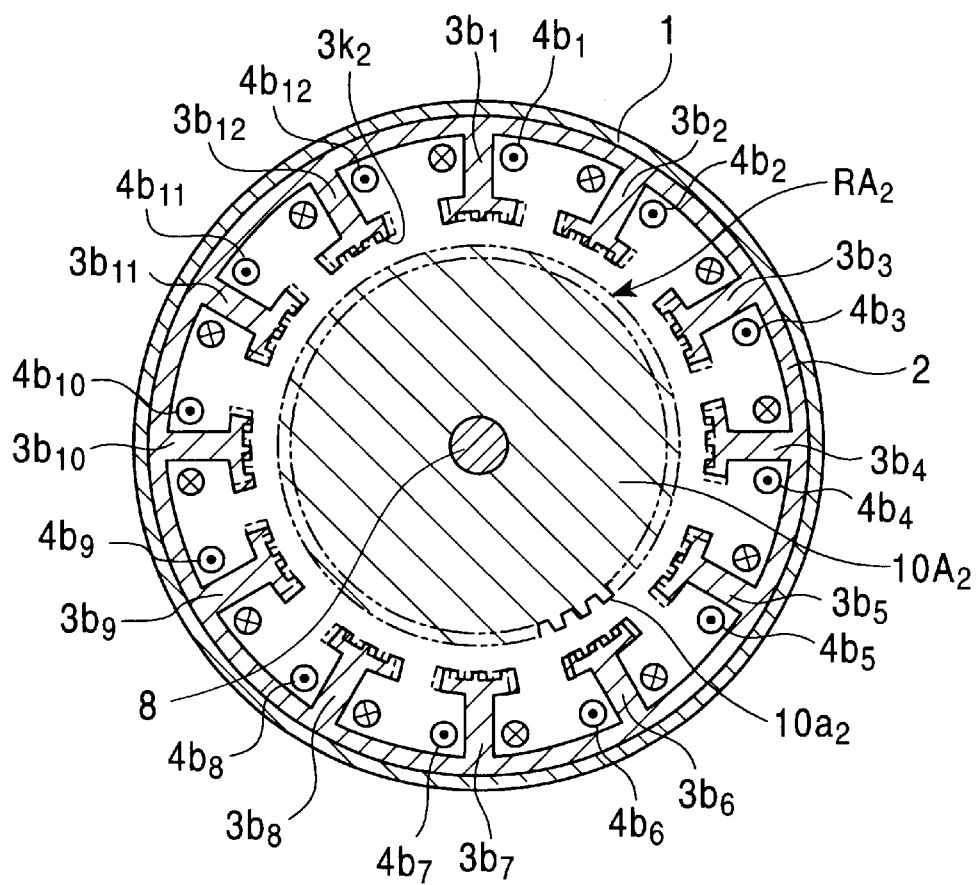
FIG. 14 is a sectional view of FIG. 13 along XIV—XIV line.

FIG. 13 is a longitudinal sectional front view of the 6-phase/6-pole motor and FIG. 14 is a sectional view of FIG. 13 along XIV—XIV line.

In FIGS. 13 and 14, a symbol S2 is a stator and twelve magnetic poles $3b_1$ through $3b_{12}$ are centripetally formed around the inner circumference of the stator iron core 2 at equal angular intervals. The magnetic poles are formed so as to invert the formation positions of the pole teeth to each other as well as the first embodiment.

Namely, on the tip ends of the respective magnetic poles, a predetermined number of pole teeth $3k_2$ are formed at equal pitches. Each of the magnetic poles $3b_1$, $3b_3$, $3b_5$, $3b_7$, $3b_9$, and $3b_{11}$ has a first half where the pole teeth are line-symmetric with respect to the respective magnetic poles and a second half where the pole teeth are asymmetric. The first and second halves are arranged in the axial direction. Each of the magnetic poles $3b_2$, $3b_4$, $3b_6$, $3b_8$, $3b_{10}$, and $3b_{12}$ also has a first half where the pole teeth are line-symmetric with respect to the respective magnetic poles and a second half where the pole teeth are asymmetric, while the first and second halves are arranged in the opposite direction to the above.

Windings $4b_1$ through $4b_{12}$ are wound around the magnetic poles, respectively.

A first rotor unit $RA_2$ is connected to the rotor axis 8 at the position to face a half of the stator with a predetermined air gap with respect to the inner circumferential surface of the stator $S_2$, and a second rotor unit $RB_2$ is connected at the position to face the other half of the stator with a predetermined air gap with respect to the inner circumferential surface of the stator $S_2$. A non-magnetic substance 11 having annular shape of a predetermined width is arranged between the above described first rotor unit $RA_2$ and the second rotor unit $RB_2$.

The first rotor unit $RA_2$ and the second rotor unit $RB_2$ have the same structure, two rotor magnetic poles $10A_2$ and $10B_2$ are fixed to the rotor axis 8 to sandwich a permanent magnet 9 magnetized in the axial direction therebetween.

Pole teeth $10a_2$, which correspond to the pole teeth $3k_2$ formed on the respective magnetic poles of the stator in shape and pitch, are formed around the respective outer circumferential surfaces of the two rotor magnetic poles $10A_2$ and $10B_2$. The positional relationship among the respective rotor teeth $10a_2$ is similar to the first embodiment, and as described below, the pole teeth $10a_2$ of the first rotor magnetic pole $10A_2$ are deviated from the pole teeth $10a_2$ of the second rotor magnetic pole $10B_2$ by ½ of the pitch of the rotor teeth $10a_2$, and the first and second rotor units $RA_2$ and $RB_2$ are connected with a deviation of ¼ of the pitch of the rotor teeth $10a_2$.

Figure 15:
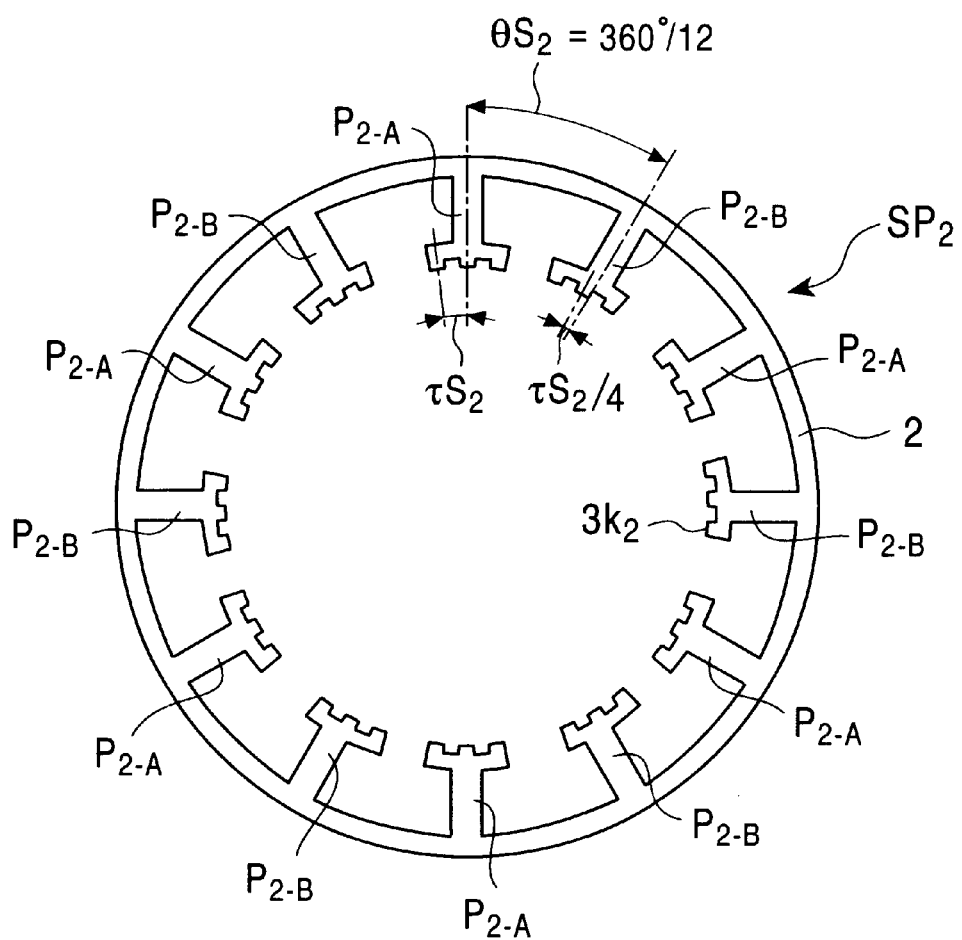
FIG. 15 is a plan view showing a shape of a magnetic material plate (a stator iron plate) to form a stator according to the second embodiment.

Next, an example of a making method of the stator will be described with reference to FIGS. 15 and 16.

The stator is constructed by connecting first and second halves each of which consists of a predetermined number of annular magnetic material plates (referred to as stator iron plates in the following description) $SP_2$ shown in FIG. 15 stacked one on another. The stator iron plate $SP_2$ is provided with twelve magnetic poles in total centripetally formed around the inner circumference. There are six magnetic poles $P_{2\text{-}A}$ and six magnetic poles $P_{2\text{-}B}$. The two kinds of magnetic poles P2-A and P2-B are alternatively arranged at equal pitches. The angular interval $\theta S_2$ between the adjacent magnetic poles $P_{2\text{-}A}$ and $P_{2\text{-}B}$ is equal to 360°/12, that is 30°. On the inner tip end of the magnetic pole $P_{2\text{-}A}$, a predetermined number of pole teeth $3k_2$ are formed to be line-symmetric with respect to a center line of the magnetic pole at equal pitches $\tau S_1$. On the inner tip end of the magnetic pole $P_{2\text{-}B}$, pole teeth $3k_2$ are formed at the same pitches and the same number as the pole teeth of the magnetic pole $P_{2\text{-}A}$. The pole teeth of the magnetic poles $P_{2\text{-}B}$ are deviated by ¼ of the pole teeth pitch, that is $\tau S_2/4$, in the same circumferential direction. A predetermined number of the stator iron plates are stacked so as to overlap the pole teeth to construct the first and second halves of the stator $S_2$.

The first and second halves are connected to each other such that the second half is rotationally deviated from the first half by the magnetic pole pitch, that is 30°, thereby the stator $S_2$ is constructed.

Since the stator $S_2$ is formed to face the two rotor units $RA_2$ and $RB_2$ that sandwich the non-magnetic substance 11 therebetween, the respective halves of the stator $S_2$ may be constructed by different number of the stator iron plates so long as the two halves of the stator $S_2$ reliably face the rotor units $RA_2$ and $RB_2$, respectively.

Each stator iron plate $SP_2$ may be formed by a punch press. The rotor magnetic poles $10A_2$ and $10B_2$ that constitute each rotor may be also formed by stacking a predetermined number of magnetic material plates having a predetermined shape punched by a punch press.

Structure of the magnetic pole portion of the stator formed by the above described method will be described with reference to FIGS. 16A and 16B.

Figure 16A:
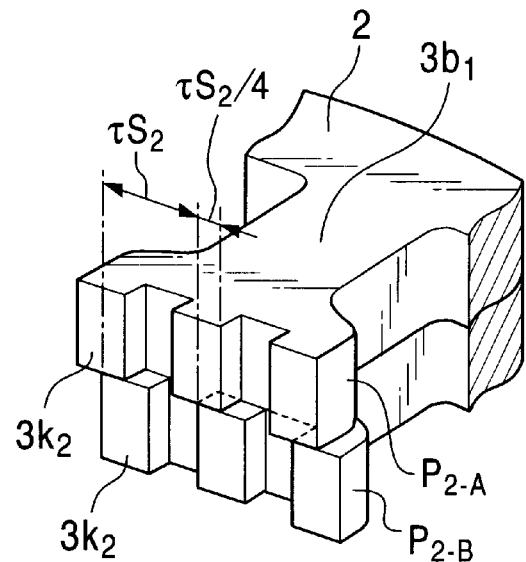
FIGS. 16A and 16B show shapes of the tip ends of magnetic poles of the stator according to the second embodiment.

FIG. 16A shows one of the magnetic poles $3b_1$, $3b_3$, $3b_5$, $3b_7$, $3b_9$, $3b_{11}$ that have the symmetric pole teeth and constitute the stator $S_2$ shown in FIG. 14, for example $3b_1$. FIG. 16B shows one of the magnetic poles $3b_2$, $3b_4$, $3b_6$, $3b_8$, $3b_{10}$, $3b_{12}$ having the asymmetric pole teeth that are adjacent to the above magnetic poles of FIG. 16A, for example $3b_2$.

Figure 16B:
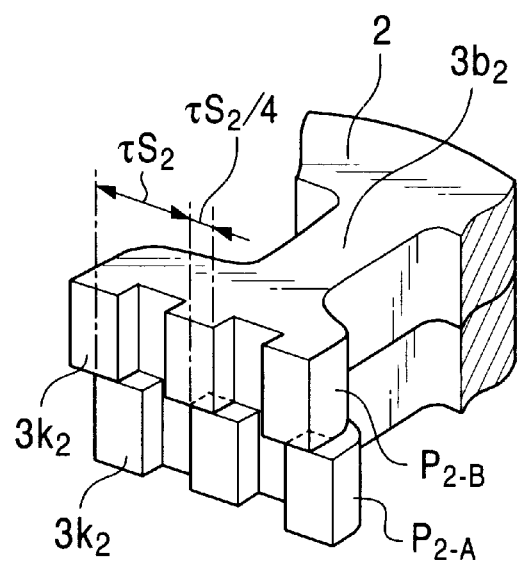

The stator $S_2$ is formed as in the case of the first embodiment, each of the magnetic poles of the stator $S_2$ shown in FIGS. 16A and 16B is formed of a half $P_{2\text{-}A}$ that has the pole teeth $3k_2$ being line-symmetric with respect to the magnetic pole and the other half $P_{2\text{-}B}$ that has the same number of the pole teeth $3k_2$ that are asymmetric with respect to the magnetic pole and are deviated by ¼ of the pole teeth pitch.

The magnetic pole shown in FIG. 16A is provided with the half $P_{2\text{-}A}$ at the upper side in the drawings and the other half $P_{2\text{-}B}$ at the lower side, while the magnetic pole shown in FIG. 16B is provided with the half $P_{2\text{-}A}$ at the lower side and the other half $P_{2\text{-}B}$ at the upper side.

Figure 17:
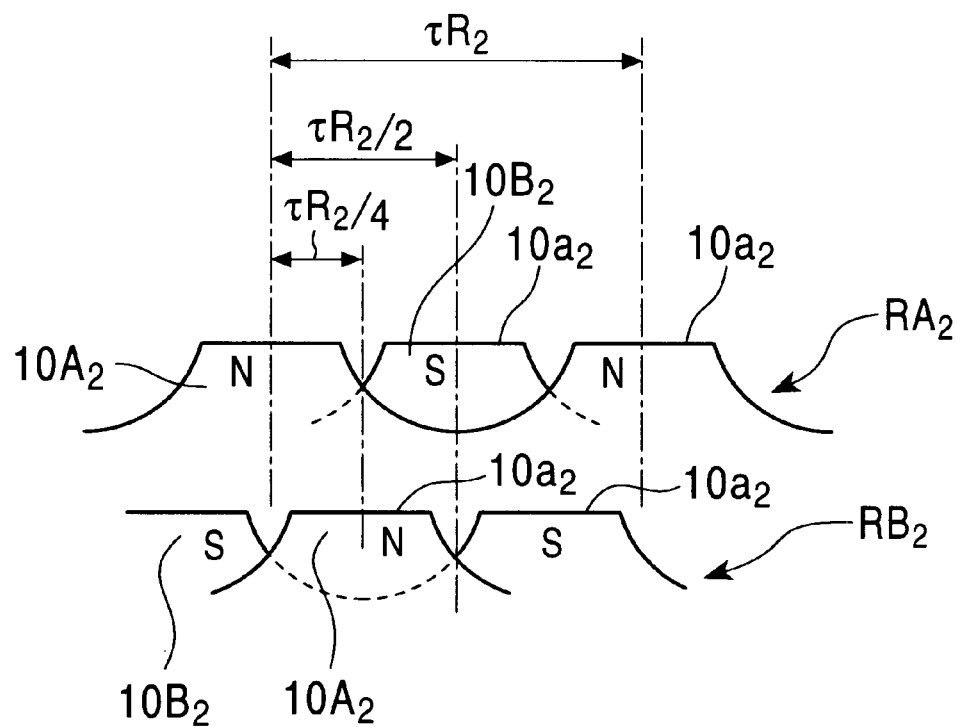
FIG. 17 is an enlarged side view showing a relationship among the pole teeth of four magnetic poles of a rotor unit that constitutes the rotor according to the second embodiment.

FIG. 17 is an enlarged side view showing a relationship among the pole teeth of the respective rotor magnetic poles that constitute the rotor. In the condition shown in FIG. 17, the pole teeth $10a_2$ of the first rotor magnetic poles $10A_2$ of the first and second rotor units $RA_2$ and $RB_2$ are magnetized in N-pole, and the pole teeth $10a_2$ of the second rotor magnetic poles $10B_2$ of the first and second rotor units $RA_2$ and $RB_2$ are magnetized in S-pole due to the magnetized direction of the permanent magnet 9.

Assuming that the pitch of the pole teeth $10a_2$ formed on the respective rotor magnetic poles is represented by $\tau R_2$, the angular interval between the pole teeth $10a_2$ of the first rotor magnetic pole $10A_2$ and the pole teeth $10a_2$ of the second rotor magnetic pole $10B_2$ is equal to $\tau R_2/2$. The angular interval between the pole teeth $10a_2$ of the first rotor magnetic pole $10A_2$ of the first rotor unit $RA_2$ and the pole teeth $10a_2$ of the first rotor magnetic pole $10A_2$ of the second rotor unit $RB_2$, and the angular interval between the pole teeth $10a_2$ of the second rotor magnetic pole $10B_2$ of the first rotor unit $RA_2$ and the pole teeth $10a_2$ of the second rotor magnetic pole $10B_2$ of the second rotor unit $RB_2$ are equal to $\tau R_2/4$.

Interrelationships between the pole teeth of the stator and the rotor under the following conditions (12-1), (12-2) and (12-3) are shown in FIG. 6, FIG. 7 and FIG. 8, respectively. The conditions (12-1), (12-2) and (12-3) correspond the conditions (4-1), (4-2) and (4-3) described in the first embodiment, while the symbols $\tau R_1$ and $\tau S_1$ are replaced with $\tau R_2$ and $\tau S_2$.

$$\tau R_2 = \tau S_2 \tag{12-1}$$

$$0.75\tau R_2 \leq \tau S_2 < \tau R_2 \tag{12-2}$$

$$\tau R_2 < \tau S_2 \leq 1.25\tau R_2 \tag{12-3}$$

Since the interrelationships between the pole teeth of the stator and the rotor is the same as the first embodiment as shown in FIGS. 6, 7 and 8, illustration is omitted. When the FIGS. 6, 7 and 8 are used to explain the second embodiment, the symmetric magnetic poles $3a_{1\text{-}1}$ and $3a_{1\text{-}2}$ are replaced with $3a_{2\text{-}1}$ and $3a_{2\text{-}2}$, the asymmetric magnetic poles $3b_{1\text{-}1}$ and $3b_{1\text{-}2}$ are replaced with $3b_{2\text{-}1}$ and $3b_{2\text{-}2}$, the pitch $\theta S_1 = 360°/6$ of the magnetic poles of the stator is replaced with $\theta S_2 = 360°/12$, the pole teeth pitch $\tau S_1$ of the stator is replaced with $\tau S_2$, the first rotor units $RA_{1\text{-}1}$, $RA_{1\text{-}2}$ and $RA_{1\text{-}3}$ are replaced with $RA_{2\text{-}1}$, $RA_{2\text{-}2}$ and $RA_{2\text{-}3}$, the second rotor unit $RB_1$ is replaced with $RB_2$, the first rotor magnetic poles $10A_{1\text{-}1}$, $10A_{1\text{-}2}$ and $10A_{1\text{-}3}$ are replaced with $10A_{2\text{-}1}$, $10A_{2\text{-}2}$ and $10A_{2\text{-}3}$, the pitches $\tau R_{1\text{-}1}$, $\tau R_{1\text{-}2}$ and $\tau R_{1\text{-}3}$ are replaced with $\tau R_{2\text{-}1}$, $\tau R_{2\text{-}2}$ and $\tau R_{2\text{-}3}$, the angular intervals $\alpha_{1\text{-}1}$, $\alpha_{1\text{-}2}$ and $\alpha_{1\text{-}3}$ between the pole tooth of the predetermined stator magnetic pole and the rotor pole tooth when the corresponding pole tooth of the adjacent stator magnetic pole is coincident with the position of the rotor pole tooth are replaced with $\alpha_{2\text{-}1}$, $\alpha_{2\text{-}2}$ and $\alpha_{2\text{-}3}$.

In the 6-phase/12-pole motor of the second embodiment, when the relationship of the pitches of the stator pole teeth and the rotor pole teeth is represented by the equation (12-1), the angular interval $\alpha_{2\text{-}1}$ between the pole tooth of the predetermined stator magnetic pole and the rotor pole tooth when the corresponding pole tooth of the adjacent stator magnetic pole is coincident with the position of the rotor pole tooth becomes $\tau R_{2\text{-}1}/12$ in the case that the number of the rotor pole teeth satisfies the following condition (13) that is a solution of the equation (2) for m=2.

$$Z_{2\text{-}1}=12n+2 \text{ or } Z_{2\text{-}1}=12n+4 \tag{13}$$

Where $Z_{2\text{-}1}$ is a number of the pole teeth of the respective rotor magnetic poles and n is an integer equal to or larger than 1.

Further, when the relationship of the pitches of the stator pole teeth and the rotor pole teeth is represented by the condition (12-2), the angular interval $\alpha_{2\text{-}2}$ between the pole tooth of the predetermined stator magnetic pole and the rotor pole tooth when the corresponding pole tooth of the adjacent stator magnetic pole is coincident with the position of the rotor pole tooth becomes $\tau R_{2\text{-}2}/12$ in the case that the number of the rotor pole teeth satisfies the following condition (14) that is a solution of the equation (2) for m=2.

$$Z_{2\text{-}2}=12n+2 \text{ or } Z_{2\text{-}2}=12n+4 \tag{14}$$

Where $Z_{2\text{-}2}$ is a number of the pole teeth of the respective rotor magnetic poles and n is an integer equal to or larger than 1.

Further, when the relationship of the pitches of the stator pole teeth and the rotor pole teeth is represented by the condition (12-3), the angular interval $\alpha_{2\text{-}3}$ between the pole tooth of the predetermined stator magnetic pole and the rotor pole tooth when the corresponding pole tooth of the adjacent stator magnetic pole is coincident with the position of the rotor pole tooth becomes $\tau R_{2\text{-}3}/12$ in the case that the number of the rotor pole teeth satisfies the following condition (15) that is a solution of the equation (2) for m=2.

$$Z_{2\text{-}3}=12n+2 \text{ or } Z_{2\text{-}3}=12n+4 \tag{15}$$

Where $Z_{2\text{-}3}$ is a number of the pole teeth of the respective rotor magnetic poles and n is an integer equal to or larger than 1.

A table in FIG. 18 shows a relationship between the number of rotor pole teeth (referred to as Z) and the step angles for various numbers of n according to this embodiment.

In this drawing, the step angles for various numbers of n when the number of teeth Z is equal to 12n+2 and 12n+4 are shown in the vertical direction.

Figure 19:
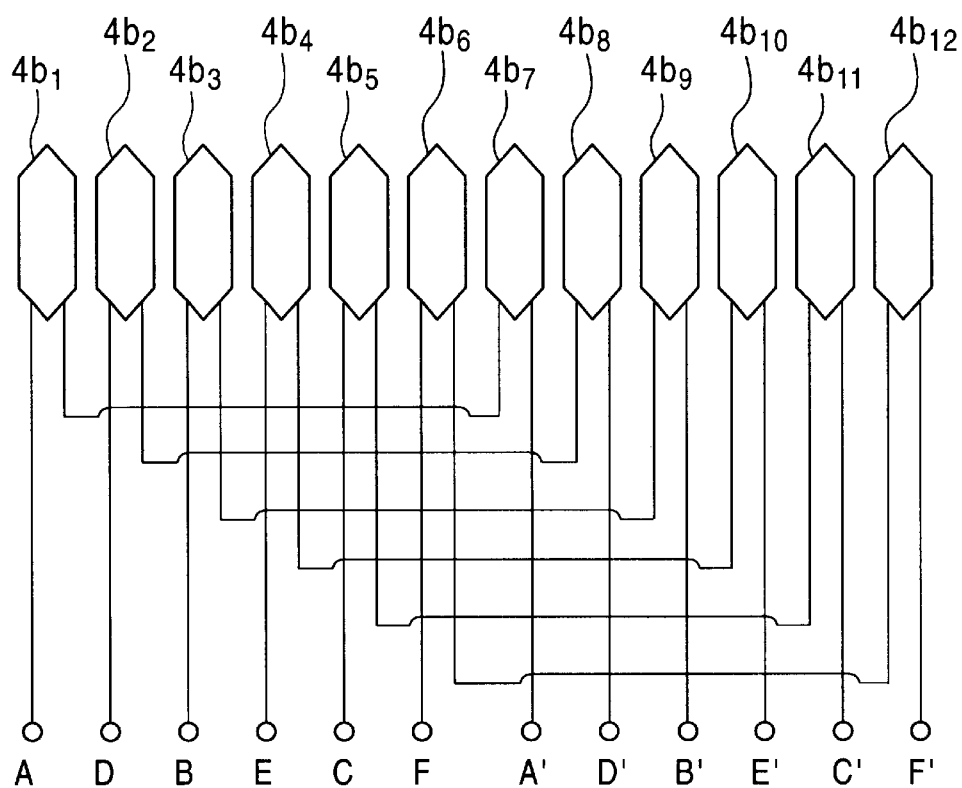
FIG. 19 is a connection diagram showing a connection condition of monofier windings according to the second embodiment.

FIG. 19 shows a connection condition of monofier windings according to this embodiment. In FIG. 19, A and A' are lead lines of a circuit in which the windings $4b_1$ and $4b_7$ are serially connected, D and D' are lead lines of a circuit in which the windings $4b_2$ and $4b_8$ are serially connected, B and B' are lead lines of a circuit in which the windings $4b_3$ and $4b_9$ are serially connected, E and E' are lead lines of a circuit in which the windings $4b_4$ and $4b_{10}$ are serially connected, C and C' are lead lines of a circuit in which the windings $4b_5$ and $4b_{11}$ are serially connected, F and F' are lead lines of a circuit in which the windings $4b_6$ and $4b_{12}$ are serially connected, and a pulse output circuit for driving is connected to the respective terminals of these lead lines.

Operation of the above described motor is executed according to a sequential chart that is the same as FIG. 11 for the first embodiment. Accordingly, the operation can be described by FIG. 12 when the six magnetic poles is added with reference to the description of the this embodiment and the positions of the rotor magnetic poles are illustrated corresponding to the positions of the stator magnetic poles. The motor of the second embodiment continues to rotate by the angle $\tau R_2/12$ by applying pulse current to the respective lead lines in sequence as shown in FIG. 11.

Third Embodiment

A third embodiment where the present invention is applied to a 10-phase/10-pole motor (an inner rotor hybrid stepping motor) will be described with reference to FIGS. 20 through 27.

Illustrations and descriptions for the matters that are easily understood based on the descriptions for the 6-phase/6-pole motor and the 6-phase/12-pole motor of the first and second embodiments are omitted. Further, the elements corresponding to that in the first embodiment are represented by the same symbols or the same symbols with different suffixes, and the detailed descriptions will be omitted.

With respect to the operation, for example, the action when the driving current is applied to the respective lead lines, may be understood with reference to the developed magnetic poles shown in FIGS. 6, 7 and 8 in consideration of the difference of the step angle due to the pitches of the magnetic pole and the pole teeth.

Figure 20:
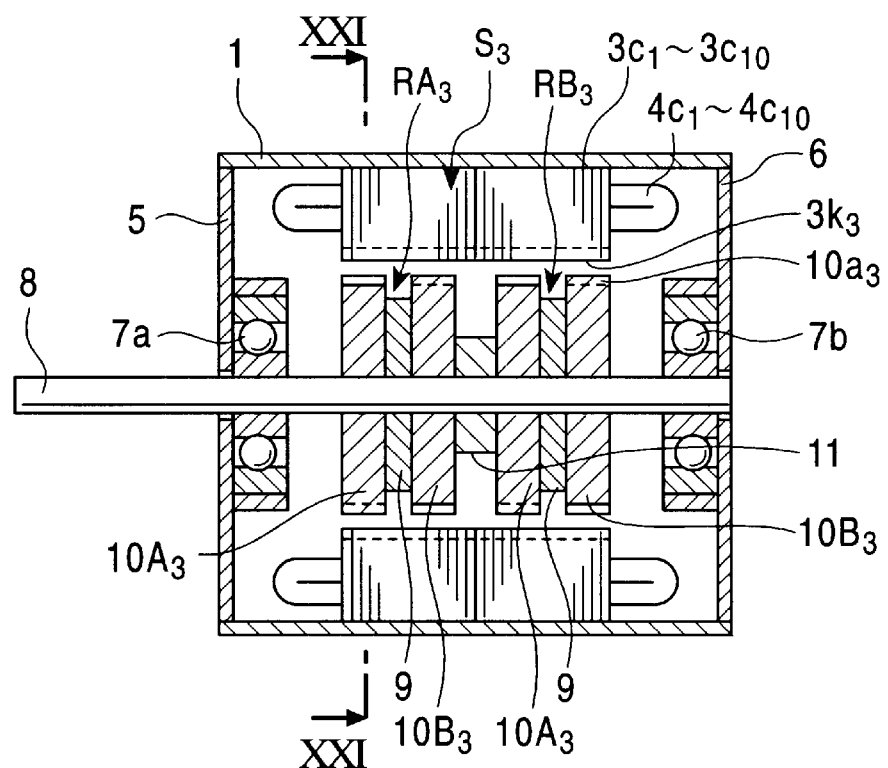
FIG. 20 is a longitudinal sectional front view of a third embodiment (a 10-phase/10-pole inner rotor hybrid stepping motor) of the present invention.
Figure 21:
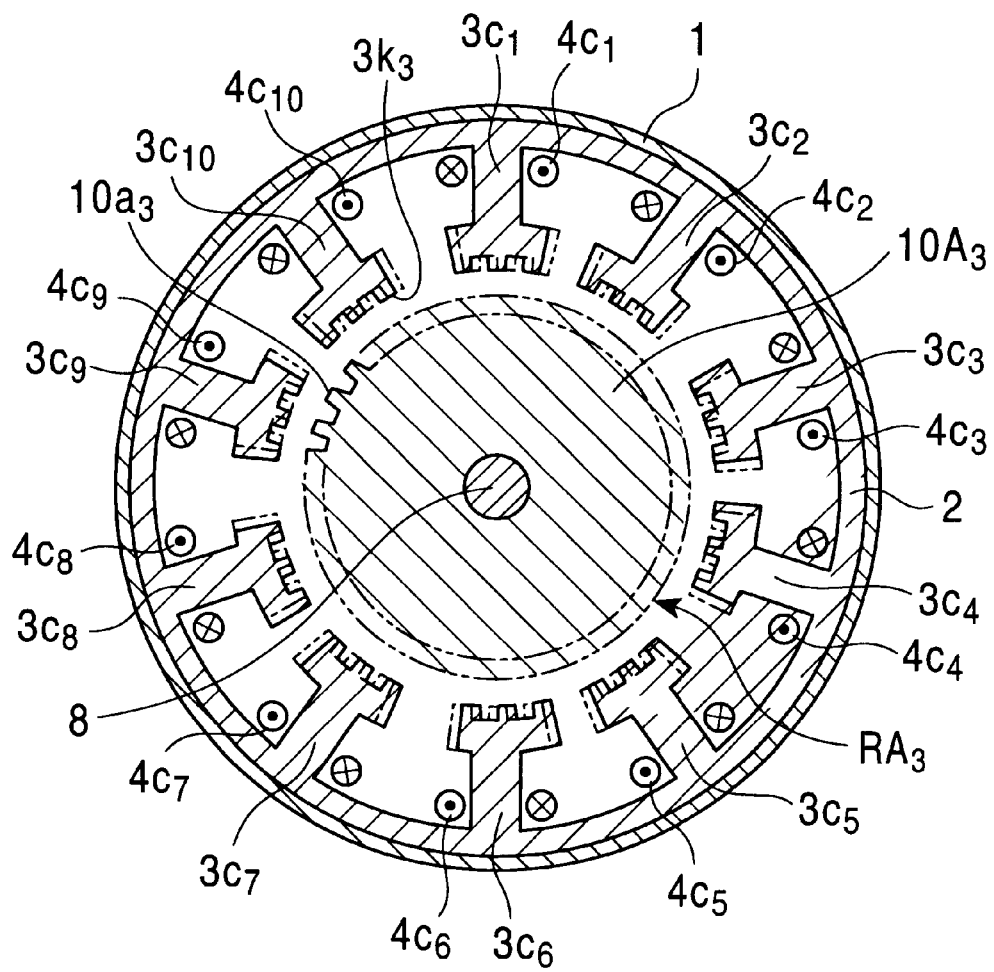
FIG. 21 is a sectional view of FIG. 20 along XXI—XXI line.

FIG. 20 is a longitudinal sectional front view of the 10-phase/10-pole motor and FIG. 21 is a sectional view of FIG. 20 along XXI—XXI line.

In FIGS. 20 and 21, a symbol $S_3$ is a stator whose pole teeth of one half in the axial direction is deviated from pole teeth of the other half by ¼ of the pitches of the pole teeth. Ten magnetic poles $3c_1$ through $3c_{10}$ are centripetally formed around the inner circumference of the stator iron core 2 at equal angular intervals. The magnetic poles are formed so as to invert the formation positions of the pole teeth to each other.

Namely, on the tip ends of the respective magnetic poles, a predetermined number of pole teeth $3k_3$ are formed at equal pitches. Each of the magnetic poles $3c_1$, $3c_3$, $3c_5$, $3c_7$ and $3c_9$ has a first half where the pole teeth are line-symmetric with respect to the respective magnetic poles and a second half where the pole teeth are asymmetric. The first and second halves are arranged in the axial direction. Each of the magnetic poles $3c_2$, $3c_4$, $3c_6$, $3c_8$ and $3b_{10}$ also has a first half where the pole teeth are line-symmetric with respect to the respective magnetic poles and a second half where the pole teeth are asymmetric, while the first and second halves are arranged in the opposite direction to the above.

Windings $4c_1$ through $4c_{10}$ are wound around the magnetic poles, respectively.

A first rotor unit $RA_3$ is connected to the rotor axis 8 at the position to face a half of the stator with a predetermined air gap with respect to the inner circumferential surface of the stator $S_3$, and a second rotor unit $RB_3$ is connected at the position to face the other half of the stator with a predetermined air gap with respect to the inner circumferential surface of the stator $S_3$. A non-magnetic substance 11 having annular shape of a predetermined width is arranged between the above described first rotor unit $RA_3$ and the second rotor unit $RB_3$.

The first rotor unit $RA_3$ and the second rotor unit $RB_3$ have the same structure, two rotor magnetic poles $10A_3$ and $10B_3$ are fixed to the rotor axis 8 to sandwich a permanent magnet 9 magnetized in the axial direction therebetween.

Pole teeth $10a_3$, which correspond to the pole teeth $3k_3$ formed on the respective magnetic poles of the stator in shape and pitch, are formed around the respective outer circumferential surfaces of the two rotor magnetic poles $10A_3$ and $10B_3$. The positional relationship among the respective rotor teeth $10a_3$ is described below. The pole teeth $10a_3$ of the first rotor magnetic pole $10A_3$ is deviated from the pole teeth $10a_3$ of the second rotor magnetic pole $10B_3$ by ½ of the pitch of the rotor teeth $10a_3$, and the first and second rotor units $RA_3$ and $RB_3$ are connected with a deviation of ¼ of the pitch of the rotor teeth $10a_3$.

Figure 22:
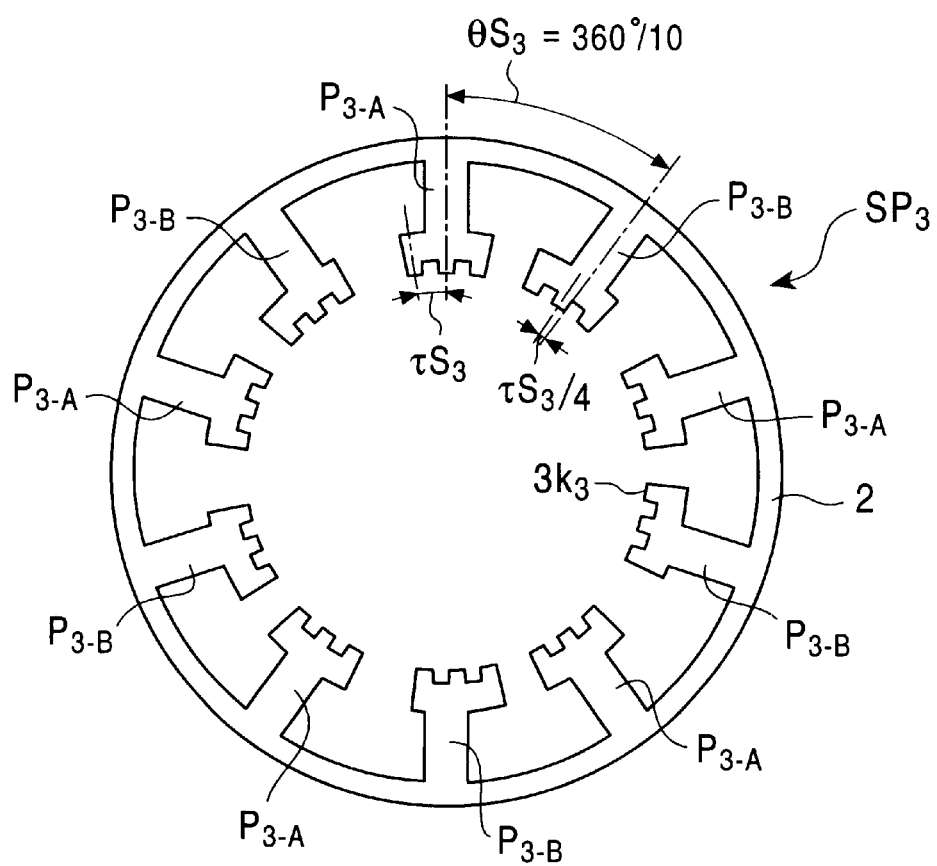
FIG. 22 is a plan view showing a shape of a magnetic material plate (a stator iron plate) to form a stator according to the third embodiment.

Next, an example of a making method of the stator for the 10-phase/10-pole motor will be described with reference to FIG. 22.

The stator is constructed by connecting first and second halves each of which consists of a predetermined number of annular magnetic material plates (referred to as stator iron plates in the following description) $SP_3$ shown in FIG. 22 stacked one on another. The stator iron plate $SP_3$ is provided with ten magnetic poles in total centripetally formed around the inner circumference. There are five magnetic poles $P_{3-A}$ and five magnetic poles $P_{3-B}$. The two kinds of the magnetic poles $P_{3-A}$ and $P_{3-B}$ are alternatively arranged at equal pitches. The angular interval $\theta S_3$ between the adjacent magnetic poles $P_{3-A}$ and $P_{3-B}$ is equal to 360°/10, that is 36°. On the inner tip end of the magnetic pole $P_{3-A}$, a predetermined number of pole teeth $3k_3$ are formed to be line-symmetric with respect to a center line of the magnetic pole at equal pitches $\tau S_3$. On the inner tip end of the magnetic pole $P_{3-B}$, pole teeth $3k_3$ are formed at the same pitches and the same number as the pole teeth of the magnetic pole $P_{3-A}$. The pole teeth of the magnetic poles $P_{3-B}$ are deviated by ¼ of the pole teeth pitch, that is $\tau S_3/4$, in the same circumferential direction. A predetermined number of the stator iron plates are stacked so as to overlap the pole teeth to construct the first and second halves of the stator $S_3$.

The first and second halves are connected to each other such that the second half is rotationally deviated from the first half by the magnetic pole pitch, that is 36°, thereby the stator $S_3$ is constructed.

Since the stator $S_3$ is formed to face the two rotor units $RA_3$ and $RB_3$ that sandwich the non-magnetic substance 11 therebetween, the respective halves of the stator $S_3$ may be constructed by different number of the stator iron plates so long as the two halves of the stator $S_3$ reliably face the rotor units $RA_3$ and $RB_3$, respectively, as also described in the first and second embodiments.

Each stator iron plate $SP_3$ may be formed by a punch press. The rotor magnetic poles $10A_3$ and $10B_3$ that constitute each rotor may be also formed by stacking a predetermined number of magnetic material plates having a predetermined shape punched by a punch press.

Structure of the magnetic pole portion of the stator formed by the above described method will be described with reference to FIGS. 23A and 23B.

Figure 23A:
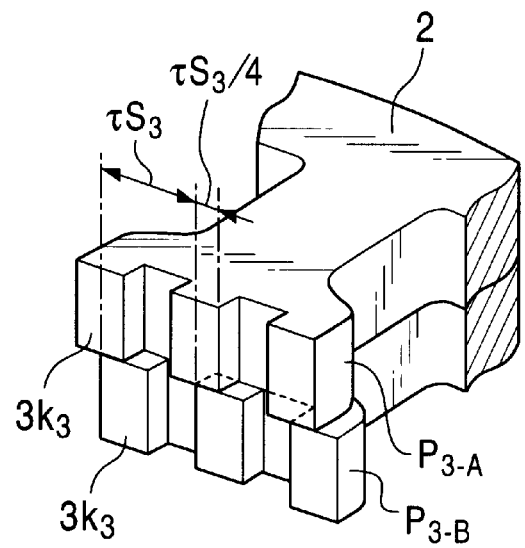
FIGS. 23A and 23B show shapes of the tip ends of magnetic poles of the stator according to the third embodiment.
Figure 23B:
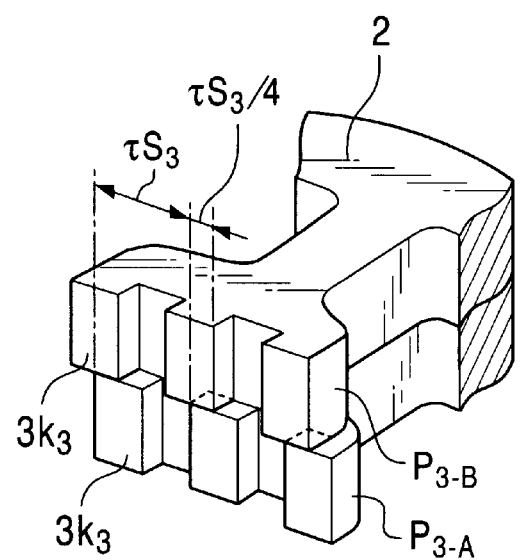

Each of the magnetic poles of the stator $S_3$ shown in FIGS. 23A and 23B is formed of a half $P_{3-A}$ that has the pole teeth $3k_3$ being line-symmetric with respect to the magnetic pole and the other half $P_{3-B}$ that has the same number of the pole teeth $3k_3$ that are asymmetric with respect to the magnetic pole and are deviated by ¼ of the pole teeth pitch.

The magnetic pole shown in FIG. 23A is provided with the half $P_{3-A}$ at the upper side in the drawings and the other half $P_{3-B}$ at the lower side, while the magnetic pole shown in FIG. 23B is provided with the half $P_{3-A}$ at the lower side and the other half $P_{3-B}$ at the upper side.

Figure 24:
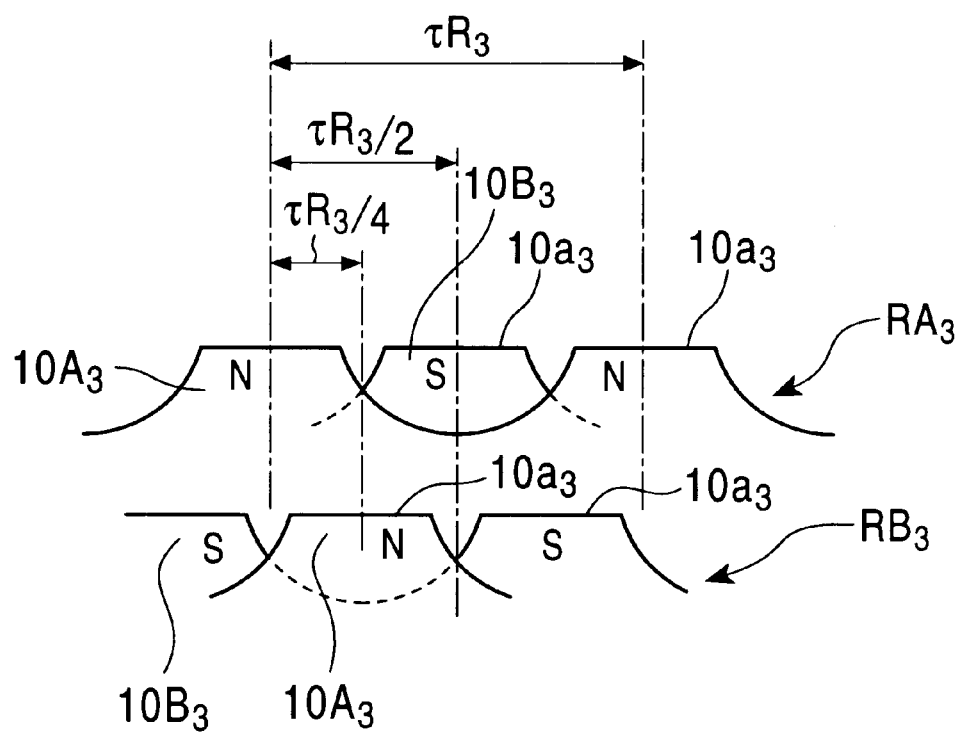
FIG. 24 is an enlarged side view showing a relationship among the pole teeth of four magnetic poles of a rotor unit that constitutes the rotor according to the third embodiment.

FIG. 24 is an enlarged side view showing a relationship among the pole teeth of the respective rotor magnetic poles that constitute the rotor. In the condition shown in FIG. 24, the pole teeth $10a_3$ of the first rotor magnetic poles $10A_3$ of the first and second rotor units $RA_3$ and $RB_3$ are magnetized in N-pole, and the pole teeth $10a_3$ of the second rotor magnetic poles $10B_3$ of the first and second rotor units $RA_3$ and $RB_3$ are magnetized in S-pole due to the magnetized direction of the permanent magnet 9.

Assuming that the pitch of the pole teeth $10a_3$ formed on the respective rotor magnetic poles is represented by $\tau R_3$, the angular interval between the pole teeth $10a_3$ of the first rotor magnetic pole $10A_3$ and the pole teeth $10a_3$ of the second rotor magnetic pole $10B_3$ is equal to $\tau R_3/2$. The angular interval between the pole teeth $10a_3$ of the first rotor magnetic pole $10A_3$ of the first rotor unit $RA_3$ and the pole teeth $10a_3$ of the first rotor magnetic pole $10A_3$ of the second rotor unit $RB_3$, and the angular interval between the pole teeth $10a_3$ of the second rotor magnetic pole $10B_3$ of the first rotor unit $RA_3$ and the pole teeth $10a_3$ of the second rotor magnetic pole $10B_3$ of the second rotor unit $RB_3$ are equal to $\tau R_3/4$.

Interrelationships between the pole teeth of the stator and the rotor under the following conditions (16-1), (16-2) and (16-3) are shown in FIG. 6, FIG. 7 and FIG. 8, respectively. The conditions (16-1), (16-2) and (16-3) correspond the conditions (4-1), (4-2) and (4-3) described in the first embodiment, while the symbols $\tau R_1$ and $\tau S_1$ are replaced with $\tau R_3$ and $\tau S_3$.

$$\tau R_3 = \tau S_3 \tag{16-1}$$

$$0.75\tau R_2 \leq \tau S_2 < \tau R_3 \tag{16-2}$$

$$\tau R_3 < \tau S_3 \leq 1.25\tau R_3 \tag{16-3}$$

Since the interrelationships between the pole teeth of the stator and the rotor is the same as the first embodiment as shown in FIGS. 6, 7 and 8, illustration is omitted. When the FIGS. 6, 7 and 8 are used to explain the third embodiment, the symmetric magnetic poles $3a_{1-1}$ and $3a_{1-2}$ are replaced with $3a_{3-1}$ and $3a_{3-2}$, the asymmetric magnetic poles $3b_{1-1}$ and $3b_{1-2}$ are replaced with $3b_{3-1}$ and $3b_{3-2}$, the pitch $\theta S_1 = 360°/6$ of the magnetic poles of the stator is replaced with $\theta S_3 = 360°/10$, the pole teeth pitch $\tau S_1$ of the stator is replaced with $\tau S_3$, the first rotor units $RA_{1-1}$, $RA_{1-2}$ and $RA_{1-3}$ are replaced with $RA_{3-1}$, $RA_{3-2}$ and $RA_{3-3}$, the second rotor unit $RB_1$ is replaced with $RB_3$, the first rotor magnetic poles $10A_{1-1}$, $10A_{1-2}$ and $10A_{1-3}$ are replaced with $10A_{3-1}$, $10A_{3-2}$ and $10A_{3-3}$, the pitches $\tau R_{1-1}$, $\tau R_{1-2}$ and $\tau R_{1-3}$ are replaced with $\tau R_{3-1}$, $\tau R_{3-2}$ and $\tau R_{3-3}$, the angular intervals $\alpha_{1-1}$, $\alpha_{1-2}$ and $\alpha_{1-3}$ between the pole tooth of the predetermined stator magnetic pole and the rotor pole tooth when the corresponding pole tooth of the adjacent stator magnetic pole is coincident with the position of the rotor pole tooth are replaced with $\alpha_{3-1}$, $\alpha_{3-2}$ and $\alpha_{3-3}$.

In the 10-phase/10-pole motor of the third embodiment, when the relationship of the pitches of the stator pole teeth and the rotor pole teeth is represented by the equation (16-1), the angular interval $\alpha_{3-1}$ between the pole tooth of the predetermined stator magnetic pole and the rotor pole tooth when the corresponding pole tooth of the adjacent stator magnetic pole is coincident with the position of the rotor pole tooth becomes $\tau R_{3-1}/20$ in the case that the number of the rotor pole teeth satisfies the following condition (17) that is a solution of the equation (3) for m=1.

$$Z_{3-1} = 10n+2 \text{ or } Z_{3-1} = 10n+3 \tag{17}$$

Where $Z_{3-1}$ is a number of the pole teeth of the respective rotor magnetic poles and n is an integer equal to or larger than 1.

Further, when the relationship of the pitches of the stator pole teeth and the rotor pole teeth is represented by the condition (16-2), the angular interval $\alpha_{3\text{-}2}$ between the pole tooth of the predetermined stator magnetic pole and the rotor pole tooth when the corresponding pole tooth of the adjacent stator magnetic pole is coincident with the position of the rotor pole tooth becomes $\tau R_{3\text{-}2}/20$ in the case that the number of the rotor pole teeth satisfies the following condition (18) that is a solution of the equation (3) for m=1.

$$Z_{3\text{-}2}=10n+2 \text{ or } Z_{3\text{-}2}=10n+3 \qquad (18)$$

Where $Z_{3\text{-}2}$ is a number of the pole teeth of the respective rotor magnetic poles and n is an integer equal to or larger than 1.

Further, when the relationship of the pitches of the stator pole teeth and the rotor pole teeth is represented by the condition (16-3), the angular interval $\alpha_{3\text{-}3}$ between the pole tooth of the predetermined stator magnetic pole and the rotor pole tooth when the corresponding pole tooth of the adjacent stator magnetic pole is coincident with the position of the rotor pole tooth becomes $\tau R_{3\text{-}3}/20$ in the case that the number of the rotor pole teeth satisfies the following condition (19) that is a solution of the equation (3) for m=1.

$$Z_{3\text{-}3}=10n+2 \text{ or } Z_{3\text{-}3}=10n+3 \qquad (19)$$

Where $Z_{3\text{-}3}$ is a number of the pole teeth of the respective rotor magnetic poles and n is an integer equal to or larger than 1.

A table in FIG. 25 shows a relationship between the number of rotor pole teeth (referred to as Z) and the step angles for various numbers of n according to this embodiment.

In this drawing, the step angles for various numbers of n when the number of teeth Z is equal to 10n+2 and 10n+3 are shown in the vertical direction.

Figure 26:
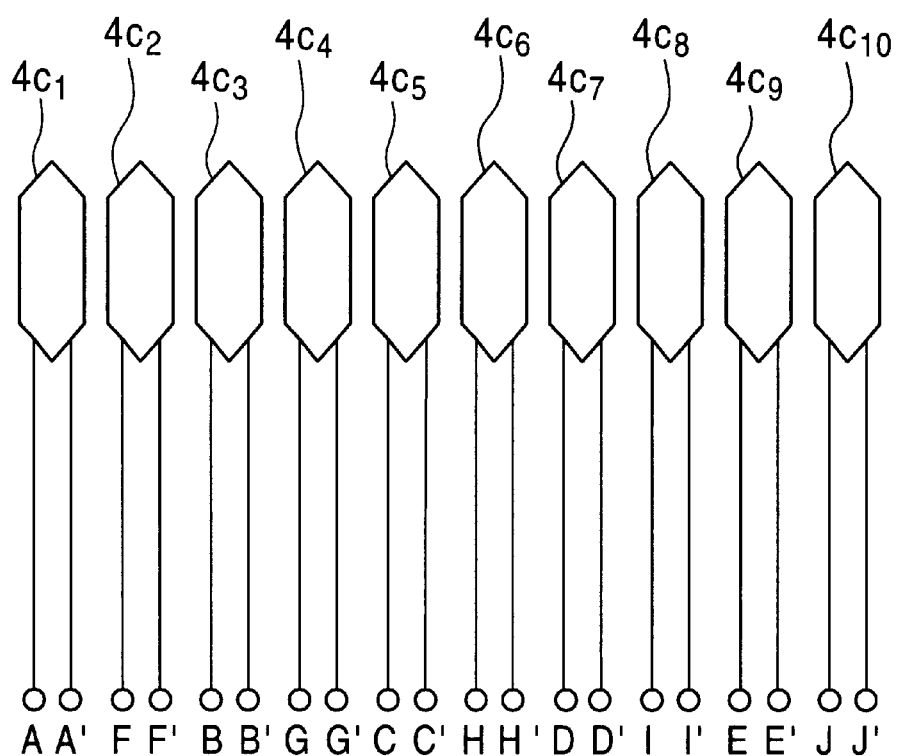
FIG. 26 is a connection diagram showing a connection condition of monofier windings according to the third embodiment.

FIG. 26 shows a connection condition of monofier windings according to this embodiment. In FIG. 26, A and A' are lead lines of the windings $4c_1$, F and F' are lead lines of the windings $4c_2$, B and B' are lead lines of the windings $4c_3$, G and G' are lead lines of the windings $4c_4$, C and C' are lead lines of the windings $4c_5$, H and H' are lead lines of the windings $4c_6$, D and D' are lead lines of the windings $4c_7$, I and I' are lead lines of the windings $4c_8$, E and E' are lead lines of the windings $4c_9$, J and J' are lead lines of the windings $4c_{10}$, and an excitation electric current output circuit for driving is connected to the respective terminals of these lead lines.

Figure 27:
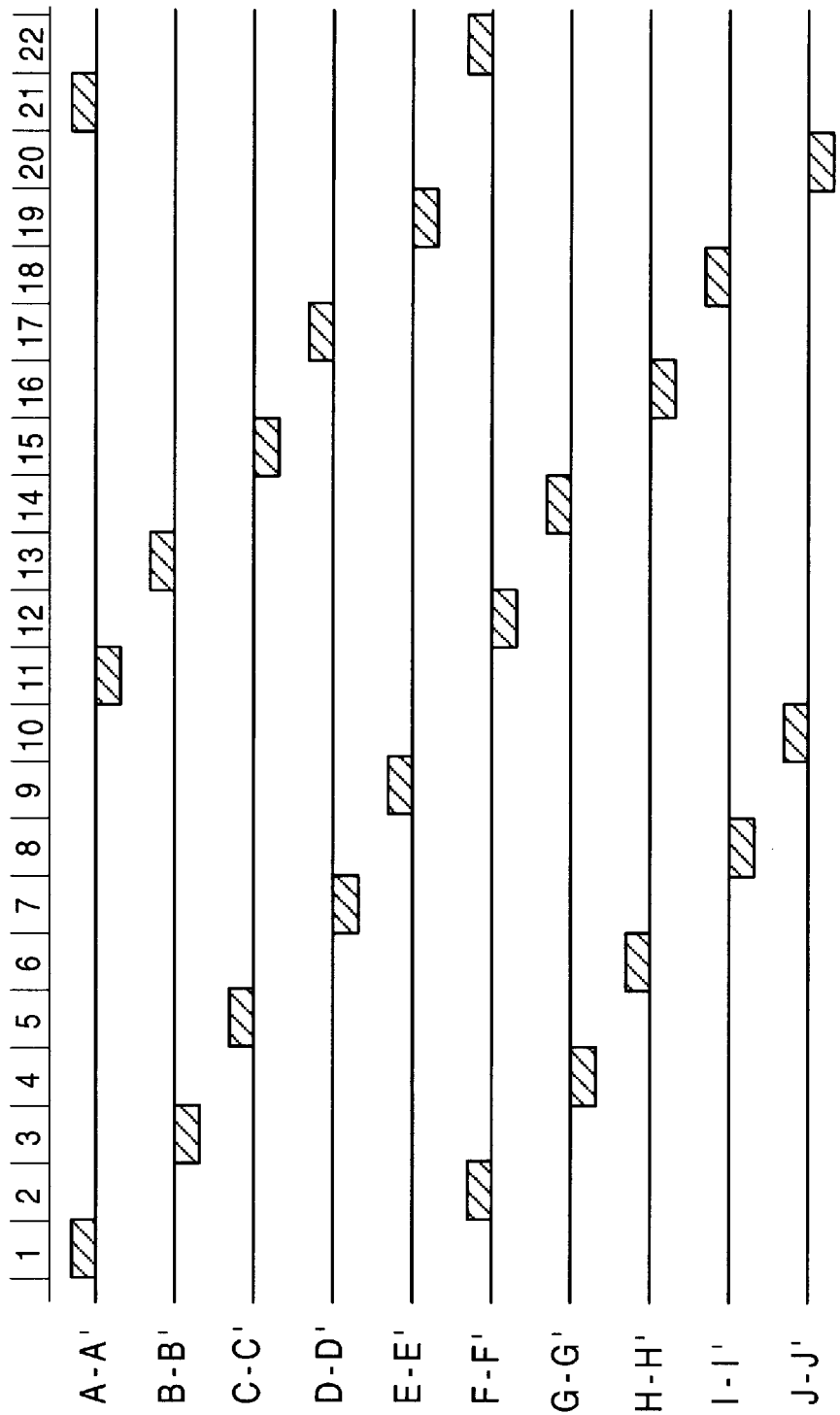
FIG. 27 is an excitation sequence diagram of one-phase excitation in the bipolar drive for the third and fourth embodiments.

Operation of the above described motor is executed according to a sequential chart of FIG. 27 in the similar manner to the chart of FIG. 11 for the first and second embodiments.

In FIG. 27, a horizontal axis represents a flow of the action steps (a sequence) from step 1 to step 22, and the illustration of step 23 and the later steps are omitted.

The above described lead lines are shown in the vertical direction. On the respective horizontal axes, timings to supply pulse electric current corresponding to the respective steps are shown as quadrilaterals.

A quadrilateral above a horizontal line showing each of the lead lines shows that an electric current passes from the lead line A to the lead line A' and a quadrilateral below a horizontal line shows that an electric current passes from the lead line A' to the lead line A, for example.

Accordingly, this motor rotates one step angle by one step angle as a pulse electric current is applied to each of the lead lines in sequence as shown in FIG. 27.

The operation can be described by FIG. 12 when the number of the magnetic poles is changed to ten with reference to the description of the this embodiment and the positions of the rotor magnetic poles are illustrated corresponding to the positions of the stator magnetic poles. The motor of the third embodiment continues to rotate by the angle $\tau R_3/20$ by applying pulse current to the respective lead lines in sequence as shown in FIG. 27, and the motor rotates by one pitch of the pole teeth with twenty pulses.

Fourth Embodiment

A fourth embodiment where the present invention is applied to a 10-phase/20-pole motor (an inner rotor hybrid stepping motor) will be described with reference to FIGS. 28 through 34.

Illustrations and descriptions for the matters that are easily understood based on the descriptions for the 6-phase/6-pole motor, the 6-phase/12-pole motor and the 10-phase/10-pole motor of the first, second and third embodiments are omitted.

With respect to the operation, for example, the action when the driving current is applied to the respective lead lines, may be understood with reference to the developed magnetic poles shown in FIGS. 6, 7 and 8 in consideration of the difference of the step angle due to the pitches of the magnetic pole and the pole teeth.

Further, the elements corresponding to that in the first embodiment are represented by the same symbols or the same symbols with different suffixes, and the detailed descriptions will be omitted.

Figure 28:
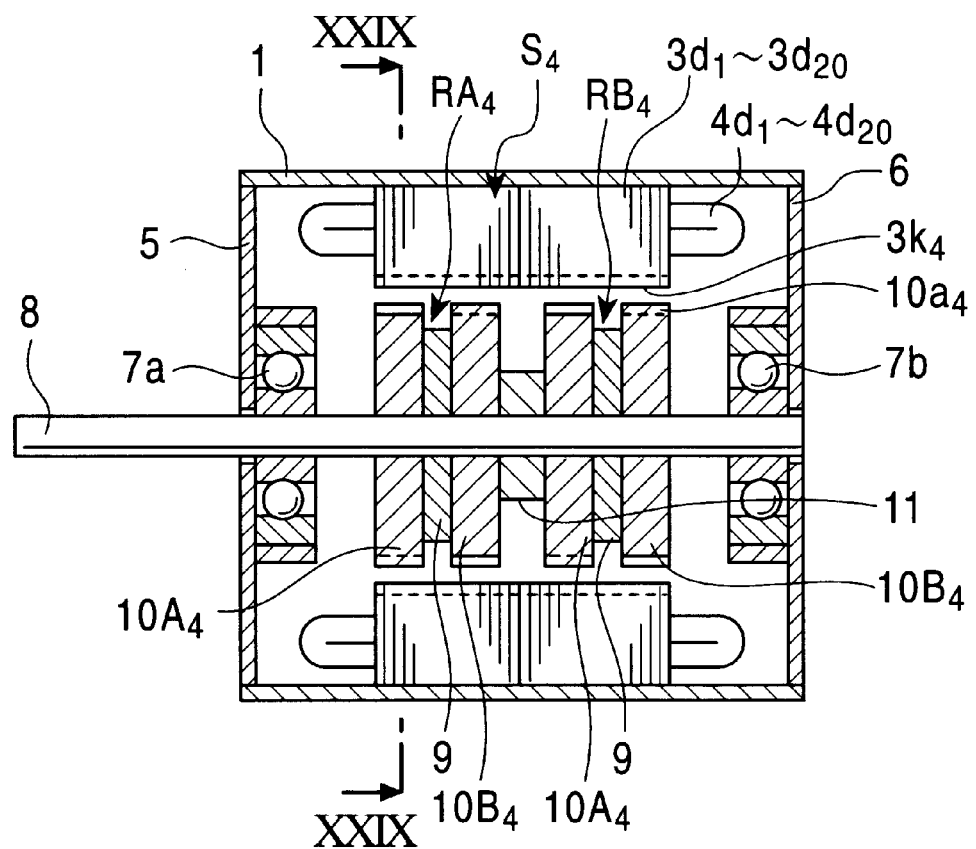
FIG. 28 is a longitudinal sectional front view of a fourth embodiment (a 10-phase/20-pole inner rotor hybrid stepping motor) of the present invention.
Figure 29:
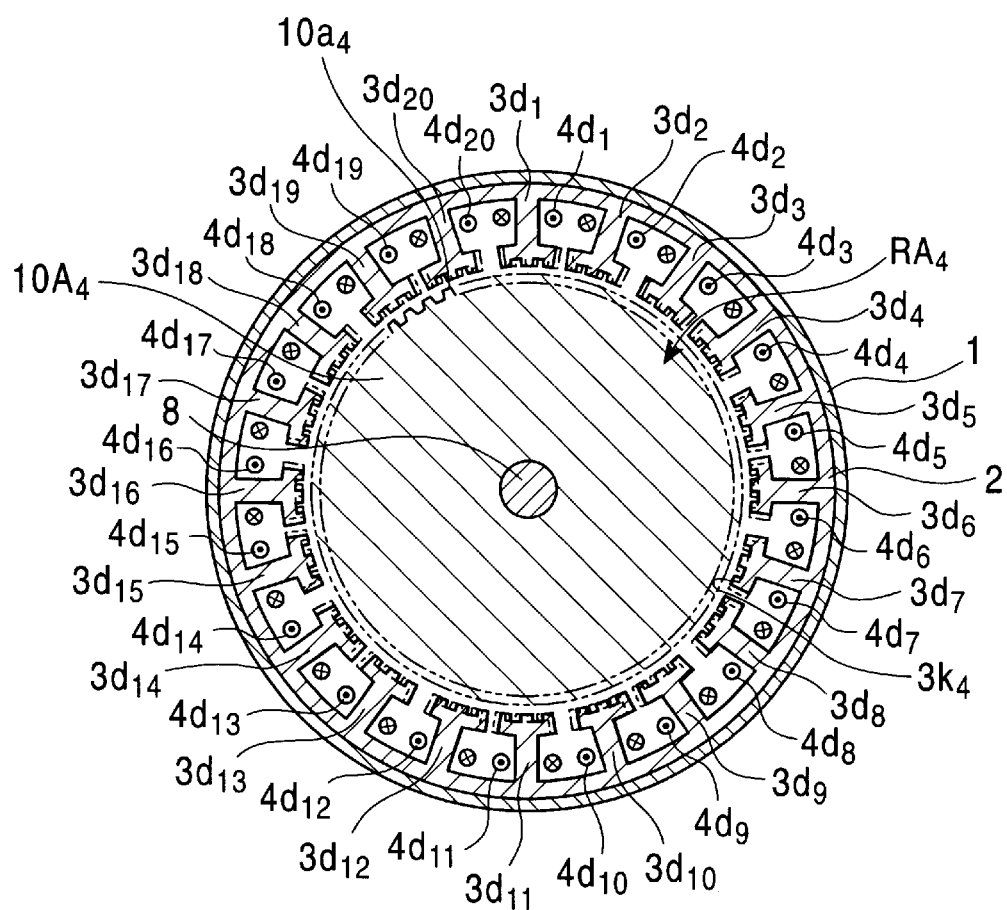
FIG. 29 is a sectional view of FIG. 28 along XXIX—XXIX line.

FIG. 28 is a longitudinal sectional front view of the 10-phase/20-pole motor and FIG. 29 is a sectional view of FIG. 28 along XXIX—XXIX line.

In FIGS. 28 and 29, a symbol $S_4$ is a stator and twenty magnetic poles $3d_1$ through $3d_{20}$ are centripetally formed around the inner circumference of the stator iron core 2 at equal angular intervals. The magnetic poles are formed so as to invert the formation positions of the pole teeth to each other.

Namely, on the tip ends of the respective magnetic poles, a predetermined number of pole teeth $3k_4$ corresponding to construction characteristic of this motor are formed at equal pitches. Each of the magnetic poles $3d_1$, $3d_3$, $3d_5$, $3d_7$, $3d_9$, $3d_{11}$, $3d_{13}$, $3d_{15}$, $3d_{17}$ and $3d_{19}$ has a first half where the pole teeth are line-symmetric with respect to the respective magnetic poles and a second half where the pole teeth are asymmetric. The first and second halves are arranged in the axial direction. Each of the magnetic poles $3d_2$, $3d_4$, $3d_6$, $3d_8$, $3d_{10}$, $3d_{12}$, $3d_{14}$, $3d_{16}$, $3d_{18}$ and $3d_{20}$ also has a first half where the pole teeth are line-symmetric with respect to the respective magnetic poles and a second half where the pole teeth are asymmetric, while the first and second halves are arranged in the opposite direction to the above.

Windings $4d_1$ through $4d_{20}$ are wound around the magnetic poles, respectively.

A first rotor unit $RA_4$ is connected to the rotor axis 8 at the position to face a half of the stator with a predetermined air gap with respect to the inner circumferential surface of the stator $S_4$, and a second rotor unit $RB_4$ is connected at the position to face the other half of the stator with a predetermined air gap with respect to the inner circumferential surface of the stator $S_4$. A non-magnetic substance 11 having annular shape of a predetermined width is arranged between the above described first rotor unit $RA_4$ and the second rotor unit $RB_4$.

The first rotor unit $RA_4$ and the second rotor unit $RB_4$ have the same structure, two rotor magnetic poles $10A_4$ and $10B_4$ are fixed to the rotor axis 8 to sandwich a permanent magnet 9 magnetized in the axial direction therebetween.

Pole teeth $10a_4$, which correspond to the pole teeth $3k_4$ formed on the respective magnetic poles of the stator in shape and pitch, are formed around the respective outer circumferential surfaces of the two rotor magnetic poles $10A_4$ and $10B_4$. The positional relationship among the respective pole teeth $10a_4$ is described below. The pole teeth $10a_4$ of the first rotor magnetic pole $10A_4$ is deviated from the pole teeth $10a_4$ of the second rotor magnetic pole $10B_4$ by ½ of the pitch of the pole teeth $10a_4$, and the first and second rotor units $RA_4$ and $RB_4$ are connected with a deviation of ¼ of the pitch of the pole teeth $10a_4$.

Figure 30:
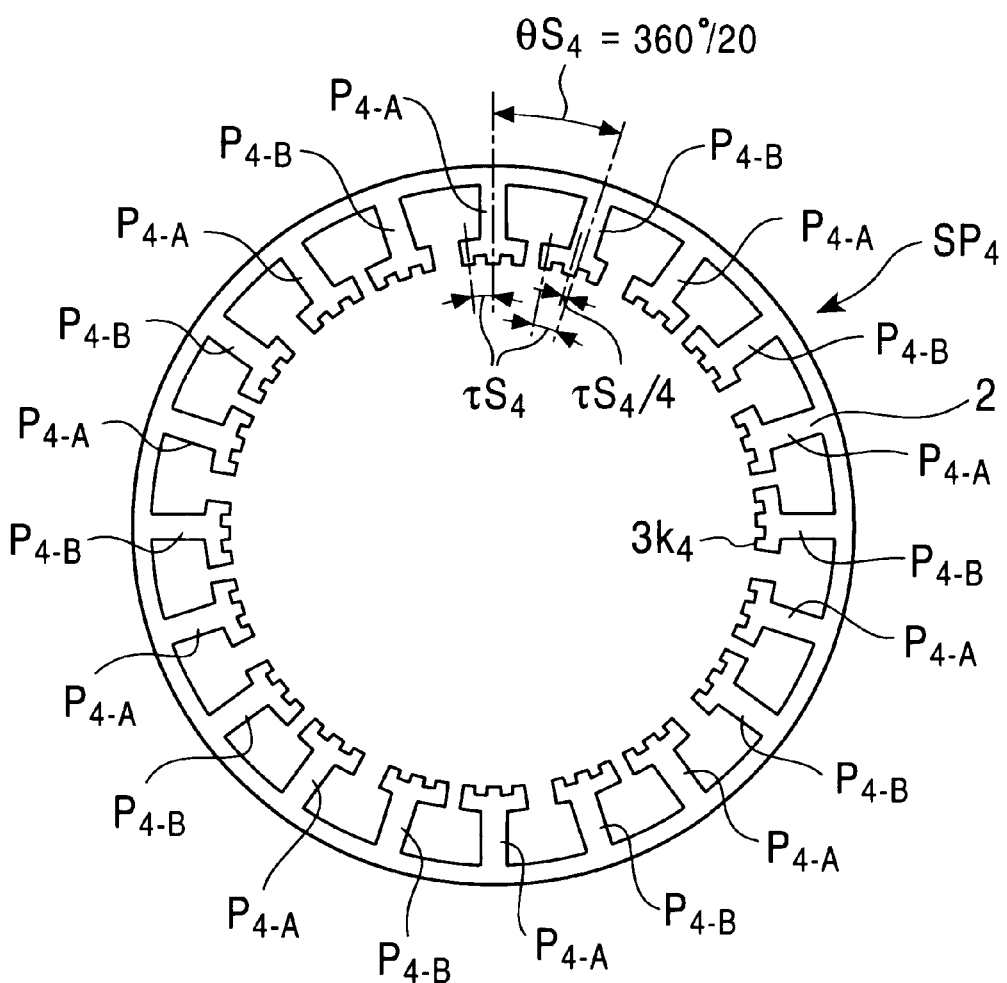
FIG. 30 is a plan view showing a shape of a magnetic material plate (a stator iron plate) to form a stator according to the fourth embodiment.

An example of a making method of the stator for the 10-phase/20-pole motor will be described with reference to FIG. 30.

The stator is constructed by connecting first and second halves each of which consists of a predetermined number of annular magnetic material plates (referred to as stator iron plates in the following description) $SP_4$ shown in FIG. 30 stacked one on another. The stator iron plate $SP_4$ is provided with twenty magnetic poles in total centripetally formed around the inner circumference. There are two kinds of magnetic poles $P_{4-A}$ and $P_{4-B}$ that are alternatively arranged at equal pitches. The angular interval $\theta S_4$ between the adjacent magnetic poles $P_{4-A}$ and $P_{4-B}$ is equal to 360°/20, that is 18°. On the inner tip end of the magnetic pole $P_{4-A}$, a predetermined number of pole teeth $3k_4$ are formed to be line-symmetric with respect to a center line of the magnetic pole at equal pitches $\tau S_4$. On the inner tip end of the magnetic pole $P_{4-B}$, pole teeth $3k_4$ are formed at the same pitches and the same number as the pole teeth of the magnetic pole $P_{4-A}$. The pole teeth of the magnetic poles $P_{4-B}$ are deviated by ¼ of the pole teeth pitch, that is $\tau S_4/4$, in the same circumferential direction. A predetermined number of the stator iron plates $SP_4$ are stacked so as to overlap the pole teeth to construct the first and second halves of the stator $S_4$.

The first and second halves are connected to each other such that the second half is rotationally deviated from the first half by the magnetic pole pitch, that is 18°, thereby the stator $S_4$ is constructed.

Since the stator $S_4$ is formed to face the two rotor units $RA_4$ and $RB_4$ that sandwich the non-magnetic substance 11 therebetween, the respective halves of the stator $S_4$ may be constructed by different number of the stator iron plates so long as the two halves of the stator $S_4$ reliably face the rotor units $RA_4$ and $RB_4$.

Each stator iron plate $SP_4$ may be formed by a punch press. The rotor magnetic poles $10A_4$ and $10B_4$ that constitute each rotor may be also formed by stacking a predetermined number of magnetic material plates having a predetermined shape punched by a punch press.

Structure of the magnetic pole portion of the stator formed by the above described method will be described with reference to FIGS. 31A and 31B as well as the first, second and third embodiments shown in FIGS. 4A and 4B, FIGS. 16A and 16B and FIGS. 23A and 23B, respectively.

Figure 31A:
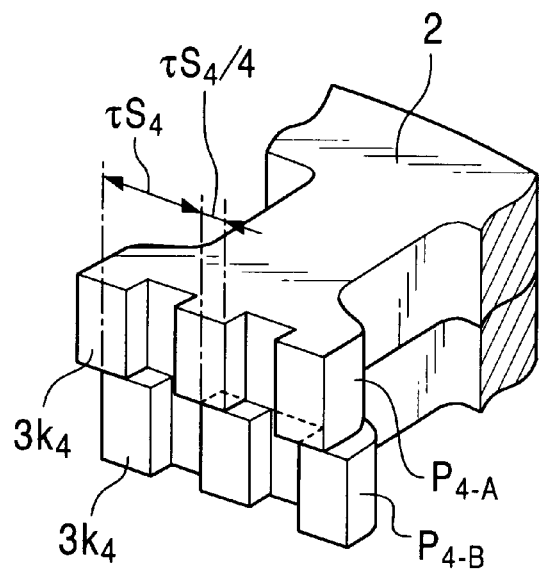
FIGS. 31A and 31B show shapes of the tip ends of magnetic poles of the stator according to the fourth embodiment.
Figure 31B:
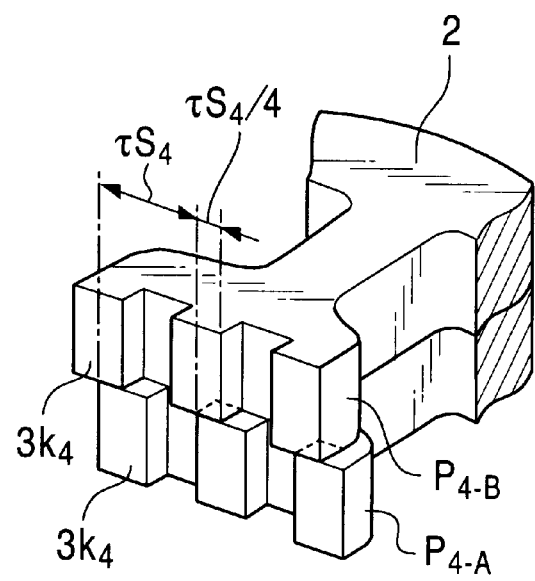

Each of the magnetic poles of the stator $S_4$ shown in FIGS. 31A and 31B is formed of a half $P_{4-A}$ that has the pole teeth $3k_4$ being line-symmetric with respect to the magnetic pole and the other half $P_{4-B}$ that has the same number of the pole teeth $3k_4$ that are asymmetric with respect to the magnetic pole and are deviated by ¼ of the pole teeth pitch.

The magnetic pole shown in FIG. 31A is provided with the half $P_{4-A}$ at the upper side in the drawings and the other half $P_{4-B}$ at the lower side, while the magnetic pole shown in FIG. 31B is provided with the half $P_{4-A}$ at the lower side and the other half $P_{4-B}$ at the upper side.

Figure 32:
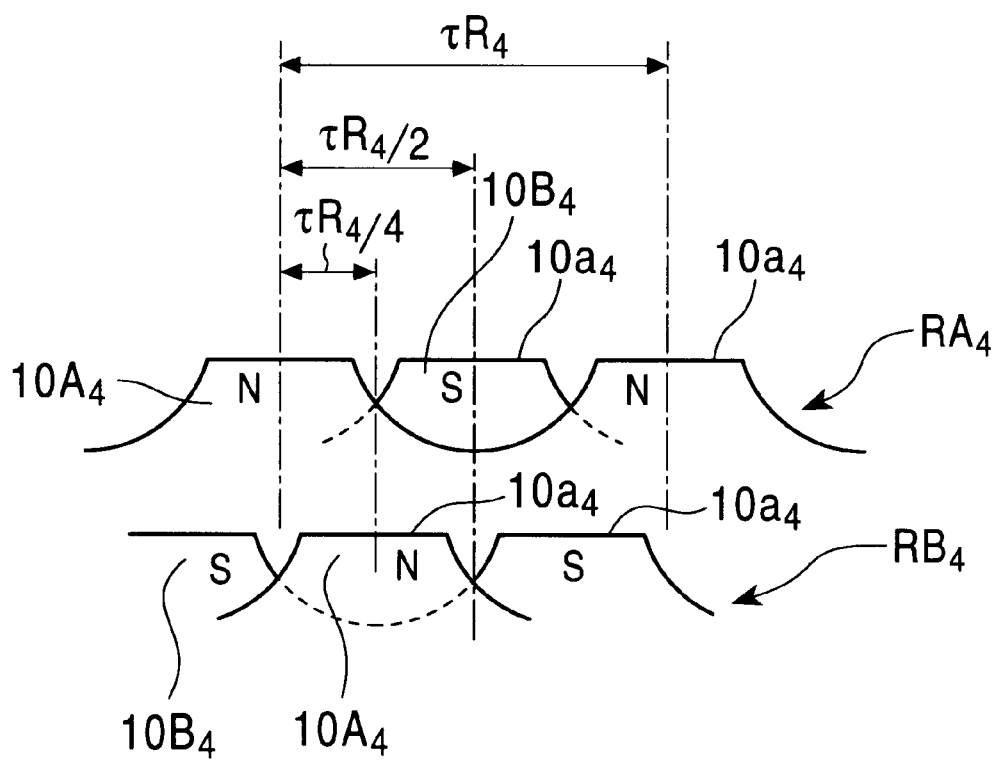
FIG. 32 is an enlarged side view showing a relationship among the pole teeth of four magnetic poles of a rotor unit that constitutes the rotor according to the fourth embodiment.

FIG. 32 is an enlarged side view showing a relationship among the pole teeth of the respective rotor magnetic poles that constitute the rotor.

In FIG. 32, the pole teeth $10a_4$ of the first rotor magnetic poles $10A_4$ of the first and second rotor units $RA_4$ and $RB_4$ are magnetized in N-pole, and the pole teeth $10a_4$ of the second rotor magnetic poles $10B_4$ of the first and second rotor units $RA_4$ and $RB_4$ are magnetized in S-pole due to the magnetized direction of the permanent magnet 9.

Assuming that the pitch of the pole teeth $10a_4$ formed on the respective rotor magnetic poles is represented by $\tau R_4$, the angular interval between the pole teeth $10a_4$ of the first rotor magnetic pole $10A_4$ and the pole teeth $10a_4$ of the second rotor magnetic pole $10B_4$ is equal to $\tau R_4/2$. The angular interval between the pole teeth $10a_4$ of the first rotor magnetic pole $10A_4$ of the first rotor unit $RA_4$ and the pole teeth $10a_4$ of the first rotor magnetic pole $10A_4$ of the second rotor unit $RB_4$, and the angular interval between the pole teeth $10a_4$ of the second rotor magnetic pole $10B_4$ of the first rotor unit $RA_4$ and the pole teeth $10a_4$ of the second rotor magnetic pole $10B_4$ of the second rotor unit $RB_4$ are equal to $\tau R_4/4$.

Interrelationships between the pole teeth of the stator and the rotor under the following conditions (20-1), (20-2) and (20-3) are shown in FIG. 6, FIG. 7 and FIG. 8, respectively. The conditions (20-1), (20-2) and (20-3) correspond the conditions (4-1), (4-2) and (4-3) described in the first embodiment, while the symbols $\tau R_1$ and $\tau S_1$ are replaced with $\tau R_4$ and $\tau S_4$.

$$\tau R_4 = \tau S_4 \tag{20-1}$$

$$0.75\tau R_4 \leq \tau S_4 < \tau R_4 \tag{20-2}$$

$$\tau R_4 < \tau S_4 \leq 1.25\tau R_4 \tag{20-3}$$

Since the interrelationships between the pole teeth of the stator and the rotor is the same as the first embodiment as shown in FIGS. 6, 7 and 8, illustration is omitted. When the FIGS. 6, 7 and 8 are used to explain the fourth embodiment, the symmetric magnetic poles $3a_{1-1}$ and $3a_{1-2}$ are replaced with $3a_{4-1}$ and $3a_{4-2}$, the asymmetric magnetic poles $3b_{1-1}$ and $3b_{1-2}$ are replaced with $3b_{4-1}$ and $3b_{4-2}$, the pitch $\theta S_1 = 360°/6$ of the magnetic poles of the stator is replaced with $\theta S_4 = 360°/20$, the pole teeth pitch $\tau S_1$ of the stator is replaced with $\tau S_4$, the first rotor units $RA_{1-1}$, $RA_{1-2}$ and $RA_{1-3}$ are replaced with $RA_{4-1}$, $RA_{4-2}$ and $RA_{4-3}$, the second rotor unit $RB_1$ is replaced with $RB_4$, the first rotor magnetic poles $10A_{1-1}$, $10A_{1-2}$ and $10A_{1-3}$ are replaced with $10A_{4-1}$, $10A_{4-2}$ and $10A_{4-3}$, the pitches $\tau R_{1-1}$, $\tau R_{1-2}$ and $\tau R_{1-3}$ are replaced with $\tau R_{4-1}$, $\tau R_{4-2}$ and $\tau R_{4-3}$, the angular intervals $\alpha_{1-1}$, $\alpha_{1-2}$ and $\alpha_{1-3}$ between the pole tooth of the predetermined stator magnetic pole and the rotor pole tooth when the corresponding pole tooth of the adjacent stator magnetic pole is coincident with the position of the rotor pole tooth are replaced with $\alpha_{4-1}$, $\alpha_{4-2}$ and $\alpha_{4-3}$.

In the 10-phase/20-pole motor of the fourth embodiment, when the relationship of the pitches of the stator pole teeth and the rotor pole teeth is represented by the equation (20-1), the angular interval $\alpha_{4-1}$ between the pole tooth of the predetermined stator magnetic pole and the rotor pole tooth when the corresponding pole tooth of the adjacent stator magnetic pole is coincident with the position of the rotor pole tooth becomes $\tau R_{4-1}/20$ in the case that the number of the rotor pole teeth satisfies the following condition (21) that is a solution of the equation (3) for m=2.

$$Z_{4-1} = 20n + 4 \text{ or } Z_{4-1} = 20n + 6 \tag{21}$$

Where $Z_{4-1}$ is a number of the pole teeth of the respective rotor magnetic poles and n is an integer equal to or larger than 1.

Further, when the relationship of the pitches of the stator pole teeth and the rotor pole teeth is represented by the condition (20-2), the angular interval $\alpha_{4-2}$ between the pole tooth of the predetermined stator magnetic pole and the rotor pole tooth when the corresponding pole tooth of the adjacent stator magnetic pole is coincident with the position of the rotor pole tooth becomes $\tau R_{4-2}/20$ in the case that the number of the rotor pole teeth satisfies the following condition (22) that is a solution of the equation (3) for m=2.

$$Z_{4-2}=20n+4 \text{ or } Z_{4-2}=20n+6 \qquad (22)$$

Where $Z_{4-2}$ is a number of the pole teeth of the respective rotor magnetic poles and n is an integer equal to or larger than 1.

Further, when the relationship of the pitches of the stator pole teeth and the rotor pole teeth is represented by the condition (20-3), the angular interval $\alpha_{4-3}$ between the pole tooth of the predetermined stator magnetic pole and the rotor pole tooth when the corresponding pole tooth of the adjacent stator magnetic pole is coincident with the position of the rotor pole tooth becomes $\tau R_{4-3}/20$ in the case that the number of the rotor pole teeth satisfies the following condition (23) that is a solution of the equation (3) for m=2.

$$Z_{4-3}=20n+4 \text{ or } Z_{4-3}=20n+6 \qquad (23)$$

Where $Z_{4-3}$ is a number of the pole teeth of the respective rotor magnetic poles and n is an integer equal to or larger than 1.

A table in FIG. 33 shows a relationship between the number of rotor pole teeth (referred to as Z) and the step angles for various numbers of n according to this embodiment.

In this drawing, the step angles for various numbers of n when the number of teeth Z is equal to 20n+4 and 20n+6 are shown in the vertical direction.

Figure 34:
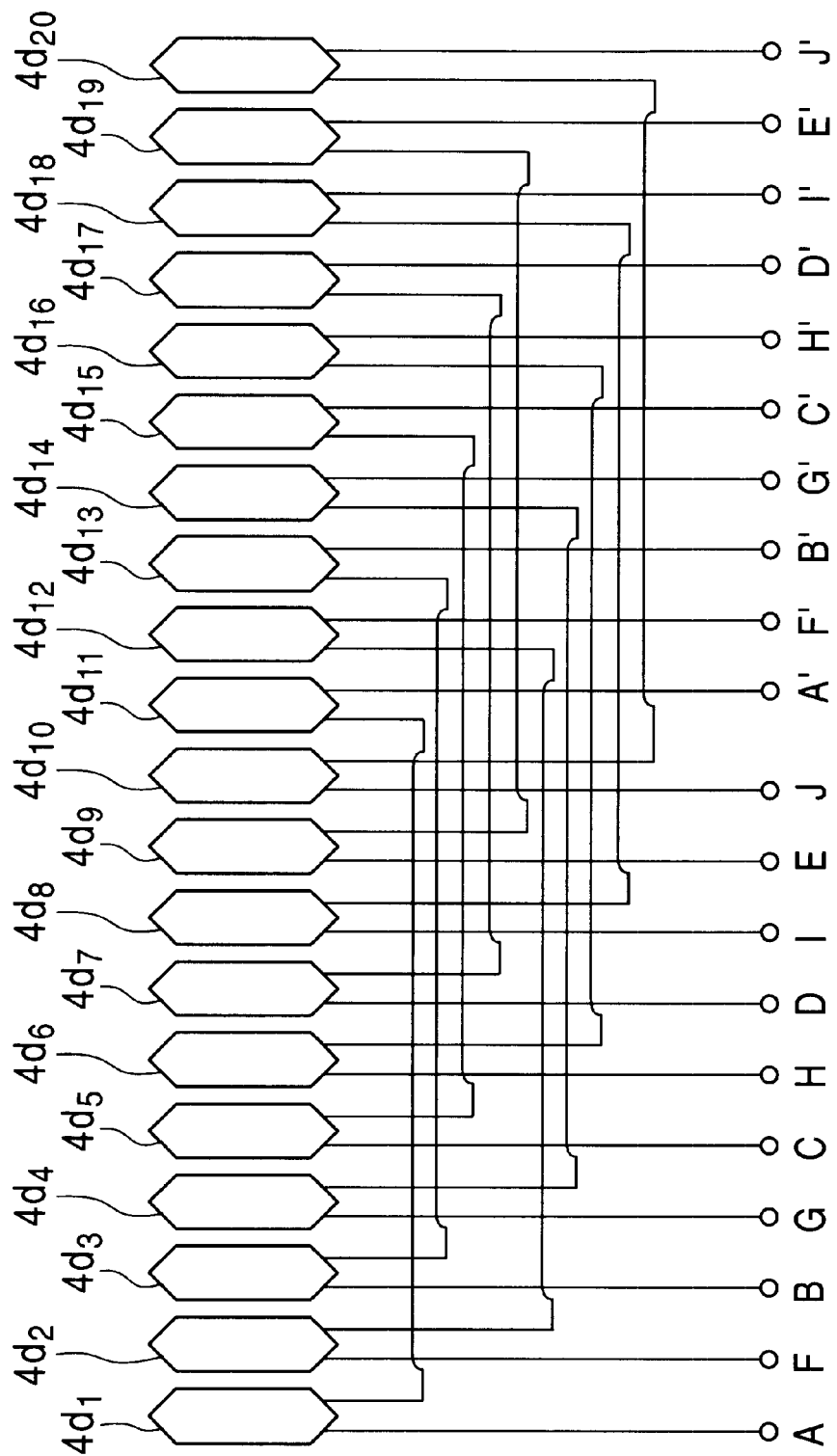
FIG. 34 is a connection diagram showing a connection condition of monofier windings according to the fourth embodiment.

FIG. 34 shows a connection condition of monofier windings according to this embodiment. In FIG. 34, A and A' are lead lines of a circuit in which the windings $4d_1$ and $4d_{11}$ are serially connected, F and F' are lead lines of a circuit in which the windings $4d_2$ and $4d_{12}$ are serially connected, B and B' are lead lines of a circuit in which the windings $4d_3$ and $4d_{13}$ are serially connected, G and G' are lead lines of a circuit in which the windings $4d_4$ and $4d_{14}$ are serially connected, C and C' are lead lines of a circuit in which the windings $4d_5$ and $4d_{15}$ are serially connected, H and H' are lead lines of a circuit in which the windings $4d_6$ and $4d_{16}$ are serially connected, D and D' are lead lines of a circuit in which the windings $4d_7$ and $4d_{17}$ are serially connected, I and I' are lead lines of a circuit in which the windings $4d_8$ and $4d_{18}$ are serially connected, E and E' are lead lines of a circuit in which the windings $4d_9$ and $4d_{19}$ are serially connected, J and J' are lead lines of a circuit in which the windings $4d_{10}$ and $4d_{20}$ are serially connected, and an excitation electric current output circuit for driving is connected to the respective terminals of these lead lines.

Operation of the above described motor is executed according to a sequential chart that is the same as FIG. 27 for the third embodiment. Accordingly, the operation can be described by FIG. 27 when the number of the magnetic poles is changed to twenty with reference to the description of the this embodiment and the positions of the rotor magnetic poles are illustrated corresponding to the positions of the stator magnetic poles. The motor of the fourth embodiment rotates by the step angle $\tau R_4/20$ for every pulse current applying to the respective lead lines in sequence as shown in FIG. 27, and the motor rotates by one pitch of the pole teeth with twenty pulses.

Fifth Embodiment

In the above described first through fourth embodiments, the examples where the present invention is applied to the inner rotor hybrid stepping motor are only described, while the same technical idea can be also applied to an outer rotor hybrid stepping motor.

Namely, detailed illustration and description are omitted, however, 6 m or 10 m (m is integer equal to or larger than 1) pieces of the stator magnetic poles, which are centripetally formed around the inner circumference of the annular magnetic substance of the stator iron-core toward the circle center at equal pitches in the inner rotor hybrid stepping motor of the first through fourth embodiments, are radially formed on a cylindrical surface forming the stator iron-core. The magnetic pole consists of a magnetic pole unit whose pole teeth are line-symmetric with respect to the shape of the magnetic pole and a magnetic pole unit whose pole teeth are deviated by ¼ of the pole teeth pitch that are alternatively arranged. The windings are wound around the respective magnetic poles to constitute the stator.

An annular rotor includes first and second rotor units that face the outer circumferential surfaces of the stator with a predetermined air gap. Each of the first and second rotor units is provided with a permanent magnet magnetized in the axial direction that is sandwiched between first and second rotor magnetic poles. The first and second rotor magnetic poles have rotor pole teeth around the inner circumferential surface thereof, the number of the rotor pole teeth corresponds to that of the stator pole teeth, and the first rotor magnetic pole is deviated from the second rotor magnetic pole by ½ of the rotor teeth pitch. The first and second rotor units are connected in the axial direction through a nonmagnetic material member such that they are deviated from each other by ¼ of the rotor teeth pitch.

Each embodiment described above represents one example to realize the technical idea of the present invention, it stands to reason that the embodiment may be appropriately modified according to the use of the motor, a rotation speed and required torque corresponding to the use, and a suitable condition of an electric source or the like.

For example, the 6-phase/6-pole type, the 6-phase/12-pole type, the 10-phase/10-pole type and the 10-/20-pole type are described in the embodiments, while the scope of the invention is expanded to the 6-phase/6 m-pole type or the 10-phase/10 m-pole type that satisfies either the condition (2) or the condition (3) and the pole teeth pitch of the stator and the pole teeth pitch of the rotor satisfy the condition (4) described above.

The manufacturing method of the magnetic poles is optional so long as the above described shape is obtained.

Effects of the Invention

Since the inner rotor or outer rotor hybrid stepping motor of the present invention is constructed so as to operate in the above described manner, it has a significant effect that a high-resolution motor can be provided without increasing the number of magnetic poles. The effects will be described for every claim as follows.

(1) According to the invention of claim 1, since the number of pole teeth Z of an inner rotor hybrid stepping motor of 6-phase/6 m-pole type (m is integer equal to or larger than 1) is determined by m(6n+1) or m(6n+2), the motor operates normally as a 6-phase motor, which avoids a leading cause of faulty product, increasing yield of products.

(2) According to the invention of claim 2, since the number of pole teeth Z of an inner rotor hybrid stepping motor of 10-phase/10 m-pole type (m is integer equal to or larger than 1) is determined by m(10n+2) or m(10n+3), the motor operates normally as a 10-phase motor, which avoids a leading cause of faulty product, increasing yield of products.

(3) According to the invention of claim 3, since the number of pole teeth Z of an outer rotor hybrid stepping motor of 6-phase/6 m-pole type (m is integer equal to or larger than 1) is determined by m(6n+1) or m(6n+2), the motor operates normally as a 6-phase motor, which avoids a leading cause of faulty product, increasing yield of products.

(4) According to the invention of claim 4, since the number of pole teeth Z of an outer rotor hybrid stepping motor of 10-phase/10 m-pole type (m is integer equal to or larger than 1) is determined by m(10n+2) or m(10n+3), the motor operates normally as a 10-phase motor, which avoids a leading cause of faulty product, increasing yield of products.

(5) According to the invention of claim 5, on the basis of the invention of claims 1 through 4, the specially constructed stator of an inner rotor or outer rotor stepping motor whose magnetic pole is divided into tow halves in the axial direction where one half has pole teeth that are line-symmetric with respect to the magnetic pole and the other half has pole teeth that are asymmetrical is constructed by stacking magnetic material plates having the same constructions, which decreases the number of man-hours for making the stepping motor.

(6) According to the invention of claim 6, on the basis of the invention of claims 1 through 5, the acceptable range of error between the pitch of the stator pole teeth and the pitch of the rotor pole teeth for normal operation of an inner rotor or outer rotor stepping motor can be clearly defined.

(7) Further, in the case of the construction of the present invention, when a plurality of windings are excited at the same time, a number of transistors of a driving circuit can be reduced in half as compared with the conventional driving circuit. That is, while a conventional 6-phase stepping motor requires 24 transistors, the 6-phase stepping motor of the present invention requires only 12 transistors.

Further, while a conventional 10-phase stepping motor requires 40 transistors, the 10-phase stepping motor of the present invention requires only 20 transistors.

Furthermore, the number of magnetic pole can be reduced.

For example, while a conventional 6-phase stepping motor requires 24 pieces of stator magnetic poles, the 6-phase stepping motor of the present invention requires only 6–12 pieces of the stator magnetic poles. While a conventional ten-phase stepping motor requires 40 pieces of stator magnetic poles, the ten-phase stepping motor of the present invention requires only 10–20 pieces of the stator magnetic poles.

What is claimed is:

1. An inner rotor hybrid stepping motor of 6-phase and 6 m-pole, comprising:

a stator comprising an annular magnetic substance, 6 m pieces of stator magnetic poles that are centripetally formed around the inner circumferential surface of said annular magnetic substance toward the center at equal pitches and each stator magnetic pole having a plurality of pole teeth formed on the inner tip end thereof at equal pitches, and excitation windings being wound around said stator magnetic poles;

a rotor, which is rotatably supported by said stator through a predetermined air gap with respect to the inner circumferential surface of said stator pole teeth, having a cylindrical permanent magnet magnetized in an axial direction that is sandwiched between a pair of rotor magnetic poles each having rotor pole teeth corresponding to said stator pole teeth;

wherein said stator magnetic poles include first magnetic poles whose pole teeth formed on the inner tip ends are line-symmetric with respect to the shape of said magnetic poles and second magnetic poles whose pole teeth are formed on the inner tip ends at the same pitches and the same number as said pole teeth of said first magnetic poles and said pole teeth of the second magnetic poles are deviated from the pole teeth of said first magnetic poles by ¼ pitch in the same circumferential direction, said first and second magnetic poles are alternatively arranged in the circumferential direction, and said stator containing said first and second magnetic poles is divided into a first stator portion and a second stator portion that are arranged in the axial direction, and said first and second magnetic poles of said first stator portion are connected to said second and first magnetic poles of said second stator portion, respectively, in the axial direction, while said first and second stator portions are inverted in the front and back in the circumferential direction;

wherein said rotor includes first and second rotor units that face the inner circumferential surfaces of pole teeth of said first and second stator portions with said air gap, each of said first and second rotor units is provided with a permanent magnet magnetized in the axial direction that is sandwiched between coaxial first and second rotor magnetic poles, said first and second rotor magnetic poles have rotor pole teeth around the outer circumferential surface thereof, the number of said rotor pole teeth corresponds to that of said stator pole teeth, said first rotor magnetic pole is deviated from said second rotor magnetic pole by ½ of the rotor teeth pitch, and said first and second rotor units are connected in the axial direction through a non-magnetic material member such that said first and second rotor units deviated from each other by ¼ of the rotor teeth pitch;

and wherein the number of said rotor pole teeth Z satisfies the following condition;

$$Z=m(6n+1) \text{ or } Z=m(6n+2)$$

where m and n are integers equal to or larger than 1.

2. An inner rotor hybrid stepping motor of 10-phase and 10 m-pole, comprising:

a stator comprising an annular magnetic substance, 10 m pieces of stator magnetic poles that are centripetally formed around the inner circumferential surface of said annular magnetic substance toward the center at equal pitches and each stator magnetic pole having a plurality of pole teeth formed on the inner tip end thereof at equal pitches, and excitation windings being wound around said stator magnetic poles;

a rotor, which is rotatably supported by said stator through a predetermined air gap with respect to the inner circumferential surface of said stator pole teeth, having a cylindrical permanent magnet magnetized in an axial direction that is sandwiched between a pair of rotor magnetic poles each having rotor pole teeth corresponding to said stator pole teeth;

wherein said stator magnetic poles include first magnetic poles whose pole teeth formed on the inner tip ends are line-symmetric with respect to the shape of said magnetic poles and second magnetic poles whose pole teeth are formed on the inner tip ends at the same pitches and the same number as said pole teeth of said first magnetic poles and said pole teeth of the second magnetic poles are deviated from the pole teeth of said first magnetic poles by ¼ pitch in the same circumferential direction, said first and second magnetic poles are alternatively arranged in the circumferential direction, and said stator containing said first and second magnetic poles is divided into a first stator portion and a second stator portion that are arranged in the axial direction, and said first and second magnetic poles of said first stator portion are connected to said second and first magnetic poles of said second stator portion, respectively, in the axial direction, while said first and second stator portions are inverted in the front and back in the circumferential direction;

wherein said rotor includes first and second rotor units that face the inner circumferential surfaces of pole teeth of said first and second stator portions with said air gap, each of said first and second rotor units is provided with a permanent magnet magnetized in the axial direction that is sandwiched between coaxial first and second rotor magnetic poles, said first and second rotor magnetic poles have rotor pole teeth around the outer circumferential surface thereof, the number of said rotor pole teeth corresponds to that of said stator pole teeth, said first rotor magnetic pole is deviated from said second rotor magnetic pole by ½ of the rotor teeth pitch, and said first and second rotor units are connected in the axial direction through a non-magnetic material member such that said first and second rotor units deviated from each other by ¼ of the rotor teeth pitch;

and wherein the number of said rotor pole teeth Z satisfies the following condition;

$$Z=m(10n+2) \text{ or } Z=m(10n+3)$$

where m and n are integers equal to or larger than 1.

3. An outer rotor hybrid stepping motor of 6-phase and 6 m-pole, comprising:

a stator comprising a cylindrical magnetic substance, 6 m pieces of stator magnetic poles that are radially formed around the outer circumferential surface of said cylindrical magnetic substance at equal pitches and each stator magnetic pole having a plurality of pole teeth formed on the outer tip end thereof at equal pitches, and excitation windings being wound around said stator magnetic poles;

a rotor, which is rotatably supported by said stator through a predetermined air gap with respect to the outer circumferential surface of said stator pole teeth, having a cylindrical permanent magnet magnetized in an axial direction that is sandwiched between a pair of rotor magnetic poles each having rotor pole teeth corresponding to said stator pole teeth;

wherein said stator magnetic poles include first magnetic poles whose pole teeth formed on the outer tip ends are line-symmetric with respect to the shape of said magnetic poles and second magnetic poles whose pole teeth are formed on the outer tip ends at the same pitches and the same number as said pole teeth of said first magnetic poles and said pole teeth of the second magnetic poles are deviated from the pole teeth of said first magnetic poles by ¼ pitch in the same circumferential direction, said first and second magnetic poles are alternatively arranged in the circumferential direction, and said stator containing said first and second magnetic poles is divided into a first stator portion and a second stator portion that are arranged in the axial direction, and said first and second magnetic poles of said first stator portion are connected to said second and first magnetic poles of said second stator portion, respectively, in the axial direction, while said first and second stator portions are inverted in the front and back in the circumferential direction;

wherein said rotor includes first and second rotor units that face the outer circumferential surfaces of pole teeth of said first and second stator portions with said air gap, each of said first and second rotor units is provided with a permanent magnet magnetized in the axial direction that is sandwiched between coaxial first and second rotor magnetic poles, said first and second rotor magnetic poles have rotor pole teeth around the inner circumferential surface thereof, the number of said rotor pole teeth corresponds to that of said stator pole teeth, said first rotor magnetic pole is deviated from said second rotor magnetic pole by ½ of the rotor teeth pitch, and said first and second rotor units are connected in the axial direction through a non-magnetic material member such that said first and second rotor units deviated from each other by ¼ of the rotor teeth pitch;

and wherein the number of said rotor pole teeth Z satisfies the following condition;

$$Z=m(6n+1) \text{ or } Z=m(6n+2)$$

where m and n are integers equal to or larger than 1.

4. An outer rotor hybrid stepping motor of 10-phase and 10 m-pole, comprising:

a stator comprising a cylindrical magnetic substance, 10 m pieces of stator magnetic poles that are radially formed around the outer circumferential surface of said cylindrical magnetic substance at equal pitches and each stator magnetic pole having a plurality of pole teeth formed on the outer tip end thereof at equal pitches, and excitation windings being wound around said stator magnetic poles;

a rotor, which is rotatably supported by said stator through a predetermined air gap with respect to the outer circumferential surface of said stator pole teeth, having a cylindrical permanent magnet magnetized in an axial direction that is sandwiched between a pair of rotor magnetic poles each having rotor pole teeth corresponding to said stator pole teeth;

wherein said stator magnetic poles include first magnetic poles whose pole teeth formed on the outer tip ends are line-symmetric with respect to the shape of said magnetic poles and second magnetic poles whose pole teeth are formed on the outer tip ends at the same pitches and the same number as said pole teeth of said first magnetic poles and said pole teeth of the second magnetic poles are deviated from the pole teeth of said first magnetic poles by ¼ pitch in the same circumferential direction, said first and second magnetic poles are alternatively arranged in the circumferential direction, and said stator containing said first and second magnetic poles is divided into a first stator portion and a second stator portion that are arranged in the axial direction, and said first and second magnetic poles of said first stator portion are connected to said second and first magnetic poles of said second stator portion, respectively, in the axial direction, while said first and second stator portions are inverted in the front and back in the circumferential direction;

wherein said rotor includes first and second rotor units that face the outer circumferential surfaces of pole teeth of said first and second stator portions with said air gap, each of said first and second rotor units is provided with a permanent magnet magnetized in the axial direction that is sandwiched between coaxial first and second rotor magnetic poles, said first and second rotor magnetic poles have rotor pole teeth around the inner circumferential surface thereof, the number of said rotor pole teeth corresponds to that of said stator pole teeth, said first rotor magnetic pole is deviated from said second rotor magnetic pole by ½ of the rotor teeth pitch, and said first and second rotor units are connected in the axial direction through a non-magnetic material member such that said first and second rotor units deviated from each other by ¼ of the rotor teeth pitch;

and wherein the number of said rotor pole teeth Z satisfies the following condition;

$Z=m(10n+2)$ or $Z=m(10n+3)$ where m and n are integers equal to or larger than 1.

5. The inner rotor or outer rotor hybrid stepping motor according to one of claims 1 through 4, wherein each stator comprises:

a predetermined number of stacked magnetic material plates each of which has h/2 pieces of magnetic poles whose pole teeth formed on the tip ends are line-symmetric with respect to the shape of said magnetic poles of a predetermined size and h/2 pieces of magnetic poles whose pole teeth are deviated by ¼ of the pole teeth pitch in the same circumferential direction that are alternatively arranged;

a predetermined number of stacked magnetic material plates having the same constructions as said magnetic material plates that are rotated by 180/h degrees, said stacked elements are fixed to each other; and windings that are wound around said magnetic poles, where h equals 6 m or 10 m and m is an integer equals to or larger than 1.

6. The inner rotor or outer rotor hybrid stepping motor according to one of claims 1 through 5, wherein said stator pole teeth pitch τS and said rotor pole teeth pitch τR satisfy the following condition:

$0.75\tau R \leq \tau S \leq 1.25\tau R$.

* * * * *